US006283677B1

(12) United States Patent
Slattery et al.

(10) Patent No.: US 6,283,677 B1
(45) Date of Patent: Sep. 4, 2001

(54) TAILORABLE ELASTOMERIC COMPOSITE PNEUMATIC FENDER SYSTEM FOR ABSORBING HIGH ENERGY IMPACT

(75) Inventors: Kerry T. Slattery, O'Fallon, MO (US); Roger M. Crane, Arnold, MD (US); Kathleen A. Corona-Bittick, Cincinnati, OH (US); Donald James Dorr, Lake Saint Louis, MO (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/359,683

(22) Filed: Jul. 23, 1999

Related U.S. Application Data

(63) Continuation-in-part of application No. 09/012,007, filed on Jan. 22, 1998, now Pat. No. 6,053,664.
(60) Provisional application No. 60/096,796, filed on Aug. 17, 1998, and provisional application No. 60/038,133, filed on Mar. 3, 1997.

(51) Int. Cl.[7] .................. E02B 3/26; B60R 19/18
(52) U.S. Cl. .................. 405/215; 405/211; 405/212; 405/213; 114/219; 114/220; 293/107; 293/108
(58) Field of Search .................. 405/211, 212, 405/213, 214, 215; 114/219, 220; 293/102, 107, 110, 108; 280/728.1, 734, 735, 736, 741, 742

(56) References Cited

U.S. PATENT DOCUMENTS

| | | | |
|---|---|---|---|
| H402 | * 1/1988 | Julian et al. ................. 405/212 |
| 2,417,849 | * 3/1947 | Walters et al. ............... 405/213 X |
| 3,572,629 | * 3/1971 | Clark .......................... 251/121 |
| 3,585,958 | * 6/1971 | Naczkowski ................ 405/215 X |
| 3,588,142 | * 6/1971 | Gorman ....................... 280/736 |
| 3,638,964 | * 2/1972 | Chute ........................... 280/736 |
| 3,653,613 | 4/1972 | Palmer er al. . |
| 3,656,791 | * 4/1972 | Treusdell ..................... 293/107 |
| 3,684,309 | * 8/1972 | Uchiyamada et al. ....... 280/735 |
| 3,708,194 | * 1/1973 | Amit ............................. 293/1 |
| 3,718,332 | * 2/1973 | Jones ........................... 280/735 |
| 3,747,970 | * 7/1973 | Fathauer et al. ............. 294/81.1 |
| 3,782,769 | 1/1974 | Fader et al. . |
| 3,817,566 | 6/1974 | Keijzer . |
| 3,822,076 | * 7/1974 | Mercier et al. .............. 293/107 |
| 3,834,686 | 9/1974 | Moritz et al. . |
| 3,848,914 | * 11/1974 | Wathen ........................ 293/9 |
| 3,988,997 | * 11/1976 | Fenton ......................... 14/219 |
| 4,054,311 | 10/1977 | Gute . |

(List continued on next page.)

Primary Examiner—David Bagnell
Assistant Examiner—Jong-Suk Lee
(74) Attorney, Agent, or Firm—Howard Kaiser

(57) ABSTRACT

An energy-absorbing bumper system features a variably controllable valve which is responsive to impact conditions. The initially closed valve opens upon maximization of the pressure reading upon the bumper, and maintains the same open setting (in other words, the same valve area) during such period of pressure maximization. During the succeeding period of pressure declination from maximum, the valve undergoes ongoing adjustment of its open setting (in other words, ongoing adjustment of its valve area) so that the reaction force of the bumper remains constant. The valve closes (in other words, the valve area becomes zero) when the pressure falls abruptly toward zero (an occurrence which correlates with a similar plummet in reaction force, as well as with near or approximate motionlessness of the impacting body), thereby avoiding or curtailing an unwanted rebound effect. Conventional bumper systems are dependent upon adaptation of size and/or number of fenders in order to suit different marine vessels in terms of energy absorption; by comparison, the inventively "smart" bumper system is readily adaptable to diverse marine vessels.

23 Claims, 12 Drawing Sheets

U.S. PATENT DOCUMENTS

| | | |
|---|---|---|
| 4,054,312 | 10/1977 | Strader . |
| 4,057,236 | 11/1977 | Hennels . |
| 4,346,612 * | 8/1982 | Rand ................................. 73/864.44 |
| 4,804,296 * | 2/1989 | Smath ................................. 405/212 |
| 4,883,013 * | 11/1989 | Lin ................................. 405/212 X |
| 4,938,163 * | 7/1990 | Capron ............................ 405/212 X |
| 5,037,242 * | 8/1991 | Nill ..................................... 405/215 |
| 5,042,859 | 8/1991 | Zhang et al. . |
| 5,106,137 | 4/1992 | Curtis . |
| 5,573,344 * | 11/1996 | Crane et al. ......................... 403/179 |
| 5,653,425 | 8/1997 | Page et al. . |
| 5,725,265 * | 3/1998 | Baber ................................. 293/107 |
| 5,744,221 * | 4/1998 | Crane et al. ......................... 428/196 |
| 6,053,664 * | 4/2000 | Crane et al. ......................... 405/215 |

\* cited by examiner

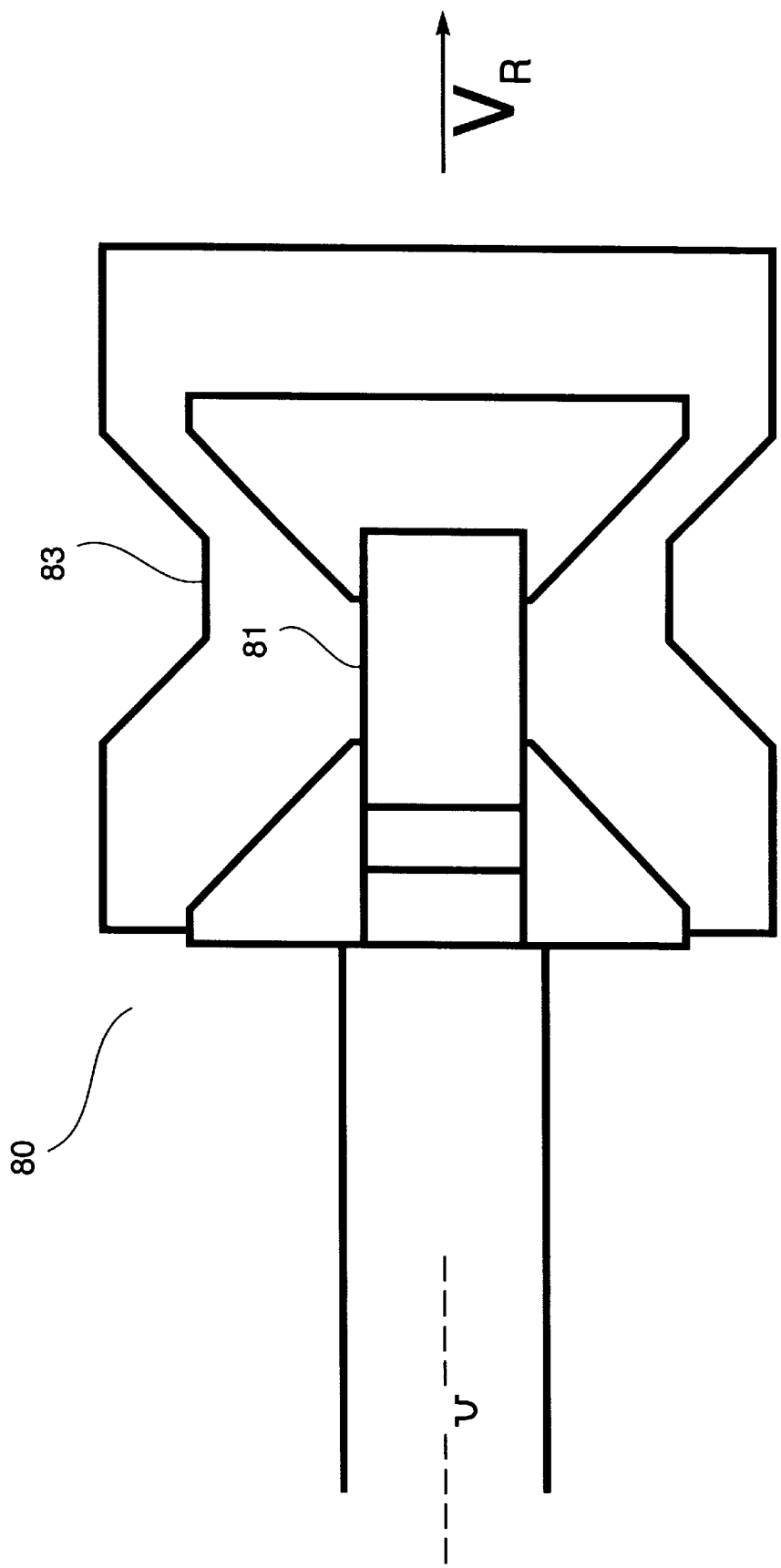

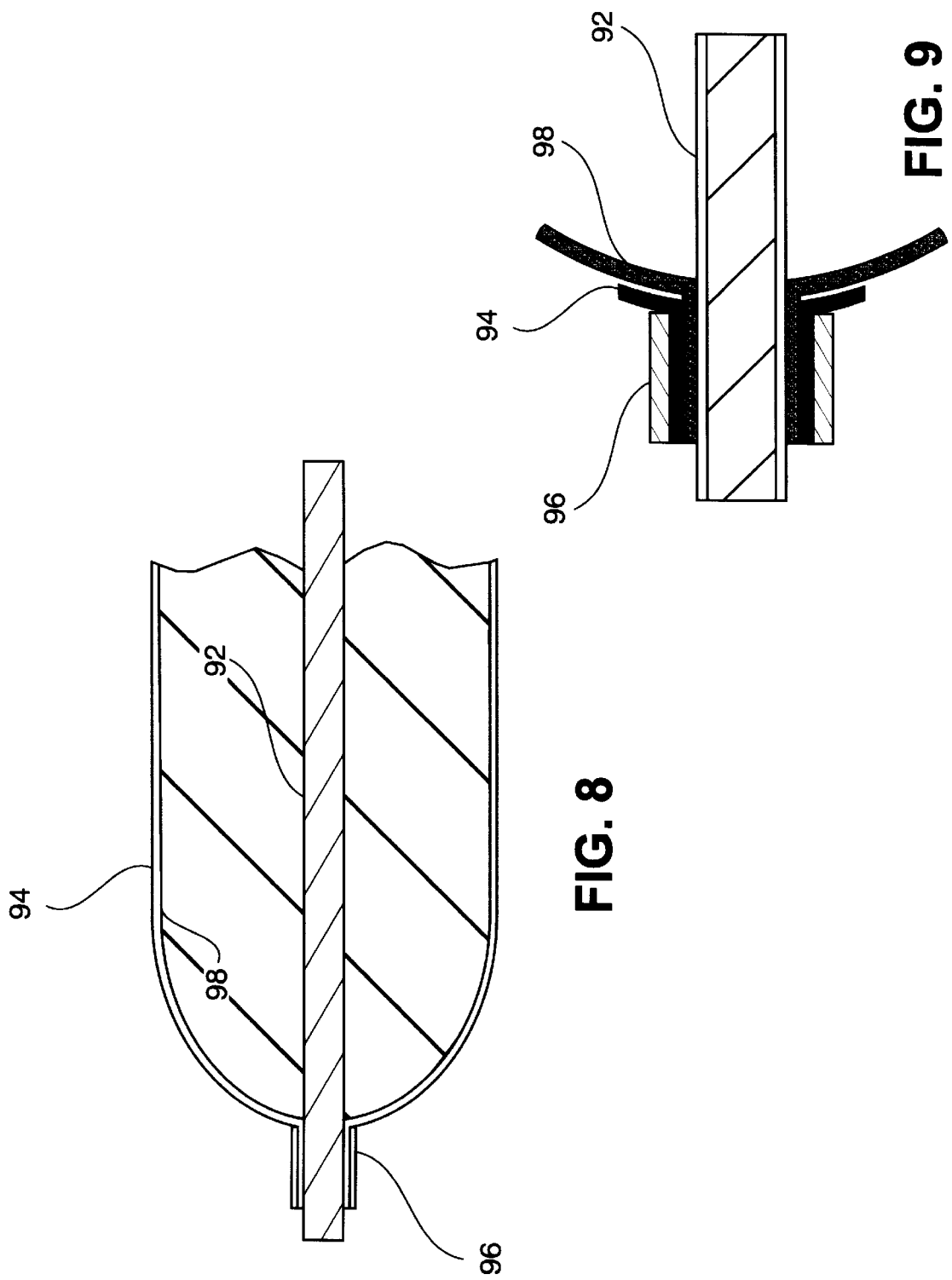

TAILORABLE ELASTOMERIC COMPOSITE PNEUMATIC FENDER SYSTEM FOR ABSORBING HIGH ENERGY IMPACT

CROSS-REFERENCE TO RELATED APPLICATIONS

This application claims the benefit of U.S. Provisional Application No. 60/096,796, filed Aug. 17, 1998, entitled "Tailorable Elastomeric Composite Pneumatic Fender System for Absorbing High Energy Impact, and Manufacture Thereof," incorporated herein by reference, and is a continuation-in-part of U.S. Nonprovisional Application No. 09/012,007, filed Jan. 22, 1998, now U.S. Pat. No. 6,053,664, issued Apr. 25, 2000, entitled "Tailorable Elastomeric Composite System for Absorbing High Energy Impact," incorporated herein by reference, which claims the benefit of U.S. Provisional Application No. 60/038,133, filed Mar. 3, 1997.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to methods and apparatuses for absorbing impact from structures, more particularly to such methods and apparatuses which are mented at berthing locations for absorbing impact from marine (vessels.

"Fenders" are bumpers which are utilized at docks, wharves, piers, moorages and anchorages for absorbing kinetic energy of berthing marine vessels. A fender absorbs kinetic energy of the berthing vessel by converting the kinetic energy into potential energy in the fender material system.

Fender systems have been used, or considered for use, wherein the potential energy is realized essentially in at least one of the following forms: deflection of a fender pile; compression of a rubber fender component; deformation of a foam-filled fender; torsion of a fender's cylindrical shaft; pressurization of a pneumatic fender; fluid motion/pressurization of a hydraulic fender.

Foam-filled fenders generally comprise a resilient, closed-cell foam wrapped with an elastomeric skin. The cellular structure of the foam reacts like individual pneumatic fenders by absorbing energy through deformation. The foam-filled fenders have high energy absorbing capabilities with relatively small reaction force and can float with the tide, handling several surface ship types. Since foam-filled fenders are typically large, they can act as a separator and provide a good standoff.

The U.S. Navy is currently utilizing composite materials in the fabrication of foam-filled fenders for berthing ships. The current design of a foam-filled fender for U.S. Naval ships includes a cylinder having a urethane foam core, overwraps of nylon, and a urethane sprayed over the cylindrical surface. The U.S. Navy's foam-filled fender system has demonstrated effectiveness in terms of reacting certain kinds of ship loads against piers, but has yet to be engineered for generic applications.

The U.S. Naval fenders currently in use are fabricated for a particular class of ship. U.S. Naval vessels which are characterized by different displacements require different fenders to be employed; one reason for this has been the U.S. Navy's need to ensure that a particular U.S. Naval ship's hull loading is maintained below a specific level. Furthermore, fenders of current U.S. Naval design are fixed in terms of the amount of energy which can be reacted. In order to absorb more energy, more or larger current U.S. Naval fenders are required.

Although the U.S. Navy's current foam-filled fender design has been successful in certain modes of practice, it does not lend itself to an analytical design methodology using current design tools. The method for fabricating the U.S. Navy's current foam-filled fender includes wrapping a urethane foam core with nylon fiber, and spraying urethane onto the fiber as it is wound onto the urethane core material; this technique results in operator-to-operator variance in urethane coating thickness or fiber volume fraction.

Accordingly, the mechanism of energy absorption cannot be accurately modeled for current U.S. Navy foam-filled fender systems. The efficacy of a given U.S. Navy foam-filled fender for a particular application requires independent empirical verification. Due to this incapability of advance fender design, the U.S. Navy's current foam-filled fender system necessarily lacks the versatility to predictably adapt to various configurations of marine vessel and/or berth.

Current U.S. Navy fenders are experiencing significant design overloads and are being replaced at an annual cost of millions of dollars per year. Moreover, many pier structures owned by the U.S. Navy and other entities are decrepit or dilapidated. Aging or deteriorating pier structures require renewed analysis to account for degrading mechanical properties. If analytical procedures are not soon established, existing pier structures may be prematurely replaced.

SUMMARY OF THE INVENTION

In view of the foregoing, it is an object of the present invention to provide a bumper/fender system which can be used effectively for absorbing impact of a variety of marine vessels at a variety of berthing stations.

Another object of the present invention is to provide such a bumper/fender system which can be thus used for both large and small marine vessels.

It is a further object of this invention to provide such a bumper/fender system which admits of analytical modeling for purposes of predicting such varied usage.

A further object of this invention is to provide such a bumper/fender system which is economical.

The present invention is, to some extent, a "variation on a theme" disclosed by Crane et al. at the aforementioned copending U.S. application Ser. No. 09/012,007 which is incorporated herein by reference and of which this application is a continuation-in-part. The invention disclosed by Crane et al. at U.S. application Ser. No. 09/012,007 (hereinafter referred to as "Crane et al. '007") was developed as part of Phase I of an SBIR ("Small Business Innovation Research Program") project (OSD95-016). The present invention was developed as part of Phase II of the same SBIR project (OSD95-016). However the present invention represents an inventive improvement vis-a-vis' Crane et al. '007, and may be preferable thereto in many practical contexts.

Like the invention disclosed by Crane et al. at U.S. application Ser. No. 09/012,007 (hereinafter referred to as "Crane et al. '007"), the present invention provides a system for absorbing the impact of a relatively moving body. Also like the invention disclosed by Crane et al. '007, the present inventive system comprises a "bumper" which includes fiber-reinforced high strain-to-failure viscoelastic matrix material. Further like the invention disclosed by Crane et al. '007, the bumper is disposed in suspended fashion, either hanging or floating. Again like the invention disclosed by Crane et al. '007, upon impact by the relatively moving body the bumper reacts so as to strike against a closely situated structural entity.

Unlike the invention disclosed by Crane et al. '007, the present invention implements a "smart valve" for the bumper. Furthermore, unlike the invention disclosed by Crane et al. '007, the present invention obviates the need for one or more "deformers" for receiving the bumper after the bumper initially receives the body; energy is dissipated in a different manner. The present invention's bumper can react against any relatively rigid structural surface (such as a hard solid wall-like structure) which is part of any stable structure, such as a pier, dock, wharf, edifice, etc.

The present invention uniquely features a "smart" valve methodology which optimizes the load displacement curve of the inventive fender. The present invention also uniquely features utilization of a reusable winding mandrel in the fabrication of many embodiments of the inventive fender. In the light of the instant disclosure and the disclosure by Crane et al. '007, the ordinarily skilled artisan will appreciate the substantial extent of applicability to the present invention of the teachings and principles according to Crane et al. '007, as well as the significant differences therebetween.

To elaborate, the inventive system according to many embodiments of Crane et al. '007 comprises at least two composite structures and at least one housing. Each composite structure includes fiber-reinforced high strain-to-failure viscoelastic matrix material. At least one composite structure is a bumper (e.g., a "cylindroid" bumper which includes a hollow cylindrical axially intermediate portion and two protuberant axially extreme portions) for initially receiving the body. At least one composite structure is a deformer, (e.g., a "tension tube") for consequently receiving a bumper. Each housing is for securing at least one deformer and for suspending at least one bumper. Each bumper is situated adjacent at least one deformer. A cylindroid bumper, for instance, can be disposed horizontally, vertically or obliquely.

The inventive system in accordance with the present invention is markedly distinguishable from the inventive system in accordance with Crane et al. '007. In accordance with many presently inventive embodiments, an energy-absorbing system comprises: a structure; fluid contained by the structure; movement-restrictive situation means for the structure; valvular means for permitting escape of the fluid; actuator means for adjusting the valvular means; control means for the actuator means; and, pressure sensing means for informing the control means.

Typically according to this inventive energy-absorbing system, the valvular means is closed prior to a collision between a body and the structure. During the collision the valvular means operates in four stages, the four stages consisting of: (i) a first stage wherein the valvular means remains closed; (ii) a second stage wherein, when pressure is approximately maximal, the valvular means opens; (iii) a third stage wherein, when pressure commences to drop, the valvular means remains open so as to adaptively sustain, on an ongoing basis, an approximately steady force associated with the collision; and, (iv) a fourth stage wherein, when pressure approaches zero, the valvular means closes.

During the first stage, the valvular means is in statically closed mode; the pressure (against the bumper) is increasing from zero. During the second stage, the valvular means is in statically open mode; the pressure is approximately plateauing at about the maximal value. During the third stage, the valvular means is in dynamically open mode; the pressure is decreasing, while the force is approximately plateauing at about its value existing when the pressure commences to decrease at the outset of the third stage. During the fourth stage, the valvular means returns to statically closed mode; the pressure and the force each decrease steeply or precipitously, to or toward zero.

According to many inventive embodiments, especially those involving marine docking applications, the present inventive system for absorbing impact comprises: a bumper for being subjected to impact, wherein the bumper has an interior space and includes fiber-reinforced high strain-to-failure viscoelastic matrix material; means for suspending the bumper; a structure for restraining the bumper when said bumper is subjected to said impact; fluid (liquid or gas) which at least substantially fills the interior space; an outlet valve which regulates the flow of the fluid from the interior space; at least one pressure sensor (e.g., pressure transducer) which sends an electrical output signal relating to the pressure with respect to the wall of the bumper; a processor-controller which receives the electrical output signal and sends an electrical control signal in accordance with the electrical output signal, wherein the processor-controller has a memory containing information for determining, based on the pressure, whether and how the outlet valve should be actuated; and, a servo valve which receives the electrical control signal, wherein the servo valve actuates the outlet valve in accordance with the electrical control signal.

Each pressure sensor measures pressure and relays corresponding pressure information to the processor. The processor is typically implemented as a "processor-controller" which monitors sensory signals and conveys corresponding control signals in a feedback control system. The servo valve is typically rendered "smart" by means of a continual feedback loop wherein: Each pressure sensor sends to the processor-controller a sensor signal which is dependent upon the pressure of the bumper; in turn, the processor-controller (which includes algorithmic software for governing its reaction to the sensor output signal received) sends to the servo valve a control signal which is dependent upon the sensor signal(s) received from the pressure sensor(s). Depending upon the control signal received from the processor-controller, the servo valve actuates, or refrains from actuating, the outlet valve (which serves as a pressure relief valve).

For some embodiments of the present invention, "actuation" by the servo valve entails causing the initially completely closed outlet valve to regulatively variably open; that is, subsequent to commencement of the impact and upon receipt of the control signal corresponding to the attainment of predetermined conditions related to the pressure (against the bumper wall), the servo valve causes the outlet valve to open correspondingly in terms of extent or proportion. However, it is preferred for most inventive embodiments that "actuation" by the servo valve not only entail causing (permitting) the outlet valve to initially then adjustingly open, but also entail causing (permitting) the outlet valve to finally and completely close anew, all in correspondence with attainment of predetermined conditions. The final, complete closure of the outlet valve reduces or prevents a so-called "rebound" effect.

Subsequent to commencement of the impact, upon receipt of the control signal corresponding to the attainment of a first predetermined condition related to the pressure (i.e., pressure is at about a maximum value), the servo valve allows the outlet valve to open (i.e., move to an open position); the pressure remains at the maximum value until it begins to drop. Then, upon receipt of the control signal corresponding to the attainment of a second predetermined condition related to the pressure (i.e., pressure is beginning to drop from the maximum value), the servo valve allows the outlet valve to move, remaining open in such a manner as to approximately maintain constancy of the reaction force associated with the impact; depending on the position of the butterfly valve core along the axial translation of the outlet valve, this movement of the butterfly valve core can result in either an increase in the flow of water through the outlet valve, or a decrease in the flow of water through the outlet valve. Then, upon receipt of the control signal corresponding to the attainment of a third predetermined condition related to the pressure (i.e., pressure abruptly drops, approaching zero, said abrupt drop corresponding to cessation or near cessation of motion of the object which impacts the bumper), the servo valve allows the outlet valve to close (i.e., move to the closed position).

The servo valve (which controls the position of the outlet valve) is typically an electromechanical device such as a solenoid valve or an electronically-controlled actuator. For many inventive embodiments the servo valve is a solenoid valve which comprises a solenoid and a pneumatic actuator. The pneumatic actuator actuates with compressed air which is controlled by the solenoid. When the processor sends the appropriate signal to the solenoid, the solenoid causes the pneumatic actuator to be actuated, which in turn allows the outlet valve to move (e.g., move in the "open" direction) or close (e.g., move in the "closed" direction). Depending upon the position of the butterfly valve along the axial translation of the valve, the rate of flow of water will vary, thereby controlling the pressure in and on the fender.

For some embodiments of the present invention, the servo valve is an electronically-controlled actuator; that is, "opening" and "closing" of the outlet valve is achieved by means of an electronically-controlled actuator, rather than by means of the combination of a pneumatic actuator with a solenoid. When the processor sends the appropriate signal to the electronically-controlled actuator, it causes the outlet valve to vary its position.

In inventive practice, the ordinarily skilled artisan is aware that an electronically-controlled actuator and a pneumatic actuator-with-solenoid combination are two alternative means for varying the position of the outlet valve (in other words, "opening" and "closing" the outlet valve), and is acquainted with methods and techniques for effectuating each. The person of ordinary skill in the art is familiar with commercially available electronically-controlled actuators which may be suitably implemented, as well as with commercially available pneumatic actuators and solenoids which may be suitably implemented in combination. Depending upon the particular inventive embodiment practiced, a pneumatic actuator may prove to be slightly more responsive than an electronic actuator, or vice versa; nevertheless, neither approach to inventively practicing the servo valve can necessarily be recommended over the other.

In typical inventive practice, the bumper includes an axially symmetrical cylindroid structural wall which surrounds an interior space (e.g., cavity or hollow). The cylindroid structural wall includes a cylindrical axially intermediate portion and two protuberant axial end portions which are rounded or tapered (e.g., convexo-concave). The outlet valve is typically situated in the vicinity of the extreme axial end of the cylindroid bumper, approximately coincident with the imaginary axis of the bumper. Some inventive embodiments provide a plurality of outlet valves (thus perhaps requiring plural servo valves); for instance, two outlet valves can be provided for a cylindroid bumper wherein each outlet valve is oppositely situated at an extreme axial end.

For purposes of receiving the anticipated impact, the cylindroid bumper can be disposed any which way—horizontally, vertically or obliquely—typically so that its axis of symmetry lies in a vertical plane which is generally directed so as to face or meet the anticipated impacting entity (such as a ship which is berthing). Preferably, the fluid which fills or substantially fills the cavity is liquid rather than gaseous. In testing conducted by the U.S. Navy, water was the liquid of choice. According to this invention, the composite bumper structure can contain a fluid, either gaseous (e.g., air) or liquid (e.g., water); however, in inventive practice, since a liquid (as compared with a gas) better lends itself to regulation of pressurization and to control of fluid motion, liquidity of the bumper's fluid contents is generally preferable to gaseousness thereof.

Many embodiments of the present inventive system are "self-contained" in the sense that all the components are joined with or integrated with the bumper. The pressure sensor(s) and the outlet valve(s) are in engagement with the bumper's structural wall. The servo valve(s) and the processor-controller means (such as one or more microprocessors, each of which is small enough to fit) may be each contained within the bumper's cavity (inside the bumper's structural wall), or either or both may be external to the bumper's cavity; preferably, the servo valve and the processor are in relatively close proximity.

Fenders currently utilized for U.S. Navy vehicles are fabricated for a particular class of ship. Vessels with different displacements require different fenders to be employed. One reason for this is to ensure that the hull loading is kept below a specific level. Also, the energy that can be reacted by the U.S. Navy's current design is fixed; that is, to absorb more energy, more or larger fenders are required.

By contrast, the inventive "smartness" attribute endows an inventive fender with sufficient versatility and universality for utilization in connection with varieties of marine vessels and berthing stations. The inventive fender can readily be tailored and analyzed particularly in terms of its "smartness." The inventive fender system is susceptible of analysis using conventional techniques and is tailorable to numerous pier configurations as well as to numerous types and sizes of ships and other marine vessels. The present invention permits anticipatory tailoring of fenders for desired applications so as to avoid overpressurization on the prospectively impacting marine vessel hulls.

The inventive bumper system is versatile especially in that the "smart" aspect thereof lends itself to broad applicability to a variety of marine vessels. The inventive "smart" valve arrangement can be varied to apply to different maximum hull pressures while maintaining the optimum load stroke curve for maximum energy dissipation. A marine vessel's contact region can be designed to keep the hull loading below a specific threshold value. In addition, the "smart" valve can determine when the ship velocity is zero, whereupon the outlet valve closes completely, thereby eliminating any rebound typically experienced with conventional fender design.

Moreover, the materials utilized for the present invention have demonstrated long term durability in sea water environments, and therefore should be capable of greater longevity than are the fenders which are currently being used. Furthermore, the capability of the inventive fender system to allow for higher berthing speeds without overloading either pier structures or ship hulls will greatly benefit both U.S. Naval and commercial shipping. Commercially, for both container traffic and ferry traffic, the increased berthing speeds will result in shorter times for off-loading and on-loading. Shorter turn-around times will result in lower shipping costs.

Other objects, advantages and features of this invention will become apparent from the following detailed description of the invention when considered in conjunction with the accompanying drawings.

BRIEF DESCRIPTION OF THE APPENDICES

The following appendices are hereby made a part of this disclosure:

Attached hereto marked APPENDIX "X" and incorporated herein by reference is a copy of the following report which was issued pursuant to SBIR contract between the U.S. Navy and "performing organization" Production Products Manufacturing & Sales Company, Inc., 1285 Dunn Road, St. Louis, Mo.: *Elastomerc Composite Bumpers*, Second Quarterly Progress Report, May 19, 1997 thru Aug. 18, 1997, sponsored by the Office of Naval Research (ONR), Contract No. N00014-97-C-0117, Contract Effective Date Feb. 18, 1997, Contract Expiration Date Feb. 18, 1999; "Distribution authorized to U.S. Government agencies only; report contains proprietary data produced under SBIR contract. Other requests shall be referred to the performing organization listed above." This report includes pages 1 through 27 plus its "Appendix A" (commencing at page 28) which includes pages C-1 through C-8, D-1 through D-7 and I-1 through I-2.

Attached hereto marked APPENDIX "Y" and incorporated herein by reference is a copy of an embodiment of a source code (four pages of computer printout) pertaining to algorithmic control in accordance with the present invention.

Attached hereto marked APPENDIX "Z" and incorporated herein by reference are two photographic images (photocopied photographs), viz., FIG. Z-1 and FIG. Z-2, wherein FIG. Z-1 depicts an embodiment of a composite fender structure in accordance with the present invention, and FIG. Z-2 depicts an embodiment of removal of a collapsible mandrel in accordance with the present invention.

BRIEF DESCRIPTION OF THE DRAWINGS

In order that the present invention may be clearly understood, it will now be described, by way of example, with reference to the accompanying drawing, wherein like numbers indicate the same or similar components, and wherein:

FIG. 4a, FIG. 4b, FIG. 4c, FIG. 4d and FIG. 4e are diagrammatic axially-longitudinal views of various valve core positions for an embodiment of an outlet valve such as shown in FIG. 3.

FIG. 8 is a diagrammatic axially-longitudinal partial cross-sectional view of an embodiment of an inventive removable mandrel, implemented for inventively fabricating a cylindroid bumper.

FIG. 9 is a partial and enlarged view of the removable mandrel shown in FIG. 8

DETAILED DESCRIPTION OF THE INVENTION

Figure 1:
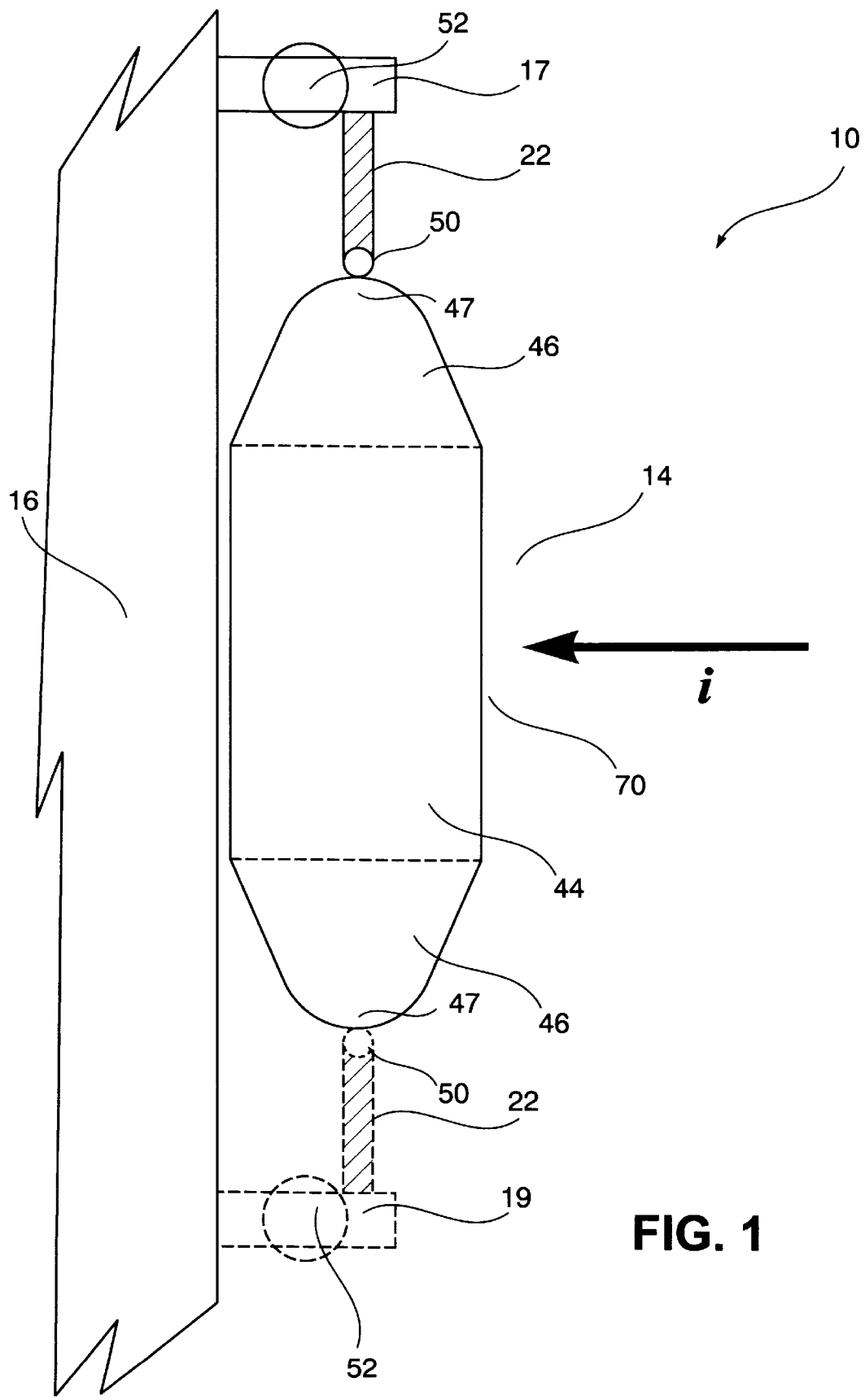
FIG. 1 is a diagrammatic elevation view of an embodiment of an inventive bumper system wherein a cylindroid bumper is suspended vertically.

Referring now to FIG. 1, inventive fender system 10 includes hollow glass-fiber-reinforced polyurethane reaction fender 14, which is in a position to react to an impact from a marine vessel in such a way as to consequently collide with rigid solid restraining wall 16. Reaction fender 14 is positioned proximately in front of restraining wall 16, slightly touching or nearly touching restraining wall 16. Reaction fender 14, similar in cylindroid shape to many existing bumpers, includes cylindrical fender portion 44 and two dome-like fender end portions 46. Each fender end portion 46 has an axially extreme end region 47 which is approximately coincident with the imaginary axis of symmetry of reaction fender 14. Reaction fender 14 is poised for being loaded by a marine vessel at the longitudinal front side 70 of cylindrical fender portion 44.

Figure 2:
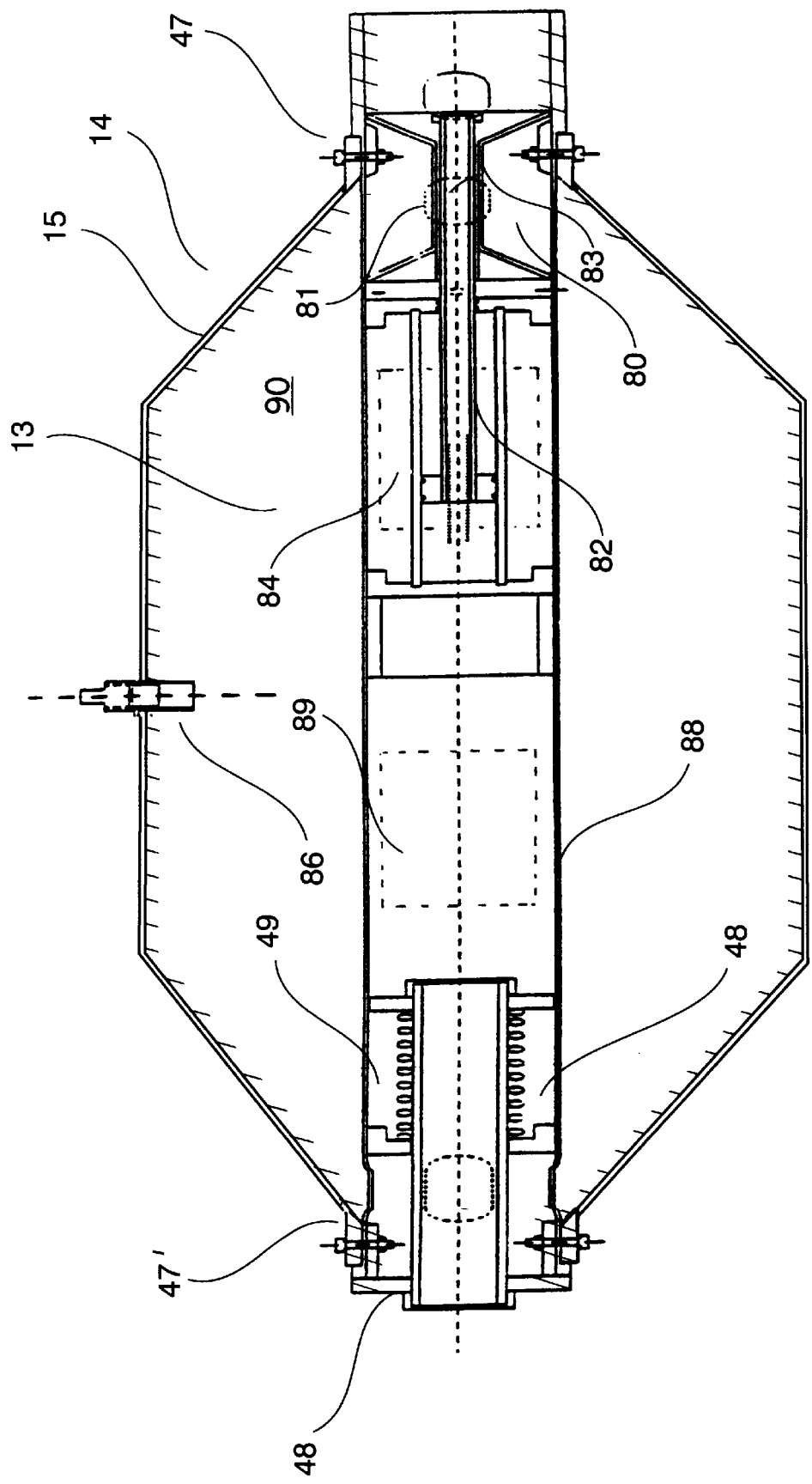
FIG. 2 is a diagrammatic axially-longitudinal cross-sectional view of an embodiment of an inventive cylindroid bumper such as shown in FIG. 1.

Reaction fender 14 is suspended loosely—either gravitationally (i.e., hanging) or buoyantly (i.e., floating)—by one or more lines, wires, ropes, belts, cords, cables, etc. As shown in FIG. 1, rope 22 can be attached either to upper structural support 17 (for gravitationally suspending reaction fender 14) or to lower structural support 19 (for buoyantly suspending reaction fender 14). Rope 22 is attached to fender 14 by engaging threaded eyebolt 50 which is coupled with plug assembly 48 (shown in FIG. A located at one of the two axially extreme ends 47. Fluid outlet valve 80 shown in FIG. 2 is preferably placed at the axially extreme end 47 which is opposite that which connects rope 22. A buoyantly suspended fender 14 can, for some such embodiments, be permitted to float while being mechanically restricted (e.g., by guides, rails or slides) to essentially vertical movement. Some inventive embodiments include one or more pulley mechanisms, such as pulleys 52 which is connected either to upper structural support 17 or to lower structural support 19, thereby selectively raising or lowering fender 14.

In accordance with the present invention, reaction fender 14 has been rendered a "smart" fender. In addition to reaction fender 14, inventive fender system 10 includes "smart" system components.

With reference to FIG. 2. reaction fender 14 has fender wall 15 which encloses interior space 13. Hollow cylindrical tube 88 is provided axially so as to pass through and be attached at the two holes which remained at axially extreme ends 47 following the below-described fender fabrication process (which includes removal of an inflatable mandrel). Interior space 13 is filled with water 90 which is surrounded by fender wall 15 and surrounds the outside surface of tube 88 so as to be subject to regulation by "smart" outlet valve 80, located at an end 47 (the righthand end 47 as shown in FIG. 2.

Located at the opposite end 47' (the lefthand end 47' as shown in FIG. 2, plug assembly 48 is shown in FIG. 2 to include spring-loaded pressure relief valve 49 (a type of safety valve) which operates in the manner of many conventional pressure relief valves. Relief valve 49 is activated (opens) upon attainment of an upper (overpressurization) limit or threshold, and is again activated (recloses) upon attainment of a lower pressurization limit or threshold (e.g., upon return to normal operating conditions).

Microprocessor 84 controls solenoid-type servo valve 82, which in turn controls the position of outlet valve 80. Microprocessor 84, which is positioned within tube 88, receives from at least one pressure sensor 86 (e.g., a transducer which engages fender wall 15) an output signal providing sensory information relating to the input load. Servo valve 82, which is also positioned within tube 88, receives from microprocessor 84 a control signal based on the processing of the sensory information. A power supply system (such as that which includes a rechargeable battery 89 shown in FIG. 2 is in connection with the feedback loop.

Upon appropriate command from microprocessor 84, servo valve 82 causes (permits) outlet valve 80 to open. Subsequently, upon further appropriate command from microprocessor 84, servo valve 82 causes (permits) outlet valve 80 to regulate the flow of water by means of movement (in either valvu(ar axial direction), along valve shaft 83, of valve core 81.

A single pressure sensor 86 is shown in FIG. 2, many inventive embodiments preferably implement a plurality of pressure sensors 86. Pressure sensor(s) 86 in fender 14 is(are) monitored by microprocessor 84 to determine the ship's velocity and effective mass which must be stopped by the bumper. Some embodiments provide linear potentiometer means for measuring valve core 81 position. With reference to APPENDIX Y. which contains an embodiment of source code for microprocessor 84, software has been developed which optimizes the shape of the "load stroke curve" so as to minimize the load and maximize the energy absorbed.

The inventive "smart" bumper is groundbreaking in its ability to tailor the load stoke curve using this computer-controlled hydraulic energy absorption strategy. Inventive fender system 10 represents a computer-controlled servo-mechanistic approach—a fresh approach to energy absorption. Inventive fender system 10 can be tailored to optimize the interaction between fender 14 and structural wall 16. Fender 14 can be tailored to meet bumper design requirements with the load stroke curve optimized and the hull load minimized.

Figure 3:
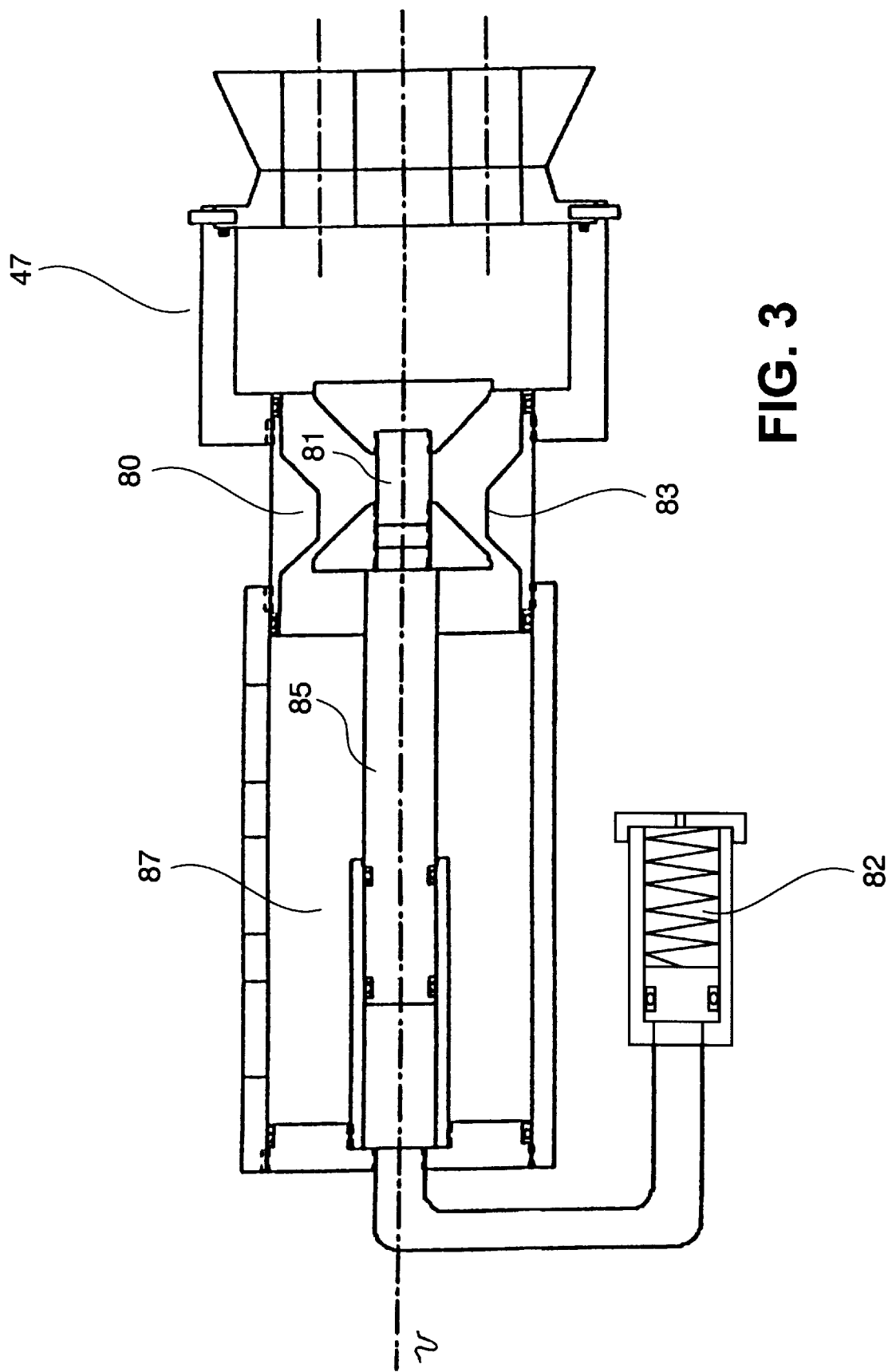
FIG. 3 is a diagrammatic axially-longitudinal view of an embodiment of an outlet/servo valve system such as shown in FIG. 2.

With reference to FIG. 3, the terms "outlet valve" and "servo valve" refer to different components. Outlet valve 80 is the large valve which controls the flow of water from fender 14. Servo valve 82 is the small electronic solenoid valve which controls the position of piston 85. Hourglass-shaped valve core 81 is mounted on valve piston 85. Piston 85 is inserted in valve cylinder 87, which is filled with fluid so that the position of piston 85 (and hence, of valve core 81) can be controlled by servo valve 82. Water forced from fender 14 by the impacting ship provides the force required to push valve core 81. The fluid forced through servo valve 82 is stored in an accumulator. In the current U.S. Navy prototype, the fluid is forced back into cylinder 87 manually. A full-scale inventive design may preferably include a spring to force valve core 81 back to its original closed position after fender 14 has refilled.

Reference now being made to FIG. 4a through FIG. 4e and FIG. 5, outlet valve 80 describes an "hourglass-shaped" or "butterfly-shaped" configuration. Outlet valve 80 includes hourglass-shaped (butterfly-shaped) valve core 81 and complementarily hourglass-shaped (butterfly-shaped) valve shaft 83. Valve core 81 is movable within valve shaft 83 and along valvular axis v. The amount of water which is allowed to pass through outlet valve 80 is determined by the position of hourglass-shaped valve core 81 with respect to hourglass-shaped valve shaft 83. It is readily understood by the ordinarily skilled artisan who reads this disclosure that regulative variability of the outlet valvular means is an important aspect of the present invention, and that thus characterized valvular types and designs other than the "butterfly" or "hourglass" arrangement represented in FIG. 3 through FIG. 5 can also be practiced in accordance with the present invention.

Figure 4A:
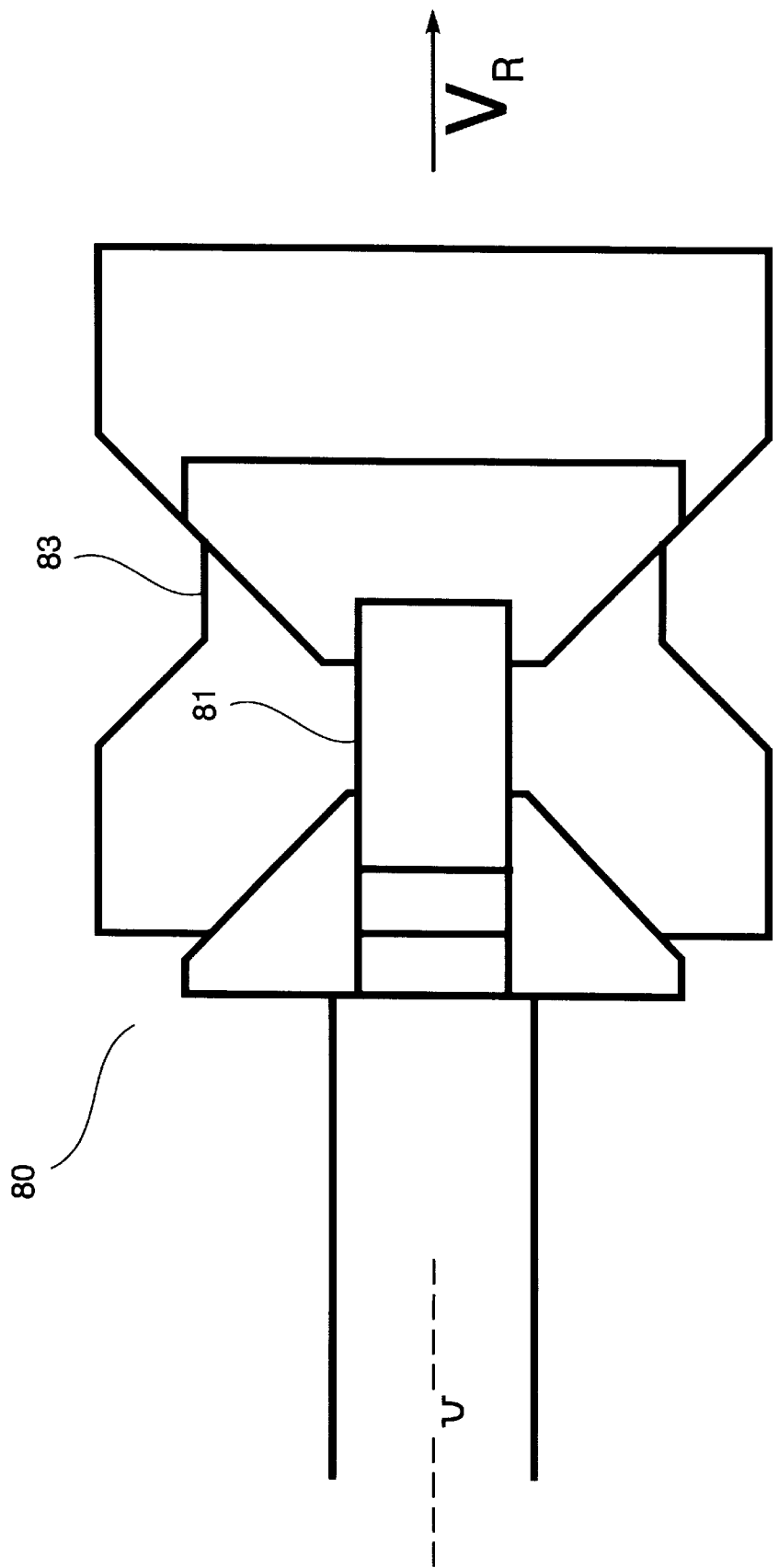

As shown in FIG. 4a, outlet valve 80 is closed (i.e., valve core 81 is in the fully closed position) prior to a collision between a body and the structure. During the first stage of a collision between fender 14 and an incoming marine vessel, outlet valve 80 remains closed for a period of time; during this first stage period, pressure (as measured by pressure sensor 86) increases.

Figure 4C:
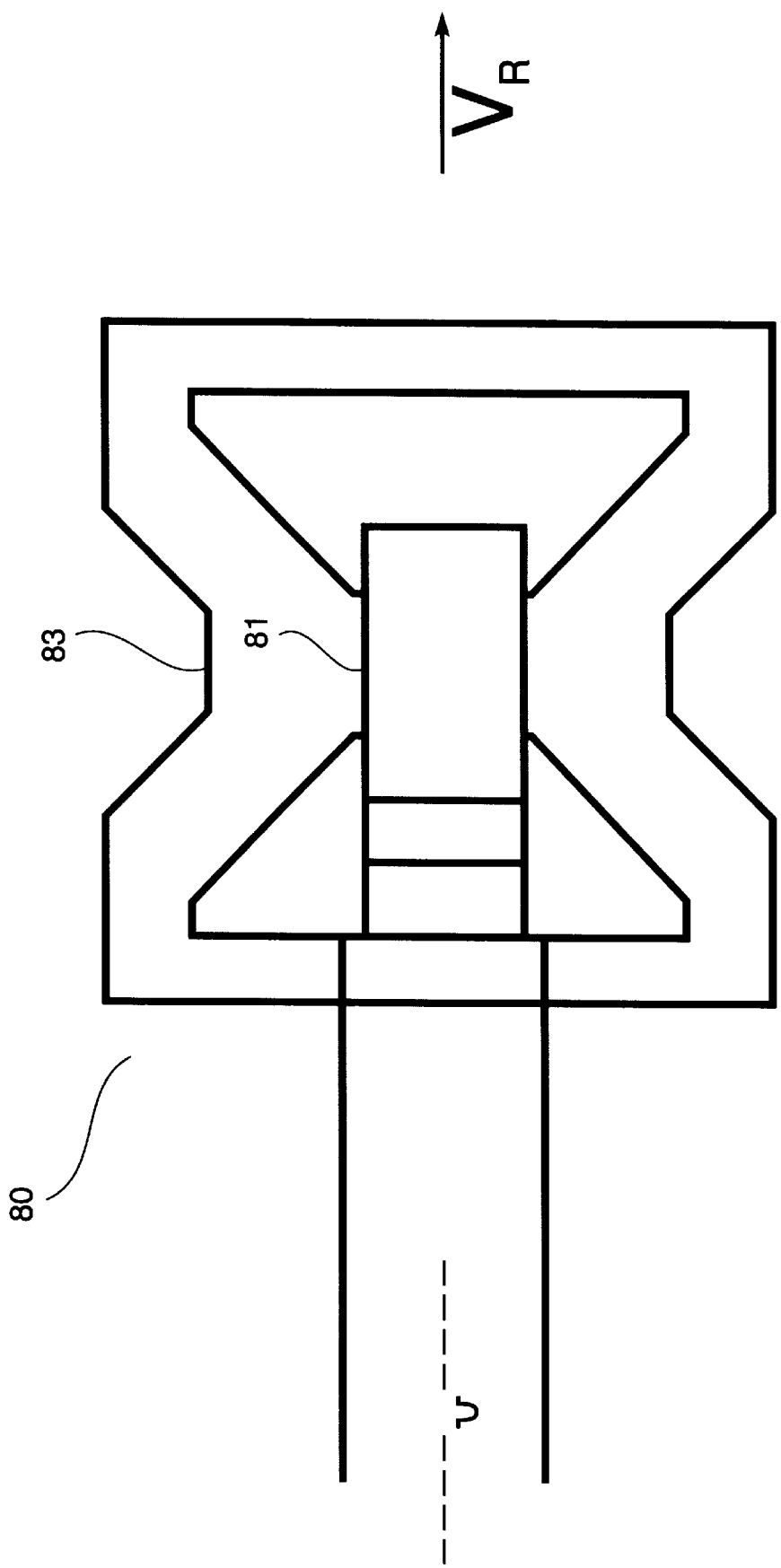

The inception of the second stage is that point in time wherein fluid pressure (as measured by pressure sensor 86) is approximately maximal, whereupon outlet valve 80 opens; that is, valve core 81 moves in valvular axial direction $V_R$ either to a partially open position (such as shown in FIG. 4b) or the fully open position (such as shown in FIG. 4c). During the second stage time period, once outlet valve 80 opens it remains open in static mode.

Figure 4D:
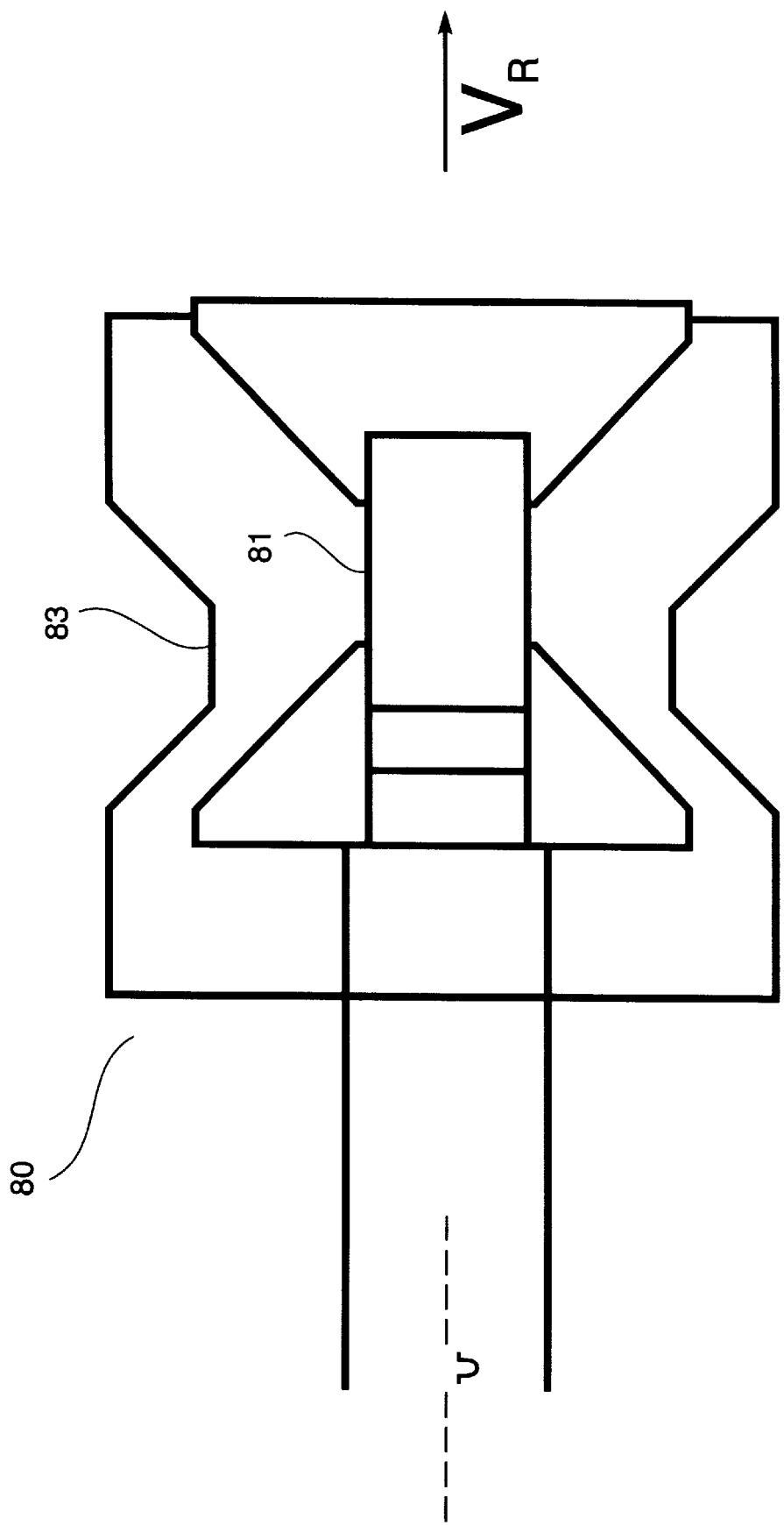

The inception of the third stage is that point in time wherein pressure (as measured by pressure sensor 86) begins to drop, whereupon valve core 81 adaptively moves in valvular axial direction $V_R$ to one or more other partially open positions (such as shown in FIG. 4d). During the third stage time period, outlet valve 80 remains open, in variable mode, so as to adaptively sustain an approximately steady force associated with the collision. In other words, throughout the third stage time period, valve core 81 will move generally in valvular axial direction $V_R$ whereby, in ongoingly adaptive fashion, valve core 81 starts moving (initiates or reinitiates movement), continues to move, and stops moving (ceases movement) in suitable frequencies, speeds and durations—i.e., however fast, however long, and however often as appropriate for effectuating a constant level of marine vessel hull force upon fender 14. At the outset of the third stage, valve core 81 may remain motionless for a brief time period before recommencing movement (such a hesitation being illustrated in FIG. 7).

Figure 4E:
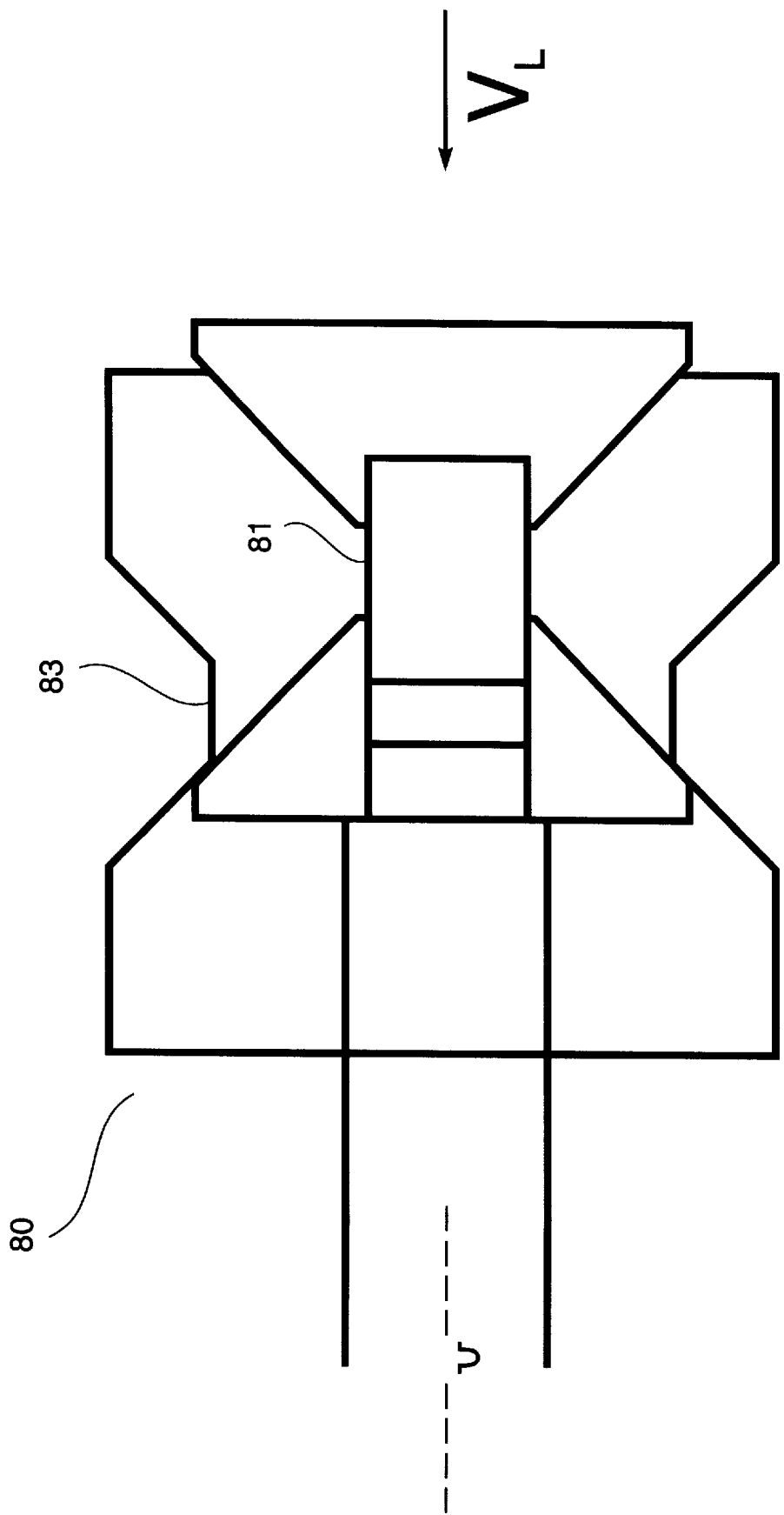

The inception of the fourth stage is that point in time wherein pressure (as measured by pressure sensor 86) begins to precipitously drop toward zero, whereupon valve core 81 moves in valvular axial direction $V_R$ to the fully closed position (such as shown in FIG. 4e). The point at which the measured pressure begins to precipitously drop is approximately correspondent to or approximately concurrent with: (a) the point at which the reaction force begins to precipitously drop; and, (b) the point at which maximum deflection has been reached—i.e., the overall displacement (caused by the marine vessel hull) of fender 14 (e.g., in inches) begins to level off to constancy.

Figure 5:
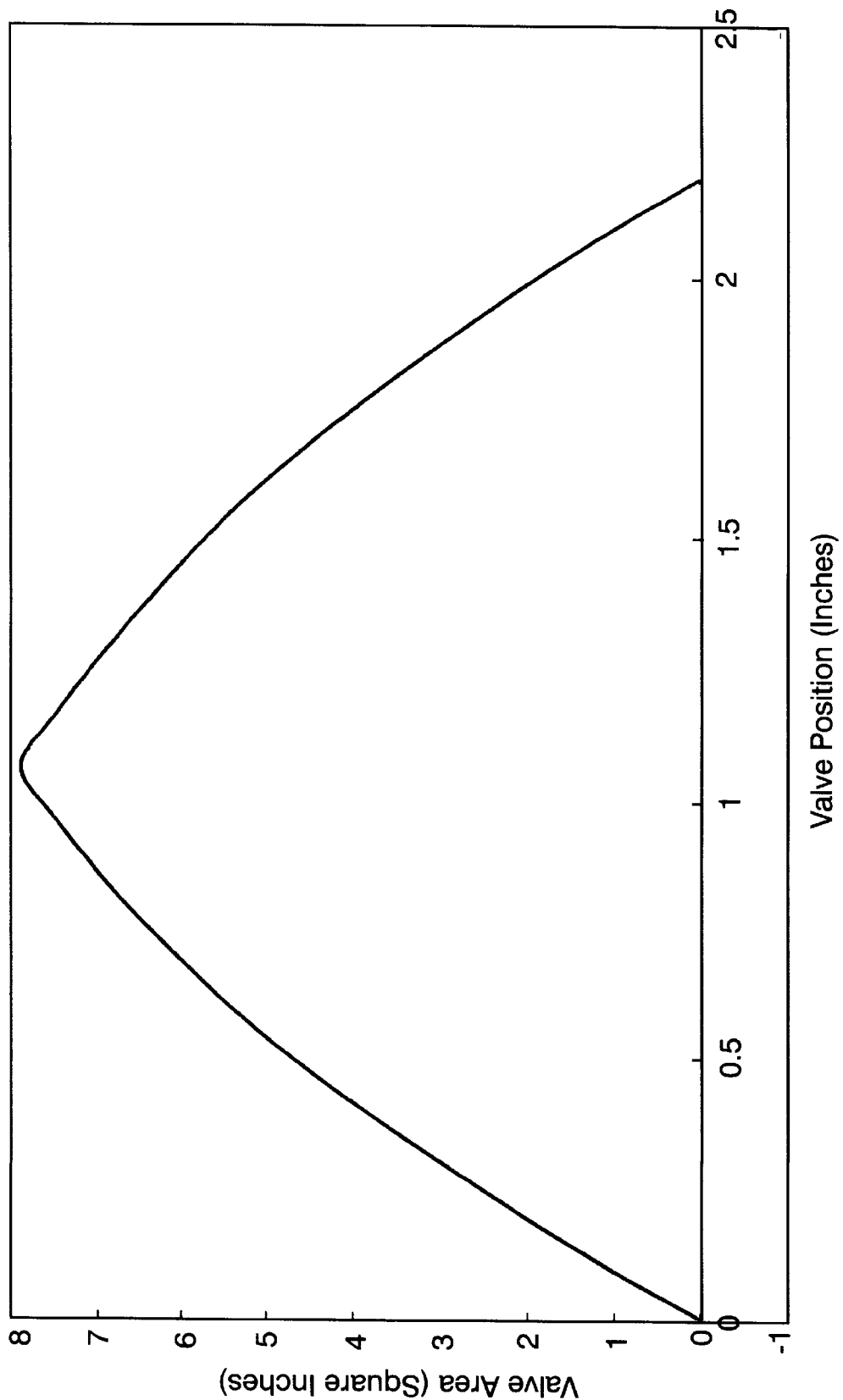
FIG. 5 is a graph representing outlet valve area as a function of valve core position.

As shown in FIG. 5, the position of valve core 81 determines the passable valve area of, and consequently the rate of flow from, outlet valve 80. During the period of pressure maximization, outlet valve 80 undergoes an adjustment of its valve core 81 from a closed position to a particular open position. During the ensuing period of pressure declination from maximum, outlet valve 80 undergoes a continual adjustment of the position of its valve core 81 in such a way that the reaction force of the bumper remains constant. At the two extreme positions of valve core 81, outlet valve 80 is completely closed (i.e., the passable valve area is zero). Each position of valve core 81 corresponds to a specific passable valve area, and hence to a specific flow rate.

After the collision, fender 14 is refilled. Many inventive embodiments provide, for or as part of outlet valve 80, a spring-type mechanism which will force valve core 81 to reposition to the fully open position—i.e., to move in valvular axial direction $V_L$ from the fully closed position (shown in FIG. 4e) to the fully open position (shown in FIG. 4a), whereupon outlet valve 80 is again ready to proceed through the four inventive collisional stages.

Figure 6:
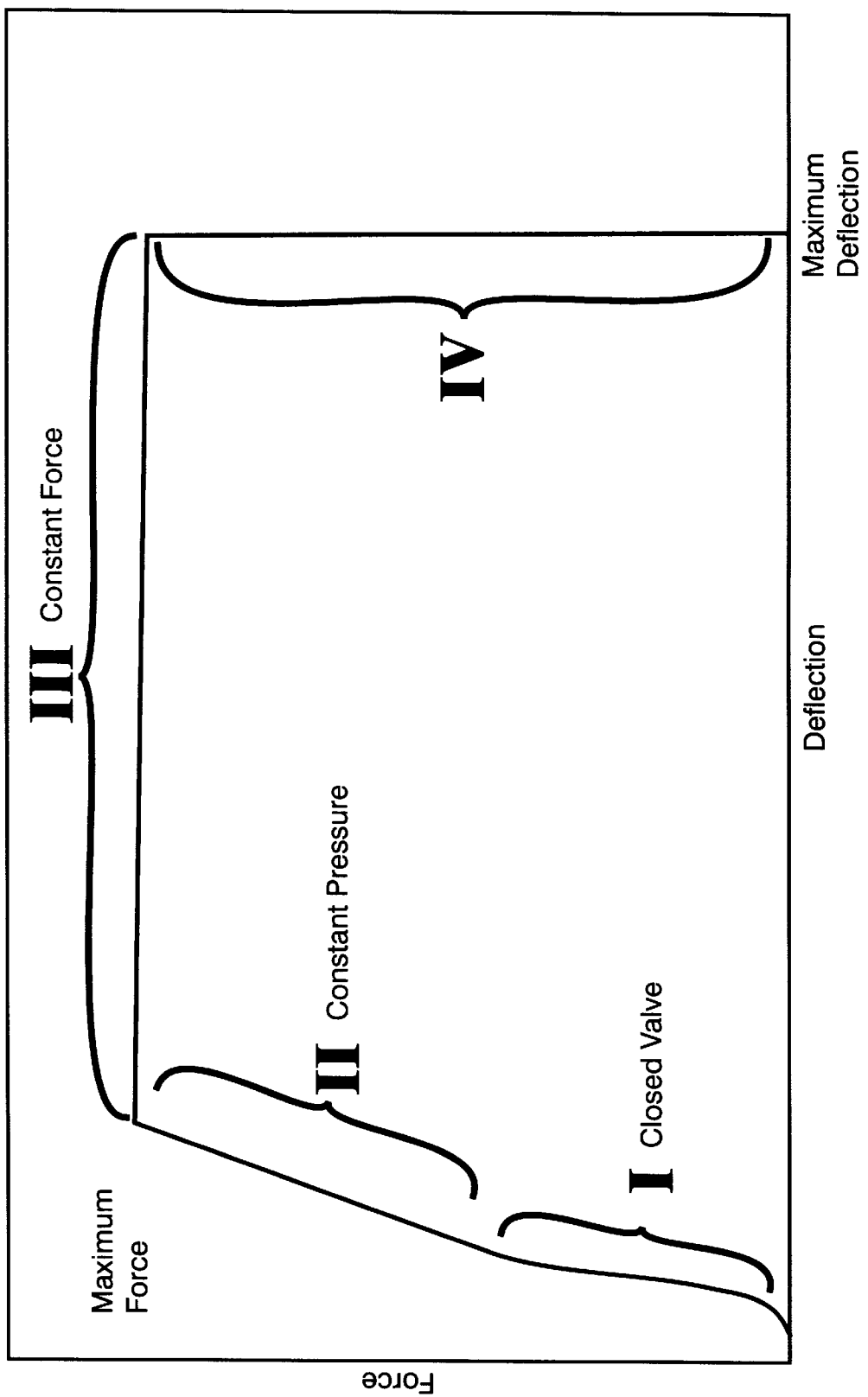
FIG. 6 is a graph representing a target force/displacement curve in relation to the impacting of a body (such as described by the berthing of a marine vessel) with respect to the inventive bumper system.
Figure 7:
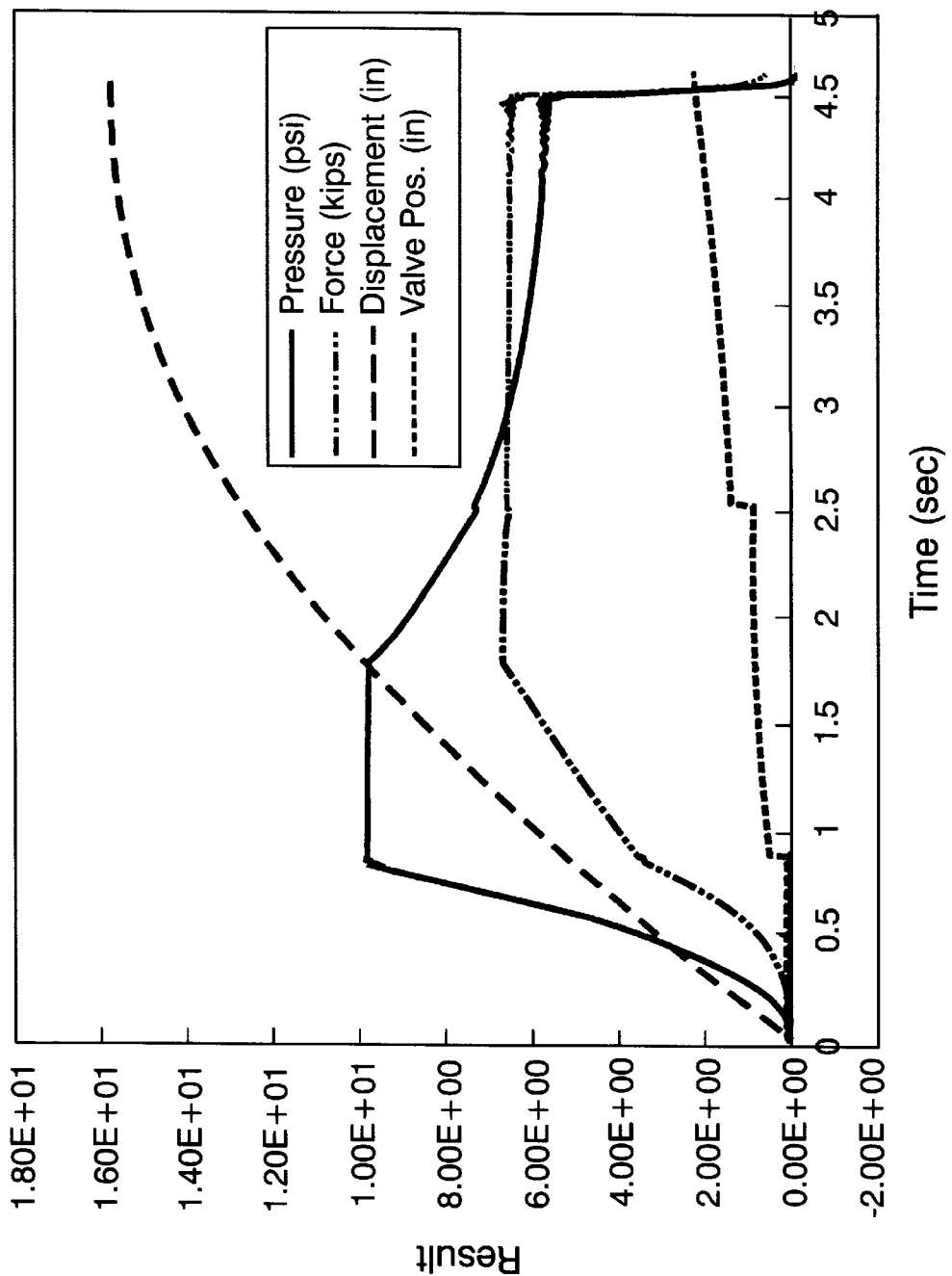
FIG. 7 is a graph representing a simulation of the berthing of a 128,800 lbm ship (four thousand lbm ship in units of lb-sec$^2$/in) at six inches per second.

Still referring to FIG. 4a through FIG. 4e and FIG. 5, and now referring to FIG. 6 and FIG. 7, the four inventive collisional stages are graphically illustrated in FIG. 6 and FIG. 7, respectively, in theory and in practice. FIG. 6 is an idealized profile of an inventive force/displacement curve. The first, second, third and fourth stages are indicated in FIG. 6 by Roman numerals "I," "II", "III " and "IV," respectively.

FIG. 7 depicts simulation results obtained by the U.S. Navy and Production Products Manufacturing & Sales for berthing of ship having an initial velocity approximately equal to 6 inches per second (or 0.34 miles per hour) and a mass approximately equal to 128,800 lbm in conventional engineering units (or 4,000 pounds mass in units of lb-sec$^2$/in; or 772 tons). Pressure (pounds per square inch), force (kips, wherein 1 kip equals 1,000 pounds), displacement (inches) and valve core 81 position (inches) are represented in FIG. 7.

As shown in FIG. 7, roughly speaking, the first stage begins at zero seconds, the second stage begins at about 0.8 seconds, the third stage begins at about 1.6 seconds, and the fourth stage begins at about 4.5 seconds. FIG. 7 shows that, during the beginning of the fourth stage, valve core 81 remains stationary (i.e., valve core 81 pauses) for about 0.9 seconds until commencing movement (at about 2.5 seconds) from its second stage position.

During the first stage, outlet valve 80 is in statically closed mode; the fluid pressure is increasing from zero. Outlet valve 80 is held closed as the pressure increases to the allowable hull pressure. The rate of change in the pressure is also being analyzed during the first state to estimate the effective mass and velocity of the impacting marine vessel.

During the second stage, outlet valve 80 is in statically open mode; the fluid pressure is approximately plateauing at about the maximal value. Fender 14 enters the second stage once the maximum hull pressure is reached. During the second stage, outlet valve 80 is opened to allow some flow in order to maintain the allowable hull pressure until the force required to dissipate all of the kinetic energy in the marine vessel at the maximum fender displacement is reached. The required force is calculated using the mass and velocity estimates from the first stage.

During the third stage, outlet valve 80 is in dynamically open mode; the fluid pressure is decreasing, while the force is approximately plateauing at about its value existing when the fluid pressure commences to decrease at the outset of the third stage. During the third stage, a constant force is maintained until the marine vessel stops. Since the contact area with the marine vessel is constantly increasing, the (fluid) pressure in the fender will decrease throughout the third stage; however, since the flow rate will eventually decrease due to the reduced velocity of the marine vessel, outlet valve 80 will have to adjust—that is, valve core 81 will have to more to one or more less open (more closed) positions in order to maintain the optimal force. The hourglass shape of outlet valve 80 allows this stage three modulation to occur.

During the fourth stage, outlet valve 80 returns to statically closed mode; maximum deflection having been reached, the fluid pressure decreases steeply or precipitously to or toward zero. The fourth stage is characterized by a beneficial anti-rebound effect.

Especially with reference again to FIG. 1 and FIG. 2, generally speaking, during operation of inventive fender system 10, an incoming ship impacts fender 14, whereupon fender 14 impacts restraining wall 16. Basically, a buckling elastomeric composite fender 14 acts as a mechanical force which absorbs energy. A water-filled fender 14 basically acts. to exert a hydrodynamic force in addition to the mechanical force; thus, a water-filled fender 14 creates a standing column of water to absorb energy in addition to that absorbed by the buckling elastomeric composite fender. The loading upon reaction fender 14 and restraining wall 16 is generally expected to occur over a period of several seconds, thus resulting in low loads on both fender system 10 and the ship's hull. Accordingly, the ship is effectively reacted in a forgiving manner. By way of elaboration, inventive fender system 10 essentially functions as described hereinbelow.

Fender 14 is utilized to initially react the incoming ship. Fender 14 is conventional in appearance, having a design, in terms of size and shape, which has been shown to provide an adequate target for the incoming ship. Prior to impact, fender 14 is ready to be deflected (generally in the direction shown by unidirectional arrow i) by a marine vessel which strikes fender 14 (generally in the same direction shown by unidirectional arrow S in FIG. 1).

When the ship begins to impact fender 14, fender 14 begins to partially deform; however, water outlet valve 80 initially remains closed. At a certain point in time, in the time period during which the ship reacts against fender 14, servo valve 82 opens water outlet valve 80. Outlet valve 80 opens once fender 14 is subjected to the maximum hull pressure of the specific ship. When this maximum ship hull pressure is reached, outlet valve 80 opens so that the maximum pressure exerted by fender 14 on the ship hull is constant. Hence, while the ship hull pressure decreases from its maximum level, outlet valve 80 adaptively shifts its open position so that the "pressure" (reaction force) exerted by fender 14 on the ship hull is constant.

Accordingly, as water 90 is forced out of fender 14, fender wall 15 displaces at a constant pressure/force. In this manner, the maximum energy possible is absorbed or dissipated by fender system 10. This pressure/force constancy, along with its associated maximization of energy absorption and dissipation, represents a major improvement of the present invention over existing fender designs. According to inventive fender system 10, fender 14 exhibits a constant stiffness with displacement. In contrast, existing fenders exhibit an increase in stiffness with displacement.

To further explain the operation of inventive fender system 10, while the ship contacts fender 14, microprocessor 84 determines the effective mass and velocity of the ship. Pressure sensor 86 is monitored by microprocessor 84 whereby estimates pertaining to the mass and velocity are continually updated based on new information. The current approach by the U.S. Navy and Production Products Manufacturing & Sales Company, Inc. has involved estimating the kinetic energy and momentum of the ship after each time step. While inventive fender system 10 is estimating the mass and velocity, it is using this information to control the position of valve core. 81 in fender 14.

Outlet valve 80 is designed to begin opening immediately after the pressure exerted by the ship reaches a predetermined maximum hull pressure. As outlet valve 80 opens, water 90 is forced out of fender 14. The controlling of the position of outlet valve 80 enables fender 14 to exert a constant hull pressure/force until the ship is brought to a stop. This control enables inventive fender system 10 to dissipate the maximum energy possible.

Immediately after the ship is completely stopped, outlet valve 80 closes so that the ship does not rebound. Fender 14 does not return to its extended position when the ship's motion ceases. This valve closure capability, along with its associated rebound avoidance, represents yet another major improvement of the present invention over existing fender designs. In contrast, existing fenders return to their original shape and thereby rebound the marine vessel.

"Phase II" Testing

The inventive fender system according to related application Crane et al. '007 was developed during "Phase I" of the above-noted SBIR contract between the U.S. Navy and Production Products Manufacturing & Sales. The inventive fender system according to the instant application was developed during "Phase II" of the SBIR contract. Pursuant to the SBIR contract, a similar series of tests was conducted during each phase of the contract.

During SBIR "Phase II," a one-half scale demonstration apparatus was built and implemented to demonstrate the operation of inventive fender system 10. The demonstration apparatus included inventive fender system 10 and a hydraulic loading system which was used for simulating the berthing of a ship. Inventive fender system 10 was loaded at varying rates and put through numerous cycles, in order to assess the control characteristics of inventive fender system 10.

The hydraulic loading system included a large wooden platform attached to a hydraulic actuator through a lever arm arrangement. Inventive fender system 10 was loaded by a paddle which was mounted on a hinge which was connected to the test floor. The paddle provided a large, flat loading panel to simulate the side of a ship hitting fiber-reinforced urethane fender 14. The hydraulic loading system was capable of moving the paddle up to speeds of about three miles per hour. A series of tubes to allow the water to be forced out of fender 14 was run from the smart valve assembly to some water containers.

In these initial "Phase II" trials, the prototype bumper developed in "Phase I" was retrofitted with a computer-controlled valve. The overall "smart" valve concept in accordance with the present invention was validated in these tests. It was demonstrated that the outlet valve could be controlled with a simple, off-the-shelf solenoid valve and microprocessor, and that the size and speed of the impacting ship could be detected by analyzing pressure changes in the bumper. It was shown that the desired load/deflection behavior could be obtained with further development of the control algorithm. Repeated tests on the E-Glass/polyurethane bumper showed that it has the ability to return to its original shape after severe distortion/deflection.

Accordingly, the superior performance of the inventive "smart" bumper has been demonstrated in these initial "Phase II" trials. The inventors plan to test a second generation prototype inventive "smart" bumper in the near future. The second generation prototype includes utilization of inflatable tooling with a foam shell to create a monocoque structure which will be less expensive to manufacture and which will provide exceptional long-term performance. The inventive smart valve concept is essentially the same as in the earlier prototype, but this inventive version will be fabricated from PVC and mounted internally.

Control Algorithm

Again with reference to APPENDIX Y, a computer algorithm has been written to simulate the operation of the inventive fender system. This inventive algorithmic software shows the ship hull speed, the energy dissipated, and the smart valve position. Such an algorithm can be used to determine the maximum energy dissipation possible for the given design. Therefore, the inventive fender system could afford appropriate berthing for numerous ship classes.

In addition, the inventive fender system will make it possible to maintain records of the force exerted on the pier structures, in order to establish repair schedules. More detailed discussion of the inventive control algorithm follows hereinbelow.

Threshold Pressure Prediction

Hourglass outlet valve 80 on fender 14 begins in a closed position. After a ship impact is detected (currently by reading an internal pressure greater than 1.0 psi), outlet valve 80 is held closed until the desired pressure is reached. This will be the allowable hull pressure, unless it is determined that a lower pressure will be adequate to stop the ship. In order to cause the pressure to stabilize at this level, valve core 81 should be set to the appropriate location on valve shaft 83 so as to maintain the hull pressure at the expected flow rate when that pressure is reached. The time at which the hull pressure will be reached must be anticipated in order to open servo valve 82 ahead of time so as to allow this to occur; this anticipation is accomplished by microprocessor 84.

Pressure values above 1.0 psi are recorded and a nonlinear regression analysis is performed to determine, in the following pressure-time relationship, the values of the coefficients $\alpha$ and $\beta$ which give the best fit to the data:

$$P=\beta t^\alpha$$

These coefficients are then used to predict the time at which the hull pressure will be reached.

A second relationship is under development to determine the servo valve 82 "open time" required to change the position of valve core 81 by a desired amount. The open time is a function of:

the current pressure, p;

the current valve core position, $vp_o$;

the current valve core velocity, $v_o$; and, the desired change in valve core position, $\Delta vp$.

Multivariable regression analysis was performed on preliminary test data to develop the following relationship:

$$\text{Open Time}=(-0.00103p-0.00947v_o+0.0239vp_o+0.245\Delta vp+0.0306)(1/1.385)$$

When the required open time is less than the predicted time to reach the hull pressure, servo valve 82 is opened for the required time.

Valve Core Velocity Control

With the current inventive servo valve system, it is not possible to close the servo valve while the flow rate exceeds a critical level. This flow rate is proportional to the velocity of the valve core.

A step was added to the control algorithm to automatically close the servo valve when the velocity of the valve core exceeds the selected, critical value. These checks maintain control of the valve core.

Mass/Velocity Prediction

In order to create a fully adaptive fendering system in accordance with the present invention, the fender must be able to detect the effective mass and velocity of the ship and to automatically adjust its response to produce the optimum load/deflection response. In order to minimize cost and maximize reliability, this should be accomplished with a minimum level of instrumentation. Instrumentation on the current fender design includes a transducer (pressure sensor) monitoring the fender pressure, and a linear potentiometer measuring the valve core position.

In theory, the two unknowns (mass and velocity) could be calculated using simple physics with a couple of pressure readings. In practice, however, since some noise will be experienced in the pressure readings and the force acting on the ship can only be estimated from the fender pressure and valve opening history, mass and velocity can only be estimated, and the estimates must be continually updated based upon new information.

The current inventive approach involves estimating the kinetic energy and momentum of the ship after each time step; this is done by the microprocessor. Changes in these values between three points in time can be used to calculate the mass and initial velocity. Various averaging schemes are being evaluated at this time to provide the most robust estimate of mass and velocity at the earliest possible time in the docking.

Simulation

A simple time domain simulation program was developed to test the control algorithm. In the simulation, a mass and initial velocity of the ship are selected along with other system parameters such as fender dimensions, hull pressure, and valve geometry.

One "loop" in the program calculates the actual response of the docking ship using simple physics relationships. At the same time, another section of the program reads the current pressure in the simulated fender—adjusted by some level of random noise—and attempts to: (i) determine the mass and velocity; (ii) make servo valve opening/closing decisions; and, (iii) cause the simulated ship to stop at the maximum allowable deflection of the fender. The simulation is still under development, and more realism is being added to model each component of the system accurately.

Reference again being made to FIG. 7, shown in the graph are the results of one simulation based on the characteristics of the current inventive subcomponent fender system. This berthing involves a 4,000 lbm (772 ton) ship having an initial velocity of 6 in/sec (0.34 mi/hr).

The allowable hull pressure is 10 psi and the target deflection if the fender is set at 16 inches. As the pressure approaches 10 psi (0.8 seconds), the outlet valve is allowed to open to a position at which this pressure can be maintained. Minor adjustments to the valve core position allow this pressure to be maintained until a cross-over point is reached (2.5 seconds) where the valve core must begin to close in order to maintain the same force level. At this point the valve core must move past the halfway point of hourglass-shaped valve shaft so that the outlet valve will begin to close as the valve core displaces farther.

During the constant pressure phase (0.8 to 1.8 seconds) the control algorithm is continuously updating the estimates of the mass and velocity of the ship. When the force reaches a level at which the ship can be stopped within the remaining allowable deflection, the pressure is allowed to drop in order to maintain this force as the contact area increases. In this simulation the maximum deflection reached 16.28 inches—about ¼ inch from the target value.

A more realistic model of the outlet valve/servo valve dynamics which includes uncertainty is currently being added to the simulation. The results are not expected to be as smooth as in the current simulation; however, these results have demonstrated the capability of the current approach to produce the desired response.

Fiber-Reinforced High Strain-To-Failure Viscoelastic Matrix Material

Crane et al. U.S. Pat. No. 5,744,221 issued Apr. 28, 1998, entitled "Flexible High-Damping Composite Structures and Fabrication Thereof," incorporated herein by reference, disclose unique composite structures which are made using conventional resin transfer molding ("RTM") technique or conventional filament winding technique. According to Crane et al. U.S. Pat. No. 5,744,221, high strain-to-failure viscoelastic material (such as, for example, polyurethane or polyurethane/urea) is used as the matrix material in association with conventional RTM or conventional filament winding; i.e., fiber fabric material or individually stranded fiber tow material is used as the fiber reinforcement material for high strain-to-failure viscoelastic matrix material. The structures disclosed by Crane et al. U.S. Pat. No. 5,744,221 afford desired structural performance and superior performance in terms of flexibility, damping and damage-tolerance.

Crane et al. U.S. Pat. No. 5,654,053 issued Aug. 5, 1997, entitled "High-Energy-Absorbing Enclosure for Internal Explosion Containment," incorporated herein by reference, adopts the teachings of Crane et al. U.S. Pat. No. 5,744,221, particularly insofar as such teachings pertain to the making of composite structures using conventional RTM and the use of fiber fabric material as the fiber reinforcement material for high strain-to-failure viscoelastic matrix material. Crane et al. U.S. Pat. No. 5,654,053 disclose utilization of polyurethane as a highly viscoelastic matrix material, having strain-to-failure of 400% to 500%, compared to a conventional polymer used in composites which has a strain-to-failure on the order of 5% to 10%. Crane et al. U.S. Pat. No. 5,654,053 also disclose utilization of polyurethane in combination with urea ("polyurethane/urea") as a highly viscoelastic matrix material having properties similar to polyurethane alone. The disclosure of Crane et al. U.S. Pat. No. 5,654,053 uniquely features utilization of fiber-reinforced high strain-to-failure viscoelastic matrix material in the context of explosion containment.

The present invention, like related application Crane et al. '007, uniquely features utilization of fiber-reinforced high strain-to-failure viscoelastic matrix material in the context of impact absorption. This invention adopts the teachings of Crane et al. U.S. Pat. No. 5,744,221, particularly insofar as such teachings pertain to the making of composite structures using conventional filament winding and the use of individually stranded fiber tow material as the fiber reinforcement material for high strain-to-failure viscoelastic matrix material. Filament wound fiber-reinforced high strain-to-failure viscoelastic matrix material comprises a plurality of single-stranded tows and high strain-to-failure viscoelastic matrix material contiguously disposed in relation to at least some of the tows. The fiber-reinforced high strain-to-failure viscoelastic matrix material can be deformed elastically to large strains, has demonstrably high energy-absorbing characteristics, and is relatively lightweight.

The elastic properties and other beneficial properties of fiber-reinforced high strain-to-failure viscoelastic matrix material avail the present invention. This invention uniquely configures at least one bumper structure (such as reaction fender 14) which is inclusive of fiber-reinforced high strain-to-failure viscoelastic matrix material so as to provide a highly effective system for impact absorption.

Filament winding is a technique which is known in the art for the manufacture of cylindrical structures (e.g., tubes and pipes), spherical structures, and other surfaces of revolution. Typically, the filament winding process involves utilization of a resin bath through which dry fibers are passed and then wound; this type of filament winding is known as "wet winding." In this technique the wind angle, band width and tow tension are controlled. Alternatively, the filament winding process typically utilizes prepreg tape in favor of wet winding technique in order to achieve tighter control on fabricated properties. The filament winding art has conventionally utilized, for structural applications, fibers having appropriate strength characteristics (e.g., glass or carbon fibers) in conjunction with a conventional (e.g, epoxy) resin matrix.

Inventive implementation of conventional filament winding technique advantageously permits precise selectivity of the fiber, content of each composite structure in terms of both fiber volume fraction and fiber orientation; hence, the inventive bumper system uniquely lends itself in these respects to modulation or "fine tuning" in accordance with system requirements.

In inventive practice, the structural considerations for most embodiments will require that each composite structure have a fiber content of at least about 50% by volume. For many inventive embodiments, the content in each composite structure of the single-stranded tows is preferably in the range from about 50% to about 70% by volume.

Besides fiber volume fraction and fiber orientation, other inventive bumper system parameters which can selectively be varied or adapted in accordance with application requirements include: size and shape of each composite structure; matrix material for each composite structure; number and arrangement/configuration of the composite structures; the internal contents of each composite bumper structure.

According to this invention, reaction fender 14 is made via filament winding using highly viscoelastic material so as to have a high fiber volume and no core. The fiber-reinforced high-strain-to-failure matrix material has unique absorption properties, can be deformed severely and still return to it's original shape, and has excellent damage tolerance and abrasion resistance. Highly viscoelastic matrix material performs very well at large strains and, in general, exhibits a remarkable ability to return to form. Although highly viscoelastic matrix material suffers from an initial loss of stiffness when subjected to large tensile strains, this material can then be cycled extensively with little further degradation.

The terms "high strain-to-failure viscoelastic material" and "highly viscoelastic material" are used herein interchangeably. The word "highly" in the term "highly viscoelastic material" is defined by either of two characteristics, viz., either "strain-to-failure" or "loss factor." A "highly viscoelastic material," as defined herein, is a viscoelastic material which either (a) has a loss factor in the range between about 0.4 and 0.8, or (b) has a strain-to-failure in the range between about 300% and 500%. Since a "high strain-to-failure viscoelastic material" (i.e., as defined herein, a viscoelastic material having a strain-to-failure in the approximate range of 300% to 500%) will virtually invariably have a loss factor in the approximate range of 0.4 to 0.8, and vice versa, the terms "high strain-to-failure viscoelastic material" and "highly viscoelastic material" are considered herein to be synonymous.

The term "fiber-reinforced highly viscoelastic matrix material," as considered herein, is synonymous with the term "fiber-reinforced high-strain-to-failure viscoelastic matrix material" and refers to composite material which includes fibers and highly (high strain-to-failure) viscoelastic matrix material which are, to a substantial degree, in a contiguous relationship; i.e., fiber-reinforced highly (high-strain-to-failure) viscoelastic matrix material is fiber-reinforced matrix material wherein the matrix material is highly (high strain-to-failure) viscoelastic matrix material.

Stated on page one (first paragraph) of Read, B. E., & Dean, G. D., *The Determination of Dynamic Properties of Polymers and Composites*, John Wiley & Sons, New York, 1978 is the following: "The low-strain mechanical behaviour of unreinforced and reinforced polymeric materials may be described as viscoelastic. In response to forces which vary sinusoidally with time their deformations will also be sinusoidal but, even at frequencies well below those required to excite sample resonance vibrations, will lag in phase behind the applied loads. The dynamic properties may then be specified by means of two basic quantities. One of these quantities, the dynamic storage modulus, provides a measure of the effective stiffness of the material and is proportional to the peak energy stored and recovered during each cycle of deformation. The other quantity, known as the loss factor or damping factor, is proportional to the ratio of net energy dissipated per cycle as heat to the peak stored energy." In accordance with Read et al.'s definition of "viscoelastic" as thus quoted, a "highly viscoelastic material" is suggested to be a viscoelastic material wherein the deformations significantly lag behind the applied force; this correlates with a material which has high damping.

With regard to damping and particularly with regard to loss factor, conventional metals have a loss factor of about 0.001. Structural composites have a loss factor in the approximate range of 0.007 to 0.015. A "lossy rubber" has a loss factor in the approximate range of 1 to 10; see Read et al., pages 190–195. A lossy rubber is a highly viscoelastic material which has virtually no structural characteristics and is used solely as a parasitic damping treatment (i.e., an add-on material). Highly viscoelastic materials having structural characteristics have a loss factor in the approximate range of 0.4 to 0.8, which is significantly higher than the loss factor for most structural materials but not as high as the loss factor for lossy rubber materials. These characterizations of materials are known to persons of ordinary skill in the art.

With regard to strain-to-failure, there are two types of organic matrices, viz., "thermoplastic" and "thermoset."

For thermoplastic systems, the range of strain-to-failure is approximately 4% to 60%. For thermoset systems, the range of strain-to-failure is approximately 1.5% to 5%. Nicholls, David J., "Effect of Stress Biaxiality on the Transverse Tensile Strain-to-Failure of Composites, Whitney, James M., Editor, *Composite Materials: Testing and Design* (*Seventh Conference, Philadelphia*, 1984), American Society for Testing and Materials, Philadelphia, 1986, pages 109–114, is instructive regarding comparison of conventional thermoplastic and thermoset systems in terms of strain-to-failure.

For thermoplastic composites, the absolute upper limit of strain-to-failure for conventional matrix materials is about 95% (see Nicholls, page 112, Table 1) or about 100% (see Nicholls, page 109, abstract: "Thermoplastic matrices are now available with neat resin strain-to-failure values of up to 100%.").

The ordinarily skilled artisan knows that conventional thermosets include polyester, vinylester and epoxy. Typical thermoplastics are known by the ordinarily skilled artisan to include PPS (polyphenylene sulfide), PEEK (poly ether ether ketone) and PEI (polyetherimide). These material systems are known to the ordinarily skilled artisan as conventional matrix composites.

The term "high strain-to-failure viscoelastic" is used in the instant disclosure to define a distinct genre of material which, according to the invention, is to be used as matrix material. The range of strain-to-failure for high-strain-to-failure viscoelastic materials is about 300% to 500%, more typically about 350% to 450%; this 300% to 500% strain-to-failure range represents a quantum jump vis-a-vis the strain-to-failure range for conventional matrix materials.

The aforedescribed disparity in terms of strain-to-failure for "conventional" materials versus "high strain-to-failure viscoelastic" materials is well understood in the art. Hence, the contradistinctive delimitations of the terms "conventional matrix material" and "high-strain-to-failure viscoelastic matrix material" are readily appreciated by the ordinarily skilled artisan who reads the instant disclosure.

Utilization of viscoelastic material as matrix material is disclosed by the following U.S. Pat. Nos: 4,954,377; 5,108,262; 5,308,675; 5,447,765. Fisher and Crane U.S. Pat. No. 4,954,377 disclose utilization of a highly viscoelastic material such as, for example, butyl or nitrile rubber, or any other highly viscoelastic material, that exhibits molecular interaction when subjected to shearing forces. Fisher and Crane U.S. Pat. No. 4,954,377 disclose that the general characteristics of the viscoelastic material in the cured condition are such as exhibit a capacity to withstand a high strain to failure and a high damping loss factor. Crane U.S. Pat. No. 5,108,262 discloses utilization of a highly viscoelastic matrix material such as urethane, polyurethane, nitrile rubber, or other such material having a high vibration damping loss factor. Crane et al. U.S. Pat. No. 5,308,675 disclose utilization of viscoelastic material including rubber such as natural and nitrile rubber, urethane, polyurethane, and other high strain to failure material (strain to failure greater than 60%) and which have a high damping loss factor (greater than 0.1).

Fender Fabrication

Now with reference to FIG. 8, FIG. 9 and APPENDIX Z, an important aspect of the manufacture of the inventive fender is that it preferably be made in one piece. A one-piece fender (such as a one-piece fender 14) would probably be preferable for many inventive embodiments, especially in terms of production costs and structural performance optimization. Therefore, pursuant to the above-noted SBIR contract between the U.S. Navy and Production Products Manufacturing & Sales, a new manufacturing method was devised for making an inventive fender having a cylindroid shape (cylindrical with tapered ends).

Referring to FIG. Z-1, according to related application Crane et al. '007, the cylindrical shape with tapered ends was wound and cut to allow the removal of the mandrel. The two sections were then bonded together using a winding technique. However, since the present invention requires the containment of water under pressure, the present inventors believe that an adhesively bonded system is not desirable for practicing the present invention. The inventive method described herein produces a unitary or one-piece bumper structure which is better suited to withstand the rigors of present inventive practice.

Referring to FIG. 8, FIG. 9 and FIG. Z-2, according to the inventive method for fabricating the present inventive fender, the present inventors designed and manufactured a collapsible, reusable mandrel 98, over which the fiber-reinforced urethane could be wound, but which could then be removed after the part was cured. Collapsible mandrel 98 was made so as to include a rubber-coated or "rubberized" cloth. The cloth material was combined with an elastomeric material so that mandrel 98 would have a fluid tight quality. The elastomerically imbued cloth was sewn in sections with a rib structure configuration; this was necessary to provide enough support for the filament winding process.

Mandrel 98 was attached to a central steel pipe 92 which had a fitting (not shown) for applying air and was capped at both ends. Mandrel 90 functioned like an inflatable bladder, not unlike one which is commonly found enclosed in a football. After inflating mandrel 98, a foam (e.g., polyurethane) layer 94 was attached to the outside of mandrel 98, using velcro strips (not shown) which were bonded to the exterior surface of mandrel 98. A circumferential collar 96 kept the assembly in place. The fiber-reinforced urethane was then wound over foam layer 94. After this material was allowed to cure, the rubber-coated cloth mandrel 98 was deflated and removed, such as photographically depicted in FIG. Z-2.

As shown in FIG. 8 and FIG. 9, foam layer 94 served as a sort of "casing" for the bladder-like mandrel 98, which was held to shape by foam layer 94 in a manner analogous to the containment of the internal bladder by the external "pigskin" of a football. Some inventive embodiments provide, instead of a foam casing 94, a leather or canvas casing 94 which is stitched together to provide the final shape of the bumper component (e.g., fender 14). Once the bumper is made, mandrel 98 and pipe 92 are removed from the bumper; however, depending on the inventive embodiment, casing 94 can either remain with the bumper, or be removed and reused.

After the filament winding was completed (thus leaving an inventive composite cylindroid bumper structure similar to that shown in FIG. Z-1), a six-inch diameter PVC (polyvinyl chloride) pipe was attached to the axial ends of the cylindroid bumper structure; the PVC pipe was passed through the holes where the inflatable mandrel had been removed. A microprocessor, a solenoid-type servo valve and an outlet valve (at one end of the PVC pipe) were installed inside the circumference defined by the PVC pipe, whereby the outlet valve was situated at one axial extreme end of the PVC pipe, and the servo valve and microprocessor were situated in relatively close proximity to the outlet valve. A non-valvular plug assembly was used to close out the other axial extreme end of the bumper structure. Alternatively, it may be preferable that a safety valvular plug assembly, such as plug assembly 48 which includes pressure relief valve 49 shown in FIG. 2, be used to close out the other axial extreme end of the bumper structure.

Current plans by the U.S. Navy and Production Products Manufacturing & Sales Company, Inc. call for the fabrication of full scale bumpers which are about four feet in diameter and between about eight to ten feet in axial length.

Fender Shape

In accordance with the present invention, a reaction fender can be any hollow composite structure, containing material which is gaseous or liquid, having a circumferential surface about its imaginary longitudinal axis, and including fiber-reinforced high strain-to-failure viscoelastic matrix material. A structure which is said herein to have a circumferential surface about its longitudinal axis is intended herein to refer not only to a structure having a curvilinear surface which is axially symmetrical about a longitudinal axis, but to also refer to a structure having a generally curvilinear surface or a substantially curvilinear surface which is generally symmetrical or substantially symmetrical about a longitudinal axis.

Although the method, apparatus and system according to this invention admit of application to structures having aspects of asymmetricality and rectilinearity, many applications thereof preferably are for structures which substantially are axially symmetrical structures and hence better advance the fabrication, analysis, tailoring and system mechanics in accordance with this invention. Such structures include those of which a substantial portion is, approximately, a circular cylinder (e.g., fender 14 shown in FIG. 1 and FIG. 2 see also, FIG. Z-1 of APPENDIX Z), non-circular (e.g., flattened, oblate or elliptical) cylinder, circular conical segment, non-circular (e.g., flattened, oblate or elliptical) conical segment, sphere, prolate sphere, circular spheroid, non-circular (e.g., flattened, oblate or elliptical) spheroid, circular ellipsoid and non-circular (e.g., flattened, oblate or elliptical) ellipsoid. The circumferential planar cross-sections for these axially symmetrical structures are approximately either circular or non-circular (e.g., flattened, oblate or elliptical). A "cylindroid" structure is one of which a substantial portion approximately is a circular cylinder or a non-circular cylinder.

Many composite bumper structures for which the present invention may be practiced have shapes which are substantial or general analogues of these axially symmetrical shapes and which lend themselves to fabrication via conventional filament winding technique. Even rectangular and other entirely rectilinear structural shapes admit of practice in accordance with the present invention, lending themselves to fabrication via conventional RTM technique; such rectilinear bumpers would preferably have an identifiable axis of virtual symmetry so as to promote fabricability, tailorability, analyzability and mechanical viability in accordance with the teachings of the present invention.

Other embodiments of this invention will be apparent to those skilled in the art from a consideration of this disclosure or practice of the invention disclosed herein. Various omissions, modifications and changes to the principles described may be made by one skilled in the art without departing from the true scope and spirit of the invention which is indicated by the following claims.

APPENDIX X

Elastomeric Composite Bumpers

2nd Quarterly Progress Report
19 May 97 thru 18 August 97

Production Products Manufacturing & Sales
1285 Dunn Road
St. Louis, MO 63138
(314)868-3500
Principal Investigator: Kelli Corona-Bittick
Engineering Sponsored by:
Office of Naval Research (ONR)
Contract No. N00014-97-C-0117
Contract Effective Date: 18 Feb. 97
Contract Expiration Date: 18 Feb. 99

Distribution authorized to U.S. Government agencies only; report contains proprietary data produced under SBIR contract. Other requests shall be referred to the performing organization listed above.

Table of Contents

|  | Page |
|---|---|
| 1.0 Executive Summary | 3 |
| 2.0 Technical Progress | 4 |
| 2.1 Task 1.0 Final Product Definition | 4 |
| 2.1.1 Workshop on Advanced Fender Systems | 5 |
| 2.2 Task 2.1 Material Characterization | 7 |
| 2.3 Task 2.2.2 Pneumatic Subcomponent Fender | 10 |
| 2.4 Task 2.2.4 Hydraulic Subcomponent Fender | 11 |
| 2.5 Task 2.3 Manufacturing Process Optimization | 20 |
| 3.0 Work to Be Completed Next Reporting Period | 21 |
| Funds and Man-Hour Expenditure Report and Graphs | 21 |
| Appendix A Advanced Fendering Systems Meeting Vu-Graphs | 28 |

1.0 Executive Summary

In this Phase II program, Production Products will be completing the engineering evaluation of our overall Elastomeric Composite EMC bumper system, including the pneumatic/foam/hydraulic internal system, to provide detailed engineering design and data generation to allow tailored design of EMC bumpers to meet any bumper design requirements with the load stroke curve optimized and hull load minimized. We will also be demonstrating the high abrasion resistance and damage tolerance of EMC's. We will design, manufacture, and structurally evaluate a full scale EMC bumper system with the best features arising from our engineering prototype evaluation. Our design concept and EMC material development is based on initial work performed at the Naval Surface Warfare Center - Carderock Division (NSWC-CD).

In the Phase II program, Production Products will complete development of the prototype bumper system and develop a new market in the Marine Industry for elastomeric composite bumpers. We will optimize the design, further characterize the system and the material at the subcomponent level, and fabricate and test full scale bumper systems. This will validate and qualify the system for commercialization and sale to harbors, operators, and marine retailers. The objectives of the Phase II program are:

- Further characterize the polyurethane composite material at the coupon level. Perform environmental testing (hot/wet, freezing/thawing conditions, UV degradation, salt water, abrasion).
- Perform detail engineering design and analysis to support optimization of the Phase I bumper system design.
- Fabricate several subcomponent systems for hydrodynamic, pneumatic and foam filled testing for static and dynamic load stroke.
- Develop full scale polyurethane bumper designs, and fabricate 5 systems for structural evaluation and marine evaluation by Navy and commercial users.
- Develop analytical and cost models for polyurethane bumper systems from Phase I and II results.
- Evaluate the results of the marine field tests of the bumper system and identify potential system improvements to be implemented in Phase III.
- Implement the Commercialization Plan to bring the product to market in Phase III.

Figure 1 shows the Phase II program tasks and the program schedule. This seven task approach will insure that a thorough investigation and evaluation of the technical problems and opportunities has taken place.

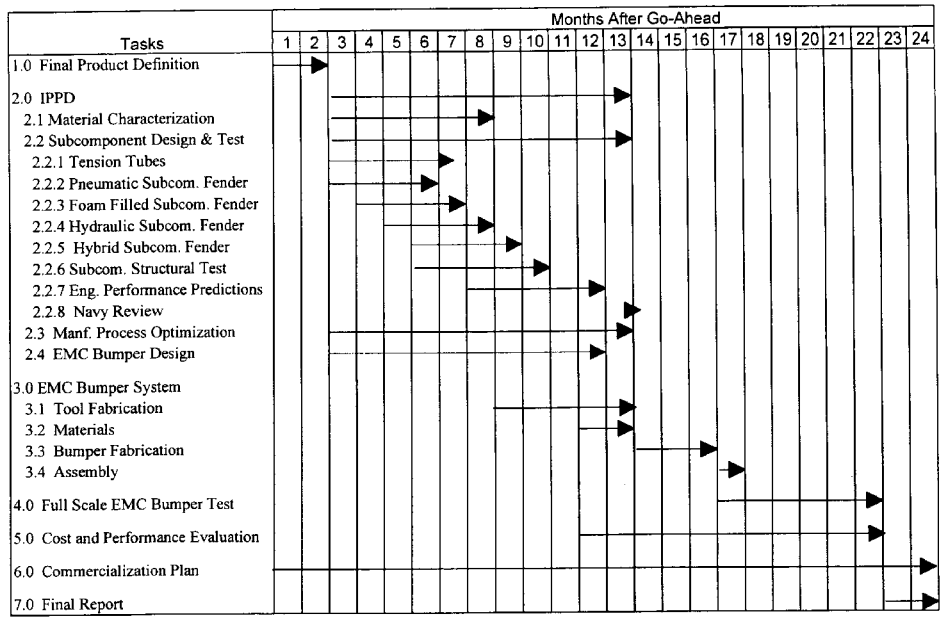

Figure 1 Elastomeric Composite Bumper Program Schedule

2.0 Technical Progress

This report describes the work on the Elastomeric Composite Bumper SBIR, Contract N00014-97-C-0117, accomplished during the period 19 May 97 thru 18 August 97.

2.1 Task 1.0 - Final Product Definition

Before any design development or optimization is considered on the elastomeric composite bumper design, several meetings are being held to review the current marine bumper system requirements and their operating environment with both the Navy and commercial customers (SVEDALA Trellex). The results from these reviews are being used to define final design and cost requirements that serve the markets represented by these end users. These final requirements combined with the subscale prototype design developed and tested in Phase I will serve as a guide in developing the full scale production design in Phase II.

2.1.1 Workshop on Advanced Fendering Systems

A workshop was conducted on the Advanced Fendering Systems Project (AFSP) on May 13 and 14, 1997, in San Diego, California. The workshop was hosted by the Civil Engineering Research Foundation (CERF) under the sponsorship of the US Naval Facilities Engineering Service Center (NFESC). The purpose of the meeting was to identify and refine AFSP system performance requirements using input from both industry and Navy experts. Mr. Jim Dorr, Duke and Associates, attended this meeting.

The objective of the Workshop was to identify and refine performance requirements for fixed and floating fendering systems using advanced materials. The AFSP is intended to develop and demonstrate fender piling and camel systems comprised of virgin plastics, recycled plastics, composites and engineered timber to provide:

- improved fender piles
- wales and chocks
- universal submarine camel
- universal surface camel (except CVN)

This program (6.3 program) is not only addressing pilings but rather the total system to fender Navy ships to protect both the ship and pier from incidental damage caused during berthing operations. The Navy is expecting field trials by the end of the Fiscal year.

The performance requirements for fendering systems previously identified by the Navy to refine include:

- required strength/stiffness
- limiting deflections
- fracture resistance
- abrasion/temperature resistance
- UV/environmental resistance
- pile driving
- lower life cycle cost while camel performance requirements to refine include:

- increased energy absorbing capacity
- vessel compatibility
- reduced maintenance
- lower life cycle cost The Navy ship characteristics that impact the design of advanced fendering systems include:

- thin hull plating
- large displacement range
- pronounced hull curvature
- hull projections
- stealth features such as shape and masking bands
- sonar domes
- hull coatings The following list represents some of the performance requirements identified in the workshop for fendering systems:

- It must be strong enough to resist normal docking and mooring operations without failure and flexible enough to absorb energy and prevent damage to the pier.
- Deflection of the systems is directly related to energy absorption and stiffness and concrete filled composite piles provide greater strength and stiffness. The system should be designed to dampen any forces imparted to the system and return 50% or less of the energy when the system reacts.
- Fracture Resistance of the components need to be proved in a First Article Test designed by the Navy.
- Systems can be coated with polyurethane to reduce friction and lower abrasion.
- Performance temperature range is -20°F to +150°F.
- Ultraviolet resistance should pass UV-A testing developed by NFESC.
- System should have a 25 year life.
- The system should be constructable in the temperature range of 20°F to 110°F.

Camels are floating fenders that serve as an interface between the ship's hull and the berthing structure. The cell structure of composite camels needs to be designed for maximum energy absorption consistent with strength, deformation, and rebound requirements. Carrier camels are currently made of steel. They are heavy and require high maintenance. Port of Norfolk is spending about $250,000 a year maintaining deep draft camels used for submarines.

The following list represents some of the performance requirements identified in the workshop for camels:

- Camels should be designed with no square corners to minimize pile damage.
- Composite camels would allow for improved cross sectional shape for improved energy absorption and greater bearing surface on piles. Length could also be varied with composite.
- The camel, fender, and pier need to be designed as a system to meet the operational needs of the ships intended to berth at that pier. Pier 12 at Norfolk was offered as a demonstration project to test various composite systems and designs for fenders and camels.
- A dual use (surface ship and submarine) camel design is desirable.
- Adjustable (longitudinally and vertically) camels is desirable to accommodate both surface ships and submarines. The camel would essentially be a modification of the existing deep draft camel. Hydropneumatic cushions could be used in conjunction with this camel. They would be deployed in the vertical position partially submerged for submarines and in the horizontal position for surface ships.
- Energy absorbing materials need to be implemented on the ship side and the pier side of the camel.

- The amount of standoff provided by the fendering system should be such that the materials handling equipment available can reach to at least the mid point of the ship being serviced.
- It is not necessary to configure the camel to the shape of the submarine hull.

Representative View Graphs from the meeting are shown in Appendix A.

2.2 Task 2.1 Material Characterization

Material characterization of the glass/polyurethane material system is being performed on 24" long filament wound tension tubes. Two tubes at each of six wind angles (15°, 30°, 45°, 60°, 75°, and 90° nominal) have been fabricated. The 75° tubes have been tested. Each tube is subjected to four test series:

1) Tension tests to 1% strain at 4 strain rates ($5.7 \times 10^{-5}$ in/in/sec, $5.7 \times 10^{-4}$ in/in/sec, $5.7 \times 10^{-3}$ in/in/sec, and $5.7 \times 10^{-2}$ in/in/sec)
2) Tension tests to progressively higher strains (1%, 2%, 4%, and 10%) at $5.7 \times 10^{-4}$ in/in/sec
3) Tension-tension fatigue tests cycling from 1% to 10% strain for 1000 cycles
4) Compression tests to 2% and 4% strain.

All tests are displacement controlled so target strain values are nominal. An effective gage length of 17.5 inches was used to calculate the required displacement to produce the nominal strain. The four strain rates for the first series of tests are produced by crosshead rates of 0.001 in/sec, 0.01 in/sec, 0.1 in/sec and 1.0 in/sec. Axial strain is measured using dual averaging extensometers mounted on the specimen. Circumferential strain is calculated from an extensometer attached to a chain which is wrapped around the specimen.

Results from tests on a 75° material specimen are shown in Figure 2 through 5. These specimens had a 2.0 inch ID with a nominal 2.5 inch OD producing a fiber volume ratio of 50%. The first three figures are the results of tests to about 1% strain at various strain rates. Figure 2 shows the full load history, and Figure 3 has the results during increasing load with a curve fit to the data. The equations of the curve fit lines are superimposed on the plot giving an estimate of the modulus of the material at these strain rates. The modulus increases from 51 ksi to 75 ksi as the strain rate is increased; however, the rate of increase with respect to the log of the strain rate

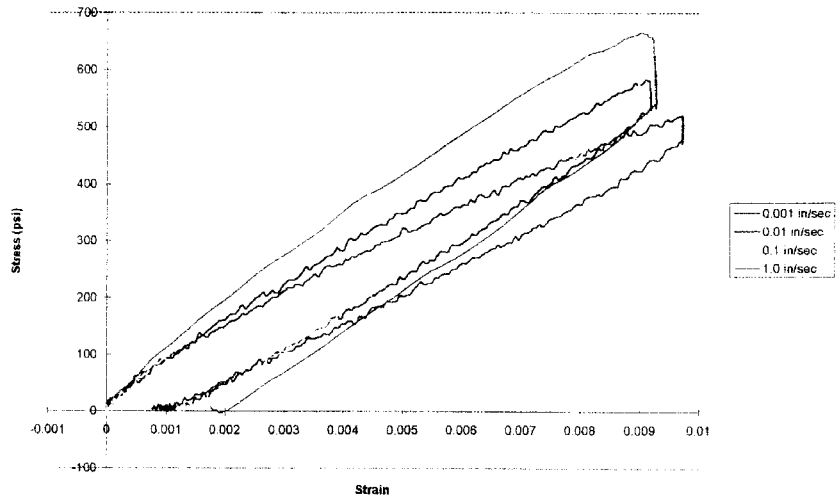
Figure 2 Tension Test Results (Full Load History) of the 75° Glass/Polyurethane Specimens
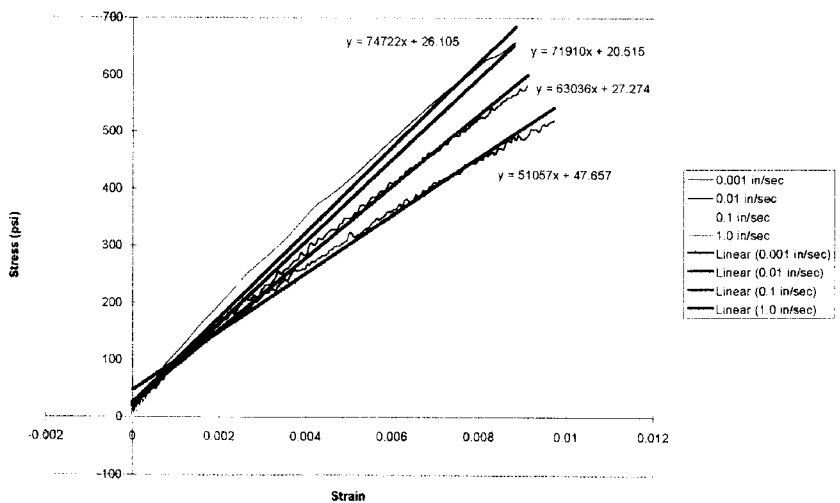
Figure 3 Tension Test Results and Curve Fit of Data

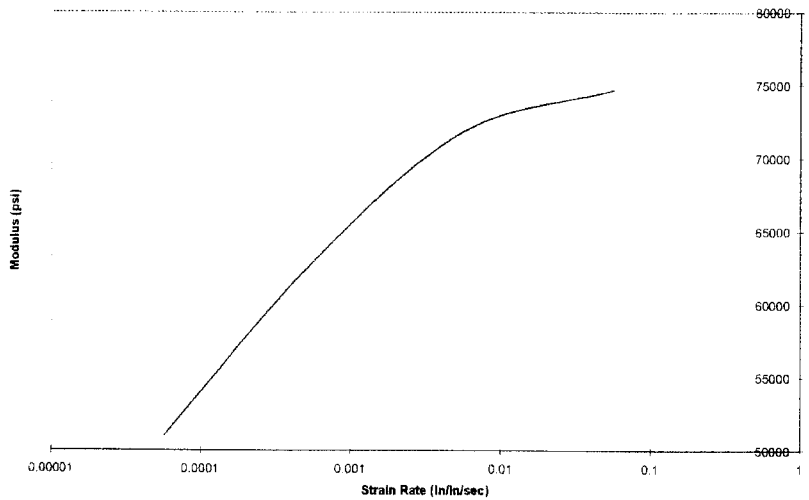
Figure 4  Higher Strain Rate Results During 75° Specimen Tension Test
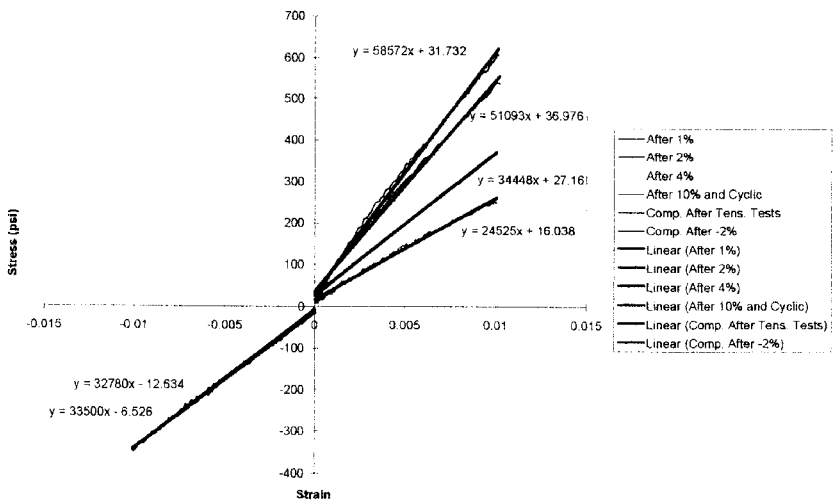
Figure 5  Effect of Damage Due to High Strain Rates on the 75° Specimen decreases significantly at higher strain rates as shown in Figure 4. The test strain rates were limited by a maximum crosshead speed of about 1.5 in/sec.

Figure 5 shows the effect of damage due to high strains on the initial modulus of the material. After the initial testing at various strain rates the specimen was loaded to 2%, 4%, and 10% strain. It was then subjected to 1000 cycles from 1% to 10% strain, a 2% tensile strain test to determine the tensile modulus after cycling, and tests to 2% and 4% compressive strain. The modulus degrades from 58.6 ksi initially to 24.5 ksi after seeing 10% strain. The compressive modulus after these tests is about 33 ksi indicating that the damage which leads to a degradation in tensile modulus does not have the same effect on the compression modulus. Initial compression modulus was not measured during these tests but will be studied in the other material specimens.

2.3 Task 2.2.2 Pneumatic Subcomponent Fender

The fender that was fabricated and tested in Phase I is a pneumatic system. In Phase I it was only tested as part of the overall bumper/tension bar system. It was tested again in Phase II independently using a rigid wall to isolate its response. The test setup is described in more detail in paragraph (Task 2.2.4). The force / displacement response for a typical test is plotted in Figure 6. The overall shape is similar to that obtained for the fendering system in Phase I. Although the system dissipates energy, we could not demonstrate a sufficient improvement in efficiency or energy dissipation over conventional fendering systems to justify this approach.

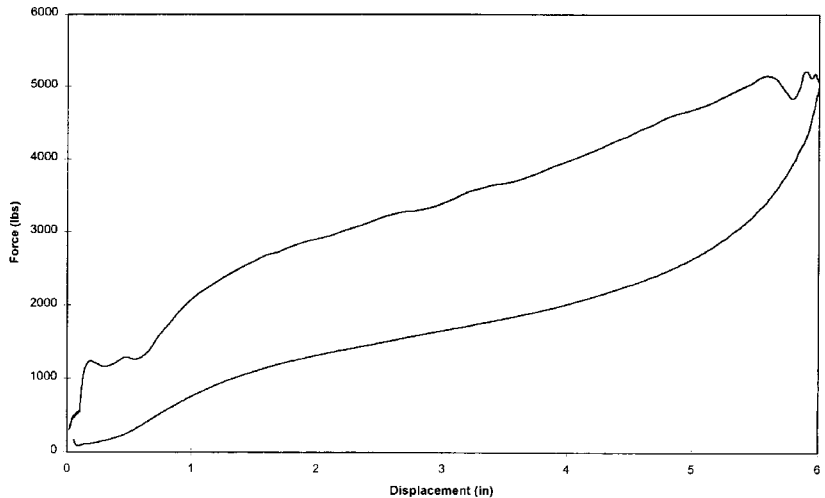

Figure 6 Force/Displacement Response of the Pneumatic Bumper

2.4 Task 2.2.4 Hydraulic Subcomponent Fender

*Design and Fabrication*

The terms "valve" and "servovalve" are used frequently in this section. "Valve" refers to the large valve which controls the flow of water from the fender. "Servovalve" refers to the small electronic solenoid valve which controls the position of the piston.

Fabrication of the adaptive valve discussed in the previous quarterly report was completed, and the valve was attached to the aluminum plug on one end of the pneumatic fender fabricated in Phase I. A sketch of the valve design is shown in Figure 7, and a photograph of the valve installed on the fender is shown in Figure 8. The hour-glass-shaped valve core is mounted on a piston. The piston is inserted in a cylinder filled with a fluid, so the position of the piston and the valve core can be controlled by the servovalve. Water forced from the fender by the impacting ship provides the force required to push the valve core. The fluid forced through the servovalve is stored in an accumulator. In the current prototype, the fluid is forced back in to the cylinder manually. The full-scale design will include a spring to force the valve back to its original position after the fender has refilled.

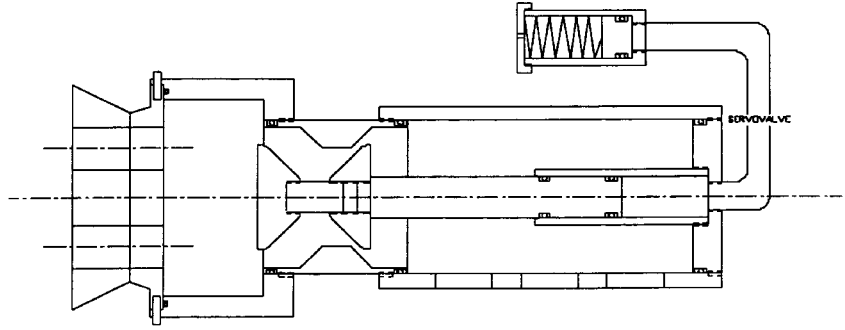

Figure 7 Adaptive Valve Design

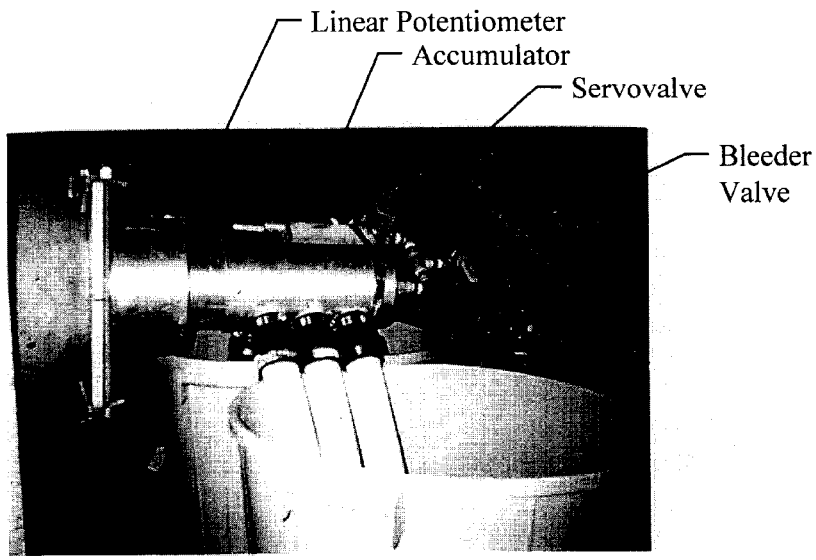

Figure 8 Valve Installed on the Fender

*Test Setup and Instrumentation*

Preliminary testing of the hydraulic subcomponent fender began in July. A picture of the fender in the test fixture at Washington University is shown in Figure 9. The fender bears against a rigid wall on the right while being pushed by a simulated ship hull from the left which is hinged at the bottom. The paddle is pushed by a 22 kip, servo-controlled, hydraulic actuator. Water pushed through the valve flows through six plastic tubes into two reservoirs which are partially filled with water. The water is pulled back into the fender after the load is removed.

Instrumentation on the tests includes: a pressure gage measuring water pressure in the fender, a linear potentiometer indicating the valve position by measuring the displacement of the piston in the accumulator, and force and displacement of the hydraulic actuator. The fender displacement is two times the actuator displacement, and the force on the fender is one-half the actuator force since the centroid of the fender is approximately twice as far from the hinge as the actuator. Voltage output from these instruments is read by a Keithley Metrabyte DAS-1800HR-DA Data Acquisition Board installed in a personal computer. A Visual C++ program is being used to read and store the output and control the servovalve according to the control algorithm.

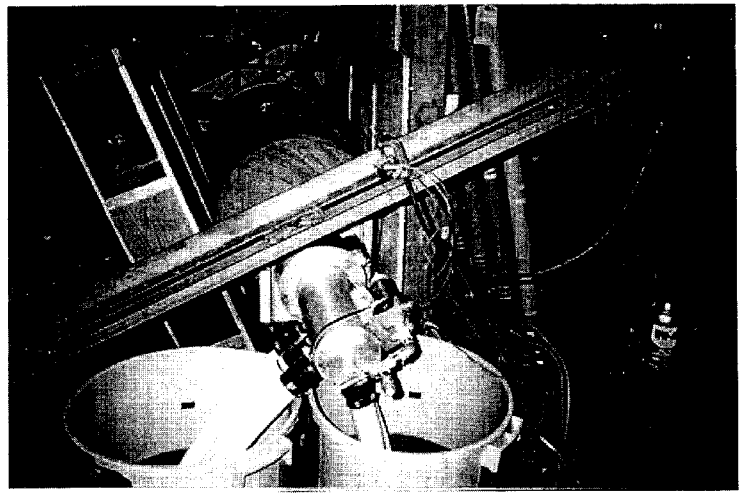

Figure 9  Fender in the Test Fixture at Washington University

The prototype fender has been tested extensively with various loading rates, maximum deflections, and control algorithms. The goal of this development program is to control the fender such that we get the optimum performance through the three phases of the load cycle. The target force/displacement curve is shown in Figure 10. In Phase 1, the valve is held closed as the pressure increases to the allowable hull pressure. The rate of change in the pressure is also being analyzed during this phase to estimate the effective mass and velocity of the impacting ship. The fender enters Phase 2 after the maximum hull pressure is reached. In this phase the valve is opened to allow some flow in order to maintain the allowable hull pressure until the force required to dissipate all of the kinetic energy in the ship at the maximum fender displacement is reached. The required force is calculated using the mass and velocity estimates from Phase 1. In Phase 3 a constant force is maintained until the ship stops. Since the contact area with the ship is constantly increasing, the pressure in the fender will decrease throughout Phase 3; however, since the flow rate will eventually decrease due to the reduced ship velocity, the valve will have to close in order to maintain the optimal pressure. The hourglass shape of the valve allows this to occur.

A photograph of the hydraulic fender during a test is shown in Figure 11. Note the increased water level in the reservoirs compared to Figure 10 as several gallons have been squeezed out of the fender. Plots of results from two tests are shown in Figures 12 through 15. The actuator displacement was programmed to follow a parabolic curve with velocity decreasing at a constant rate. This is the response for a ship striking an "optimum" fender where the reaction force is a constant over time. We plan to implement feedback control of the MTS actuator so that the simulated ship velocity will decrease at a rate determined by the actual fender force.

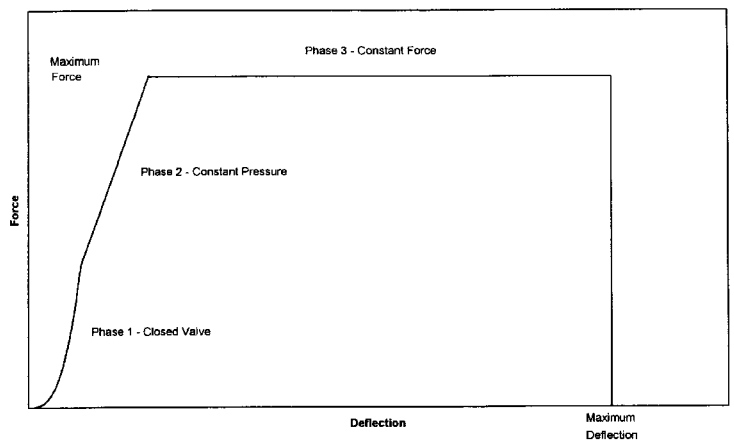
Figure 10  Target Force/Displacement Curve
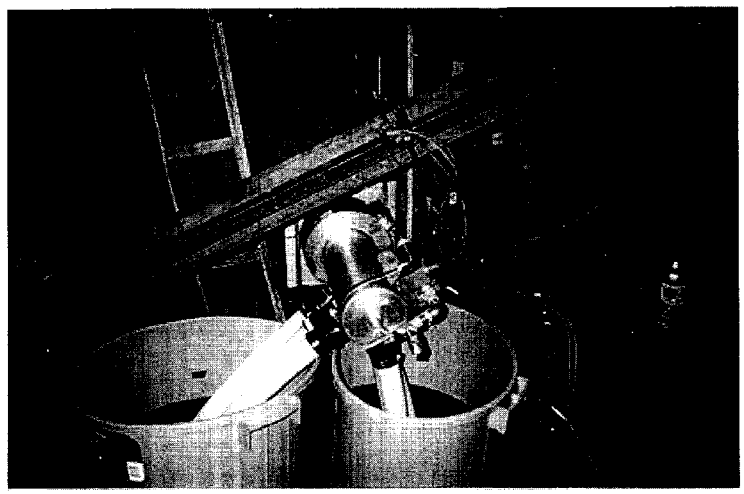
Figure 11  Hydraulic Fender During a Test

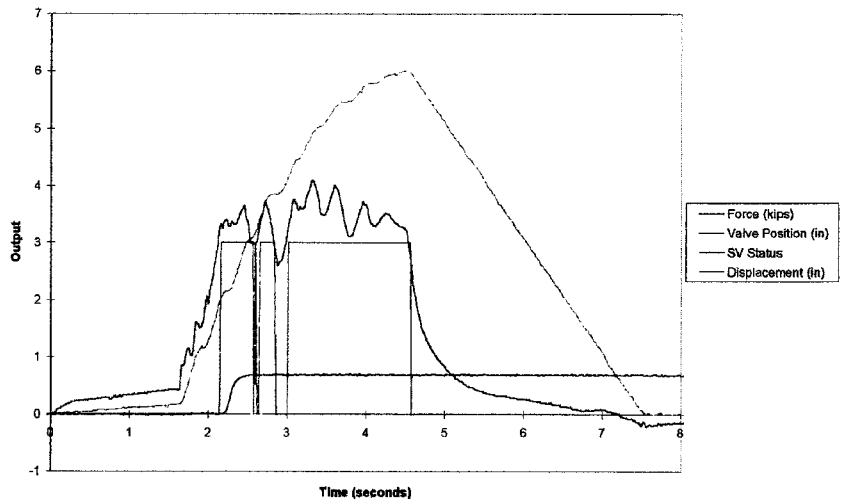
Figure 12  Hydraulic Fender Test Results as a Function of Time
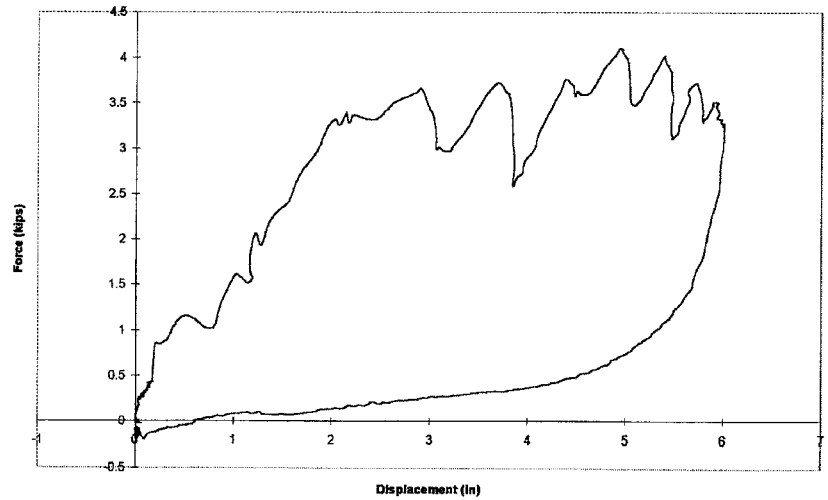
Figure 13  Hydraulic Fender Force/Displacement Results

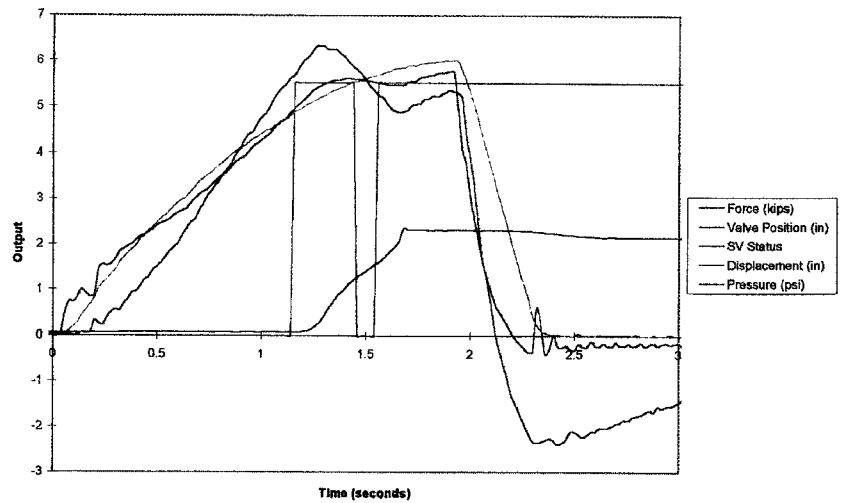
Figure 14 Results of the Pressure Controlled Hydraulic Bumper Test
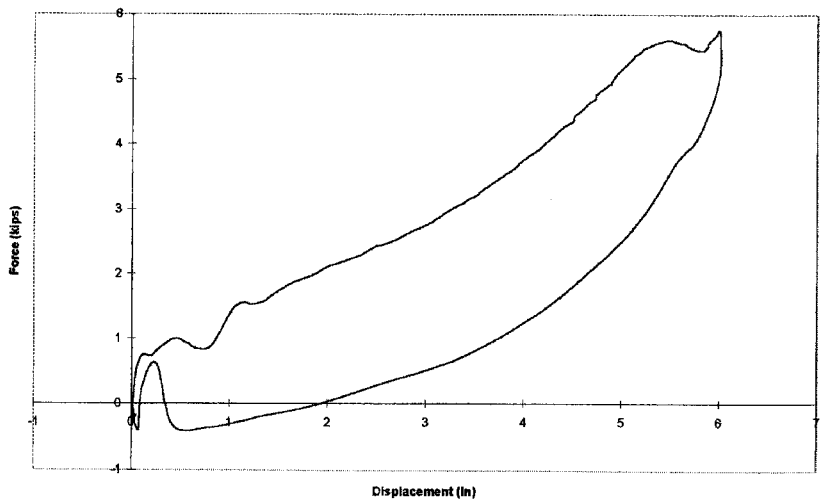
Figure 15 Results of the Pressure Controlled Hydraulic Bumper Test

*Test Results - Force Control*

In the force controlled test the "ship" struck the fender at 0.25 MPH (after a 0.1 inch preload phase) and was stopped over a total deflection of 6 inches. The threshold force was set to 3000 lbs. in this test. During the first half of the valve stroke the control algorithm was set to open the servovalve when the force exceeded 3000 lbs. and to close when the force dropped below 3000 lbs. Figure 16 shows the valve area as a function of valve position. Opening the servovalve when the valve position is less than 1.1 inches causes the valve area to increase which reduces the pressure and, thereby, the force. The servovalve response is switched during the second half of the valve stroke because the valve area is reduced as the valve position advances. Output from all instruments was recorded once every millisecond and the servovalve status was updated (if required) once every 20 milliseconds. Pressure was not recorded in this stage of the test program due to difficulties with our original pressure gage system. It was replaced in subsequent tests.

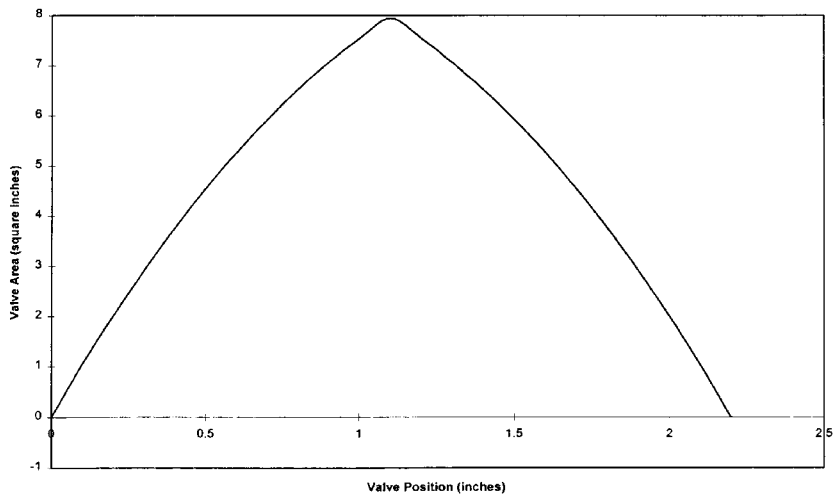

Figure 16    Valve Area as a Function of Valve Position

The test results as a function of time are shown in Figure 12. As the fender was loaded, the force increased to 3000 lbs. at which time the servovalve opened (as indicated by the green line). The force overshot the threshold value by 300 pounds as the valve began to open. The force quickly leveled off and began to drop -- falling below the threshold value at which time the servovalve was told to close. The valve had essentially stopped moving by this time. Subsequent commands to open and close the servovalve were made as the force oscillated above and below the threshold value, but the pressure and flow were not adequate to move the valve further.

The force/displacement response is plotted in Figure 13. The overall shape of the response follows the target response plotted in Figure 10 very well. The force increased to the maximum value quickly at which time it leveled off and was maintained at a fairly constant level. Obviously, the oscillations at the maximum force are not desirable, but these appear to have been caused by the method used to program the MTS actuator which was corrected in later tests. The fender unloaded very quickly indicating that the rebound force is minimal. This response is very beneficial but difficult to achieve with conventional fendering systems.

Two changes were made to the test apparatus after the force controlled tests to improve the response of the fender and to provide a more accurate simulation of actual loading conditions. First, the program controlling the MTS actuator was revised to smooth the applied displacement curve. The original program created a parabolic displacement curve by using five separate loading steps which created a piecewise linear shape. The MTS controller hesitates between steps leading to a "jerky" loading history. This led to multiple pauses in the displacement / time history plotted in Figure 12 and probably caused the force oscillations during the constant force phase of the loading. The MTS actuator was reprogrammed using a single time history file which approximates the parabola with 20 line segments and eliminates the pauses between multiple steps.

Second, a more reliable and accurate pressure transducer was procured to measure the internal pressure of the fender and to govern the control algorithm. A brief study using force control was informative in the overall development of a control algorithm since, ultimately, force is what we are trying to control during the longest phase of the response. Force control cannot, however, be used easily in a fielded system since there is no simple instrument for measuring force. Instead force will be determined from the pressure and overall deflection in the fender.

*Test Results - Pressure Control*

The results of a pressure controlled test with a "ship" striking the fender at 0.35 MPH (after a 0.1 inch preload phase) and a 6 inch total deflection are shown in Figures 14 and 15. The threshold pressure was set to 5.5 psi in this test. The servovalve was controlled by the same algorithm as in the force control test.

The test results as a function of time are shown in Figure 14. As the fender was loaded, the pressure increased to 5.5 psi at which time the servovalve opened. The pressure exceeded the threshold value by 0.7 psi as the valve opened. The valve quickly moved to its full open position of 1.1 inches. Since the pressure was still above the threshold value at this time, the servovalve closed in an attempt to maintain the full open position in the valve. Although the movement of the valve core began to slow, the current servovalve could not close completely to stop the movement. In the meantime, the pressure continued to drop because the flow rate decreased as the ship slowed. This caused the servovalve to reopen in order to allow the valve to close to maintain the threshold pressure. The fender pressure rebounded to approach the desired pressure as the ship stopped. As the loading paddle was retracted, a negative pressure developed in the fender which caused the valve to retract some to allow water back in to the fender. The force dropped quickly at this time.

The force/displacement response for the pressure controlled test is plotted in Figure 15. Most of this test is controlled in Phase 1 with the valve closed until the allowable hull pressure is reached. The response for the first 5 inches of deflection match the target response shown in Figure 10 for Phase 1. Since we were almost at the end of the stroke as we entered Phase 2, this phase could not fully develop. The control system was able to regulate the pressure throughout this phase. The unloading curve does not show the same level of energy dissipation observed in the earlier force controlled test. This is due to two factors: the valve was initially opened at a much higher force in this test so little time was spent in a near-constant force region, and the valve was nearly closed when unloading began so it took longer for the pressure to drop below zero. The second factor was exacerbated by the much higher unloading rate in this test.

Three additional changes are being made to the hardware and test approach based on these results. A new servovalve will be installed which is normally open. The current servovalve is normally closed. When normally closed servovalve is powered, it is forced open by the solenoid, but when the power is removed, the servovalve is closed by a spring. The current servovalve is not able to close quickly, especially when pressurized fluid is being forced through it. This problem was evident on many of the tests. The normally-open servovalve is forced closed when powered. We expect much faster response from this system. The two servovalves may be used in series, if required. More sophisticated servovalves are available, but we are confident that the valve can be controlled adequately with these simple, low-cost components.

Additionally, we will modify the control algorithm to begin to modulate the valve before the threshold pressure is reached and to make opening/closing decisions at a higher rate (currently every 20 ms). Future response will have to be predicted to produce optimum control. The next phase of testing will focus on developing these procedures.

Finally, the response of the fender after the ship stops will be addressed. A hold will be programmed into the actuator control to simulate the stopped ship. The servovalve will be opened to allow the valve to return to the full open position so that the internal pressure will drop as quickly as possible. A spring will be installed in the accumulator to help force the valve back to this position.

*Test Summary*

The results of initial testing on the hydraulic fender have demonstrated the potential of this system to meet the program goals to produce a more effective fendering system using glass reinforced polyurethane composites. By controlling the force/displacement history to approach an optimal shape which can be modified automatically given the mass and velocity of the docking ship, a single fendering system will be able to handle a wide range of ships while minimizing the maximum force on the dock structure. The hardware and control algorithm will continue to be refined to gain a full understanding of the response of the system and develop rules for scaling the prototype to the full scale system.

2.5 Task 2.3 Manufacturing Process Optimization

*Tooling*

Several different mandrel concepts are described below to allow for the manufacturing of bumpers via the filament winding process. Typically, mandrels used in the filament winding process are designed for repeated use thereby justifying high initial cost. Usually, the geometry of the fabricated component is open ended such that it can be extracted from the mandrel. This allows for an economical one piece tool. For the bumper designs being considered it is desirable to produce a one piece closed end structure. As such, more creative and unconventional mandrel designs must be considered.

To facilitate the bumper design and filament winding process either a float away or collapsible mandrel is required. A float away mandrel should be low cost since it is only used once. It should be light weight since it will remain with the component during it's service. The float away mandrel can be designed such that it contributes to the load carrying capability of the structure or is just a parasite and carries no loads. A collapsible mandrel, on the other hand, is reusable and much more complex in design than the float away mandrel. Since the collapsible mandrel is more complex it also tends to be more expensive to fabricate. After the filament winding of the component the collapsible mandrel must be extracted from the completed component. Since the bumper has domed ends with small orifices there is very little real estate for the mandrel to be removed. The advantages of a collapsible mandrel is that it does not add to the weight of the bumper nor effect it's structural performance. It also can be reused.

The first concept (Figure 17) is a float away plastic liner. The cylindrical section and end domes are made of high molecular weight plastic or other type of plastic that can be fabricated in one piece. This concept is used in the natural gas vehicle tank industry. The plastic liner is used as the mandrel from which is filament wound a pressure tank. The liner becomes part of the tank. Due to the size of the bumper the cylindrical portion may have to be made in more than one piece and be bonded together. The cylinder would then be attached to each of the plastic end domes. Since the liner becomes part of the bumper it should be designed as thin as possible so as not to interfere with the unique functionality of the reinforced urethane bumper.

The second concept (Figure 18) is a reusable mandrel. A leather or canvas casing is stitched together to provide the final shape of the bumper. An inflatable bladder is inserted around the shaft and inside the casing. Air is pumped into the bladder via the shaft and the bladder is inflated and held to shape by the casing much the same way a football is. Once inflated the bumper is filament wound around the casing. After completion of the fabrication process the shaft and rubber bladder is removed from the component. The casing can either remain with the component or be removed and reused. The initial cost of the mandrel is economical and one benefits from being able to reuse the mandrel.

The third concept (Figure 19) combines a float away and reusable mandrel approach. A float away foam mandrel that is made up of light weight foam wedges is attached to a shaft with retractable support arms. The wedges for the cylindrical section and end domes should be designed such that a minimum number of shapes are required to reduce the number of molds to be made. The wedges would be bonded together on a jig. To support the foam mandrel during the filament winding process support rings and arms could be used. The support ring could be a filament wound strip that circumferentially supports the foam wedges and allows the support arms to be bonded to it. The support arms would be retractable by being pinned to the main shaft and to the support ring. Upon completion of the bumper the main shaft would be extracted from the part. Upon the extraction of the shaft the support arms would retract and peel loose from the support rings. This concept allows for the use of an affordable reusable tool and low cost float away mandrels.

Through the next reporting period these concepts will be downselected and demonstrated for applicability to scale up to a full scale bumper system.

3.0 Work to Be Completed Next Reporting Period

During the next reporting period, the customer requirements for a potential fender system to be commercialized will continue to be studied, the material characterization testing on the 2" diameter tension tubes will be completed, the hydraulic subcomponent articles will continue to be tested, an foam filled bumper section will be tested, a system will be downselected for full scale design, and low cost tooling options will be studied and demonstrated.

Funds and Man-Hour Expenditure Report and Graphs

Attached is the Expenditure Summary and the graph of funds expended and percentage work complete. These charts summarize work and expenditures during 10 May 1997 through 8 August 1997.

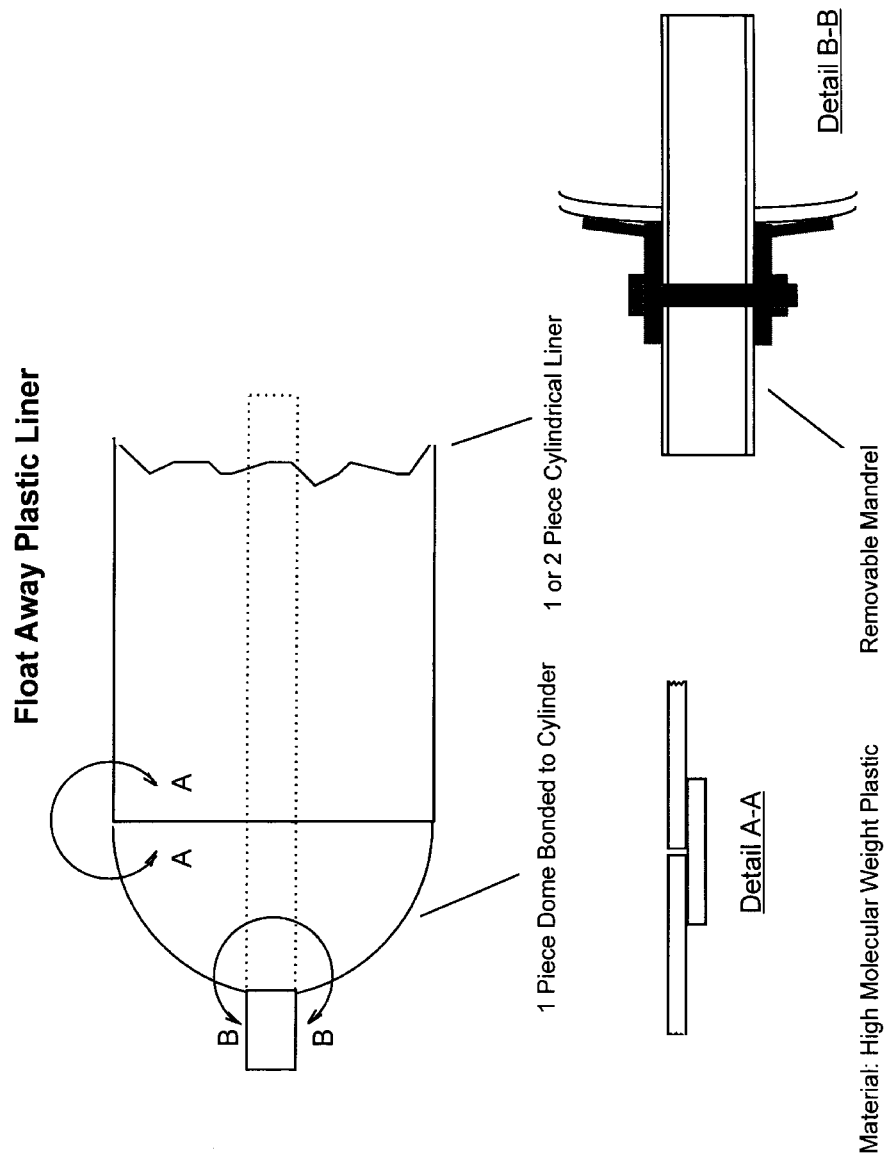
Figure 17 Float Away Plastic Liner

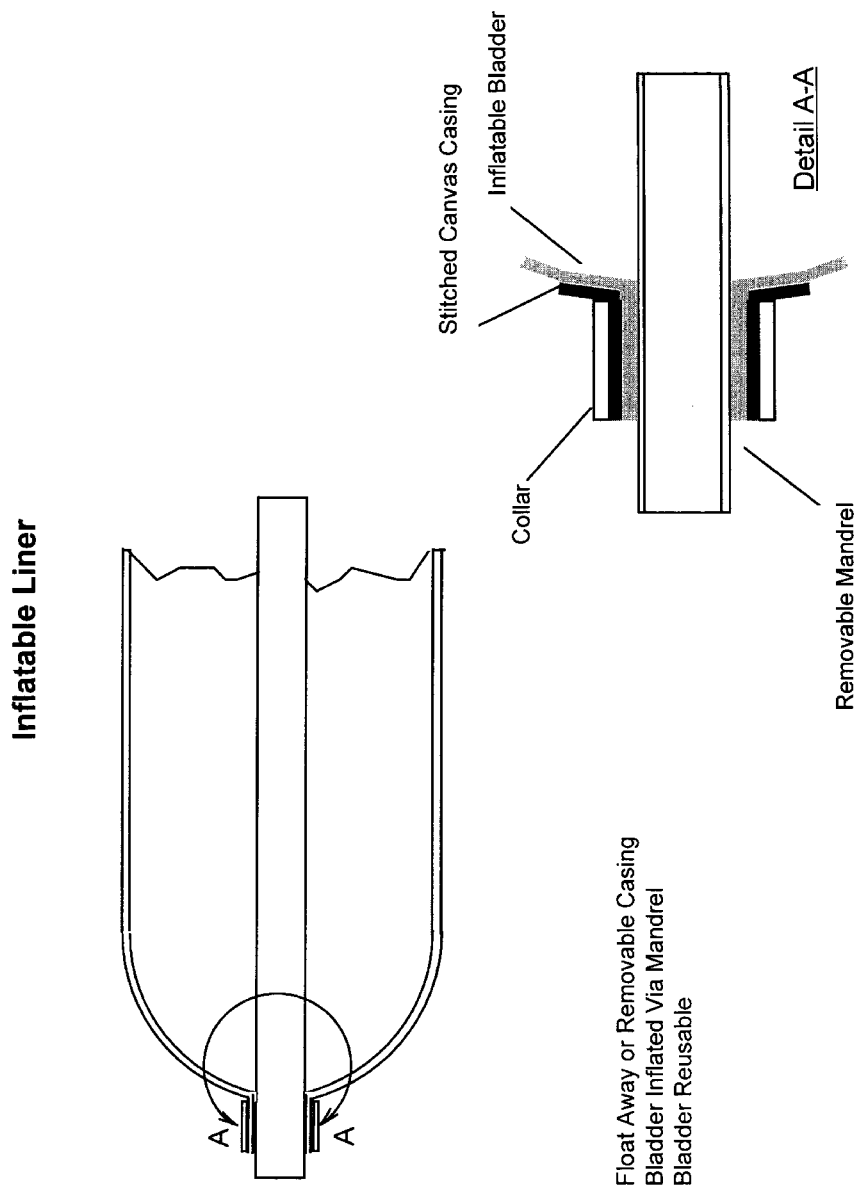
Figure 18  Reusable Mandrel

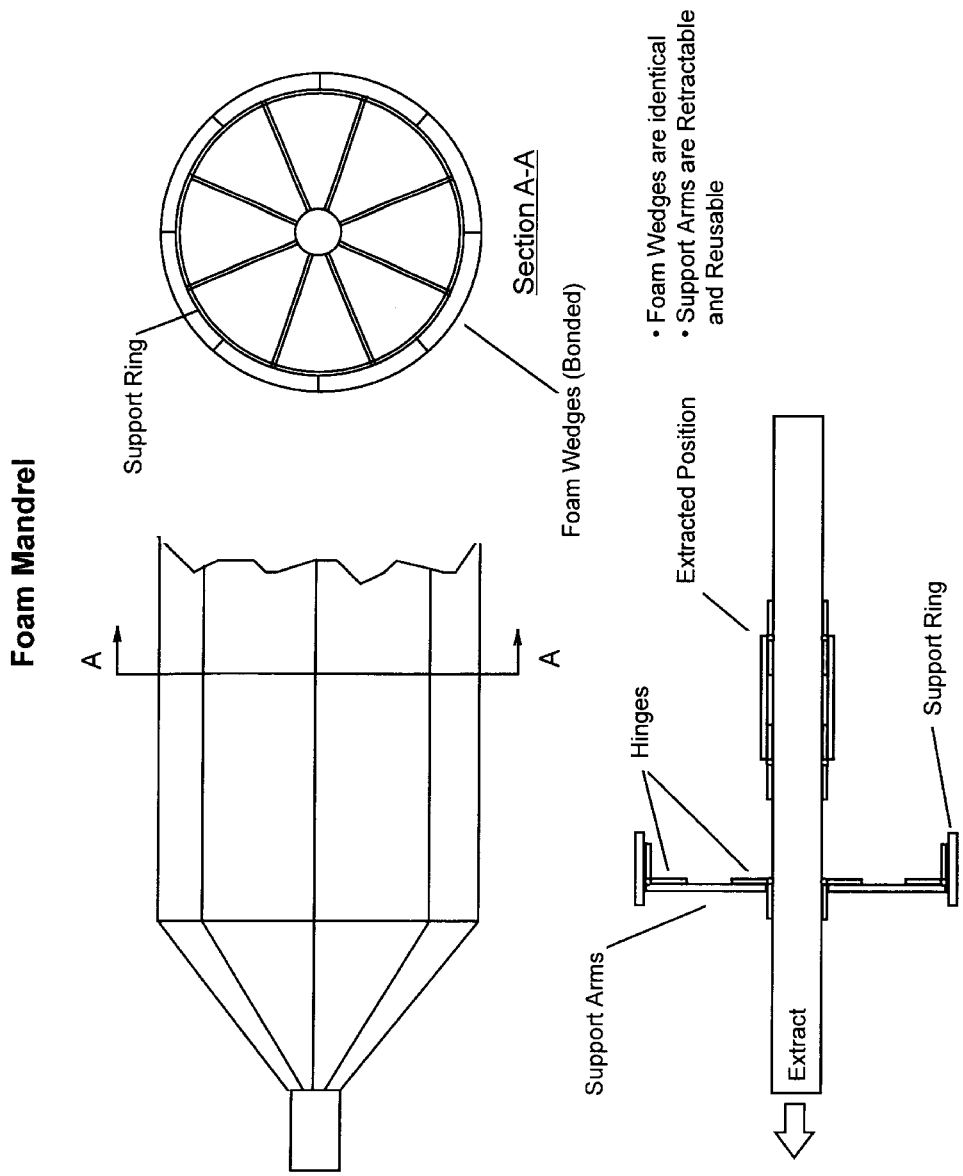
Figure 19 Combined Float Away & Reusable Mandrel

Date Prepared: 14 August 1997
Contract NO: N00014-97-C-0117
Contractor: Production Products Manufacturing Sales Funds and Man Hour Expenditure
Summary Title: ONR Phase II SBIR
Reporting Period: 10May 97 thru 8 August 97

|  | Negotiated Contract | | Reporting Period Expenditures | | Cumulative Expenditures | | | Estimated Cost to Complete | Latest Cost Estimate |
|---|---|---|---|---|---|---|---|---|---|
|  | Hrs. | $ | Hrs. | $ | Hrs. | $ | % $ Value | | |
| 1. Direct Labor | 6391 | 106,298.61 | 1138.8 | 23,013.21 | 1583.55 | 36,900.71 | 35% | 69,397.90 | 106,298.61 |
| Labor Overhead | | 130,369.30 | | 34,059.54 | | 53,502.04 | 41% | 76,867.26 | 130,369.30 |
| 2. Total Labor + Overhead | | 236,667.91 | | 57,072.75 | | 90,402.75 | 38% | 146,265.16 | 236,667.91 |
| 3. Materials (Subcontract + Material) | | 302,111.24 | | 37,162.84 | | 49,066.84 | 16% | 253,044.40 | 302,111.24 |
| 4. Travel | | 1,080.00 | | 0.00 | | 0.00 | 0% | 1,080.00 | 1,080.00 |
| 5. Other (Testing) | | 0.00 | | 0.00 | | 0.00 | 0% | 0.00 | 0.00 |
| 6. Subtotal (2 thru 5) | | 539,859.15 | | 94,235.59 | | 139,469.59 | 26% | 400,389.56 | 539,859.15 |
| 7. G&A Costs | | 102,514.85 | | 19,658.20 | | 29,157.34 | 28% | 73,357.51 | 102,514.85 |
| 8. Total Cost (6 thru 7) | | 642,374.00 | | 113,893.79 | | 168,626.93 | 26% | 473,747.07 | 642,374.00 |
| 9. Fee or Profit | | 44,967.00 | | 6,833.63 | | 10,117.62 | 23% | 34,849.38 | 44,967.00 |
| Total Contract Amount (8 thru 9) | | 687,341.00 | | 120,727.42 | | 178,744.55 | 26% | 508,596.45 | 687,341.00 |
| Outstanding Commitments | | 0.00 | | 0.00 | | 0.00 | 0% | 0.00 | 0.00 |
| Total Commitments and Expenditures | | 687,341.00 | | 120,727.42 | | 178,744.55 | 26% | 508,596.45 | 687,341.00 |

\*\* Elastomeric Composite Bumpers

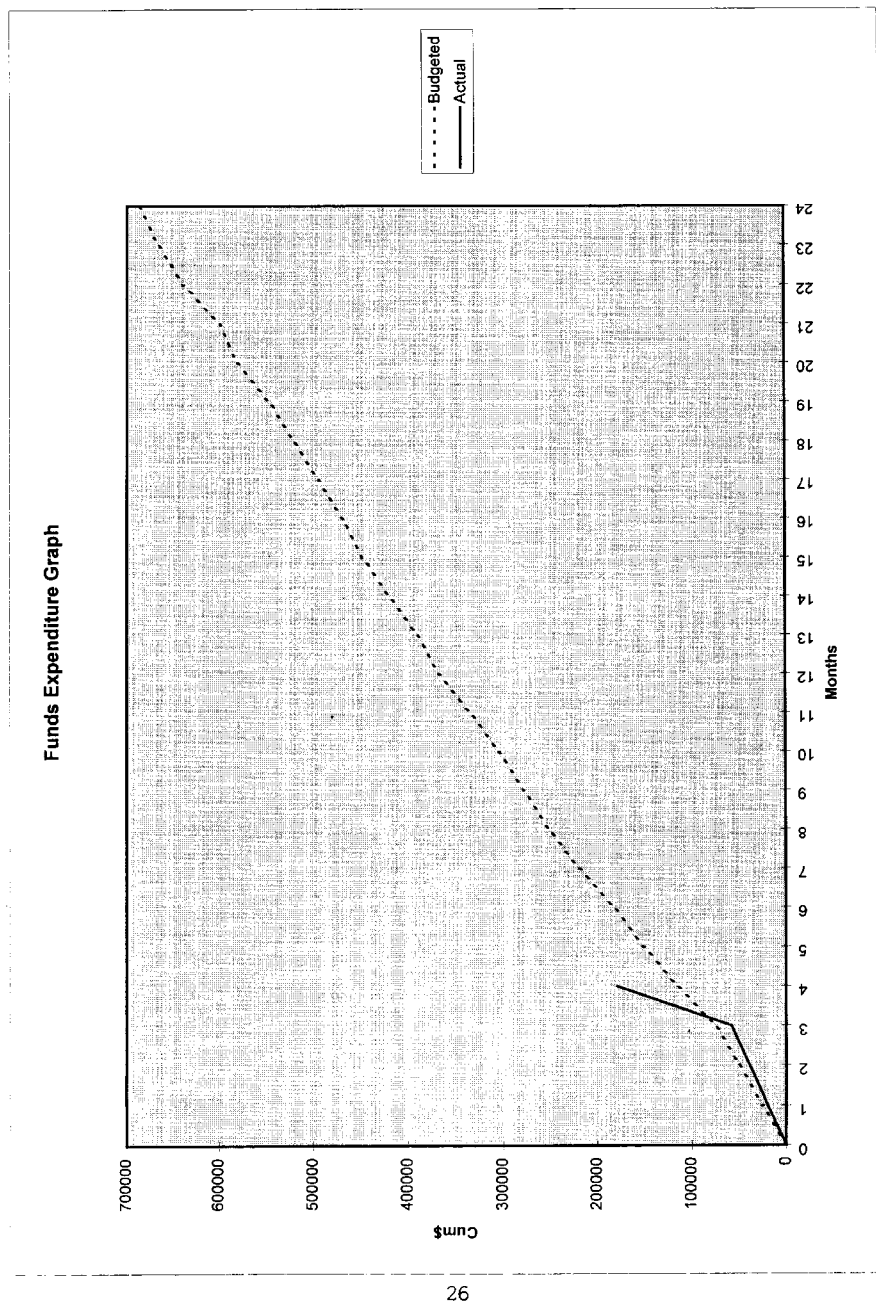

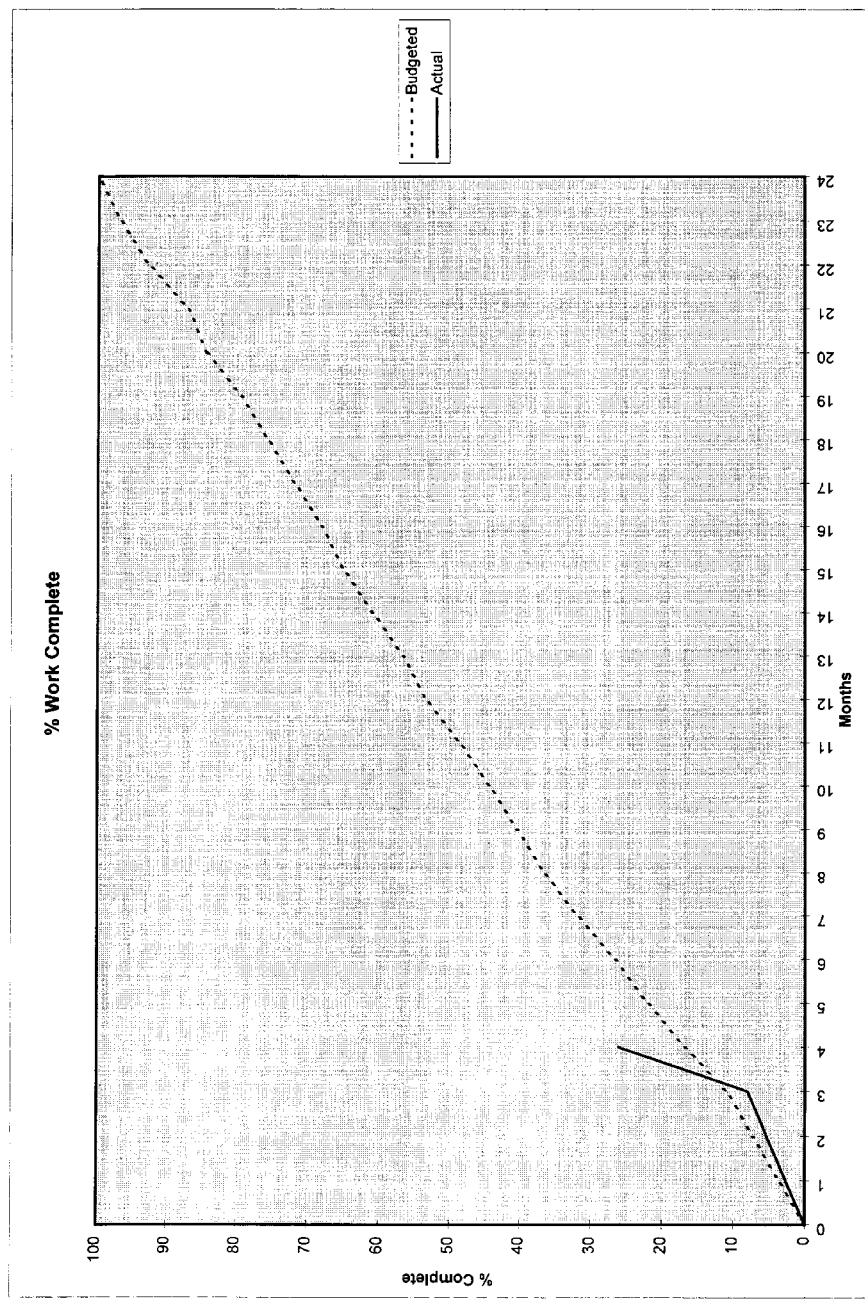

Appendix A

Advanced Fendering Systems Meeting Vu-Graphs

APPENDIX C - ADVANCED FENDERING SYSTEM PROJECT (AFSP) BRIEFING SLIDES

APPENDIX C - AFSP BRIEFING SLIDES
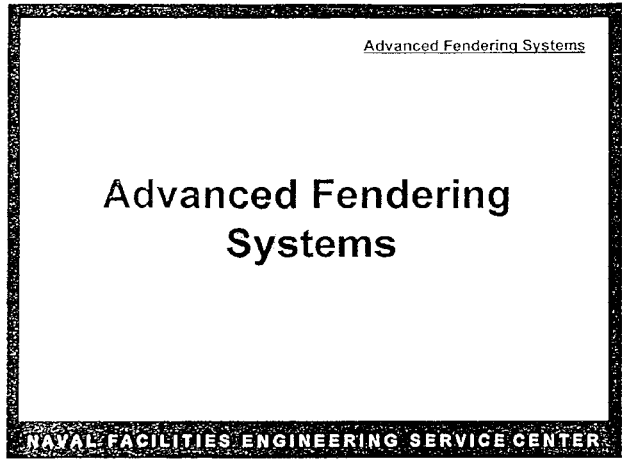
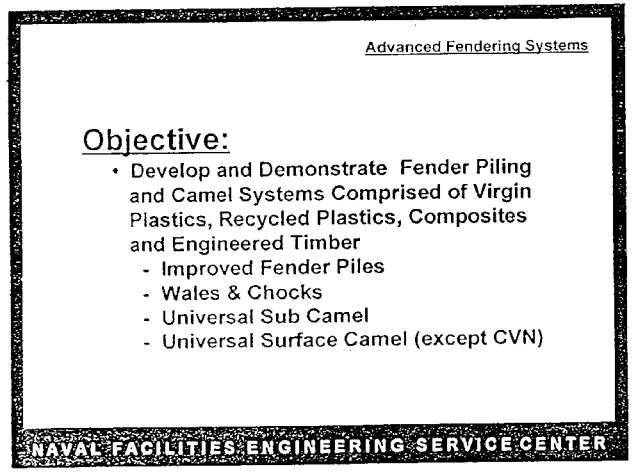

APPENDIX C - AFSP BRIEFING SLIDES
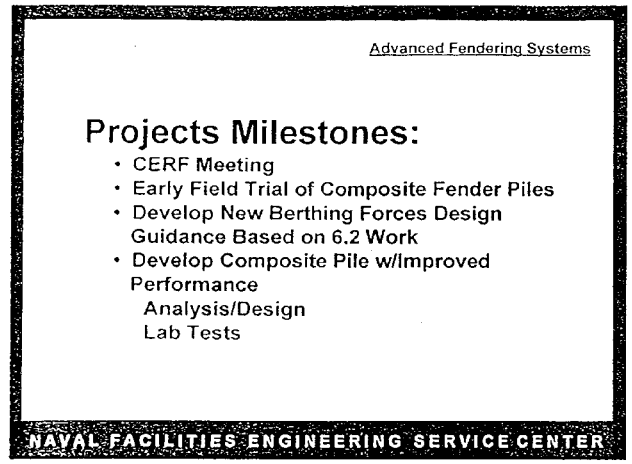
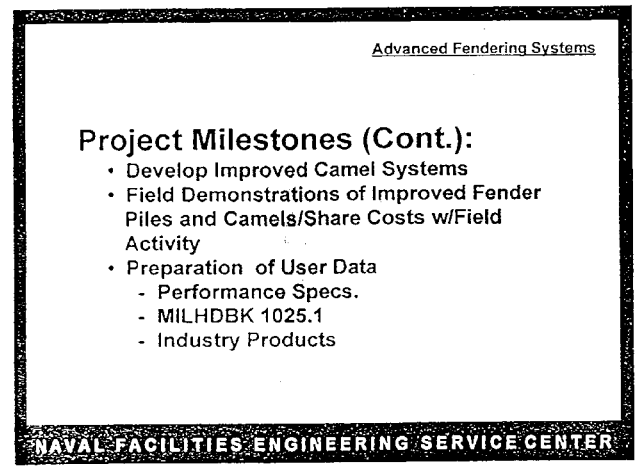

APPENDIX C - AFSP BRIEFING SLIDES

*Advanced Fendering Systems*

FENDER SYSTEM PERFORMANCE REQUIREMENTS
- Required Strength/Stiffness
- Limiting Deflections
- Fracture Resistance
- Abrasion/Temperature Resistance
- UV/Environmental Resistance
- Pile Driving
- Lower Life Cycle Cost

NAVAL FACILITIES ENGINEERING SERVICE CENTER

*Advanced Fendering Systems*

CAMEL PERFORMANCE REQUIREMENTS
- Increased Energy Absorbing Capacity
- Vessel Compatibility
- Reduced Maintenance
- Lower Life Cycle Cost

NAVAL FACILITIES ENGINEERING SERVICE CENTER

APPENDIX C - AFSP BRIEFING SLIDES
*Advanced Fendering Systems*
NAVY PIER FENDERING TRENDS
- Elimination of Timber
- Composite Materials
- Environmentally Benign
- Resilient, Energy Absorbing Components
- Accommodate Allowable Hull Pressures
- Multi-Class Compatibility
- Lower Life Cycle Costs
NAVAL FACILITIES ENGINEERING SERVICE CENTER
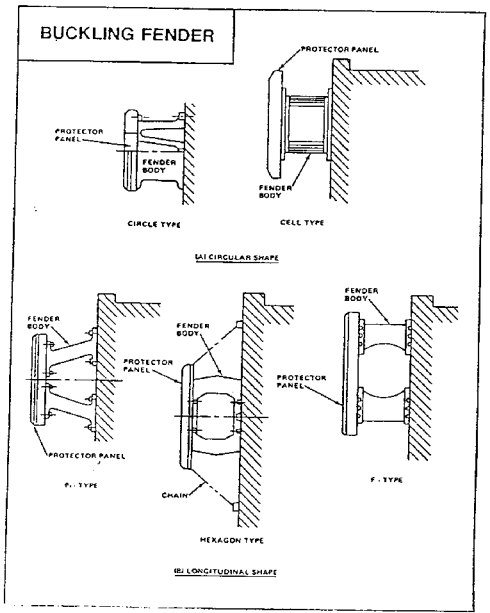
BUCKLING FENDER
CERF

APPENDIX C - AFSP BRIEFING SLIDES
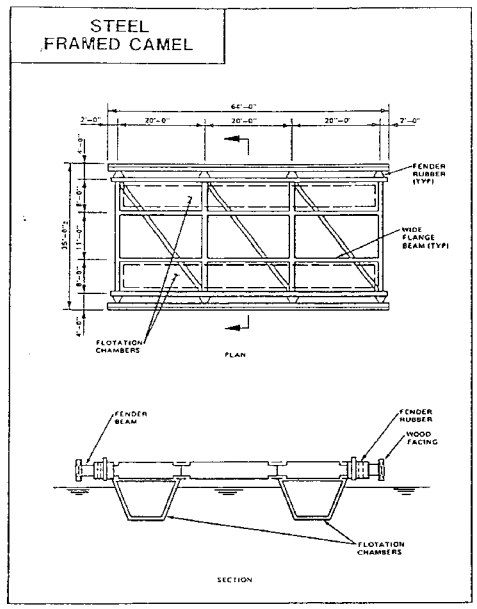
Figure 2-10. Aircraft Carrier Camel.
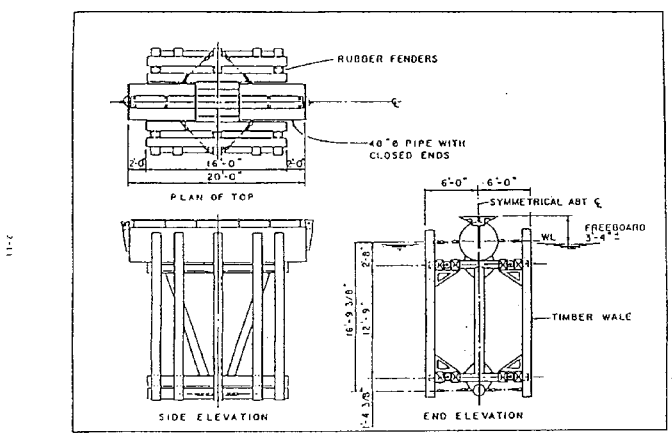
Figure 2-9. Deep Draft Submarine Separator.

APPENDIX C - AFSP BRIEFING SLIDES
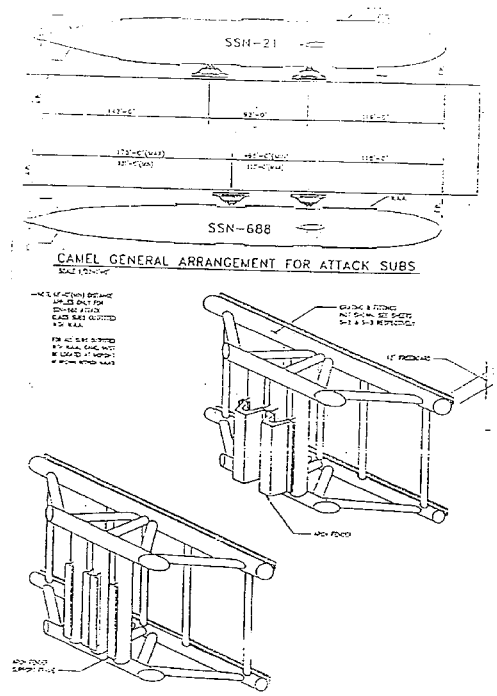
Figure 11. LANTDIV camel for fendering WAA equipped submarines.
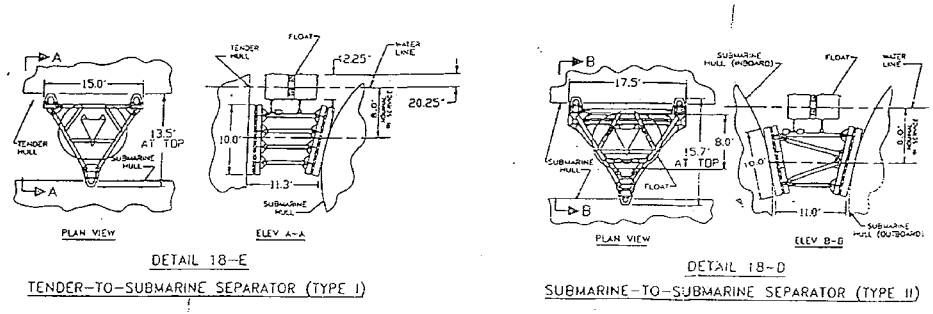
DETAIL 18-E
TENDER-TO-SUBMARINE SEPARATOR (TYPE I)
DETAIL 18-D
SUBMARINE-TO-SUBMARINE SEPARATOR (TYPE II)

APPENDIX C - AFSP BRIEFING SLIDES
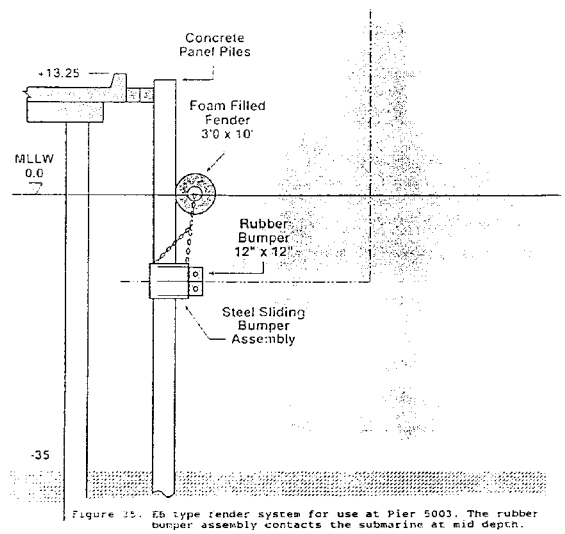
Figure 35. EB type fender system for use at Pier 5003. The rubber bumper assembly contacts the submarine at mid depth.
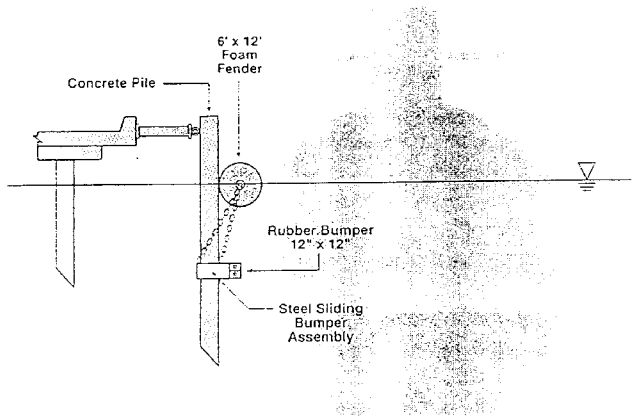
Figure 36. Up-graded EB type fender system for Pier 5000.

APPENDIX D - NAVY SHIP CHARACTERISTICS BRIEFING SLIDES

*Advanced Fendering Systems*

NEW SHIP CLASSES
- DDF-51
- AOE-6
- LPD-17
- SC-21
- Arsenal Ship
- SSN-21
- NSSN

NAVAL FACILITIES ENGINEERING SERVICE CENTER

*Advanced Fendering Systems*

NAVY SHIP CHARACTERISTICS
- Thin Hull Plating
- Large Displacement Range
- Pronounced Hull Curvature
- Hull Projections
- Stealth Features
    - Shape
    - Masking Bands
- Sonar Domes
- Hull Coatings
- WAA

NAVAL FACILITIES ENGINEERING SERVICE CENTER

APPENDIX D - NAVY SHIP CHARACTERISTICS
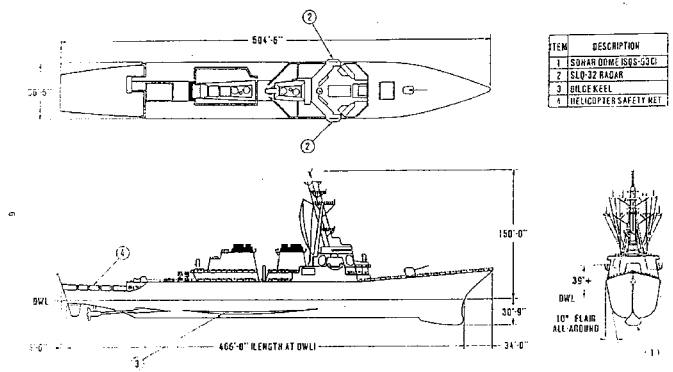
Figure 2-1. DDG-51 Physical Characteristics.
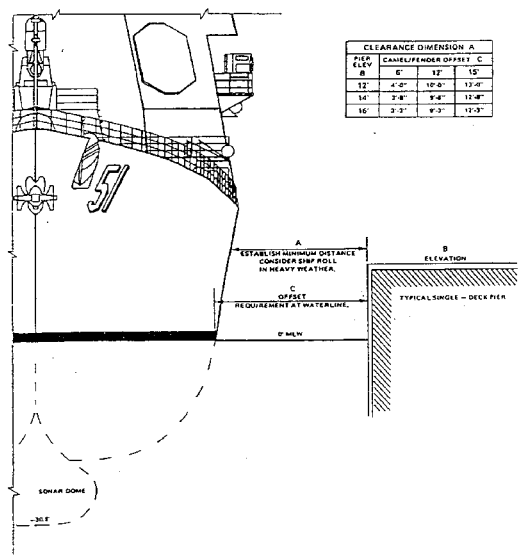
Figure 3-1. Separation Between DDG-51 and Pier.

APPENDIX D - NAVY SHIP CHARACTERISTICS
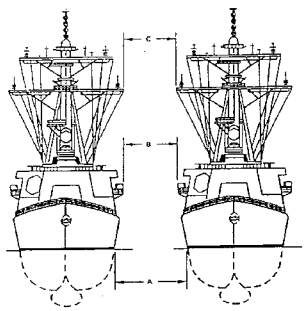
Figure 3-4. Separation of Nested DDG-51 Class Ships
*Berthing Force Predictions*
NAVAL FACILITIES ENGINEERING SERVICE CENTER

APPENDIX D - NAVY SHIP CHARACTERISTICS
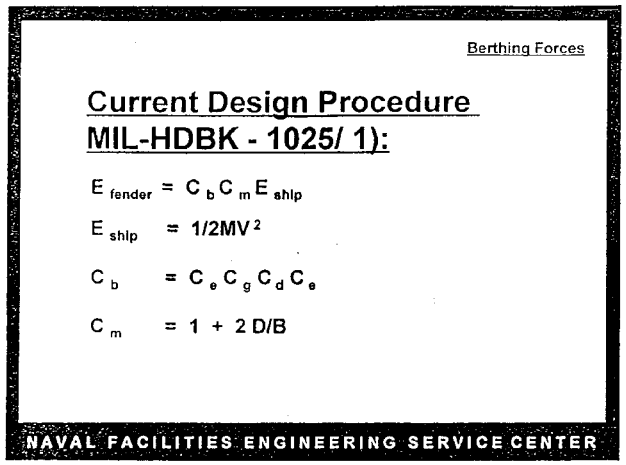
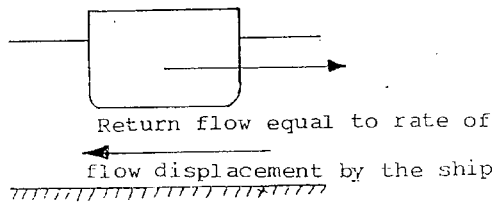
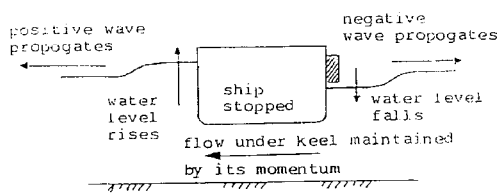

APPENDIX D - NAVY SHIP CHARACTERISTICS
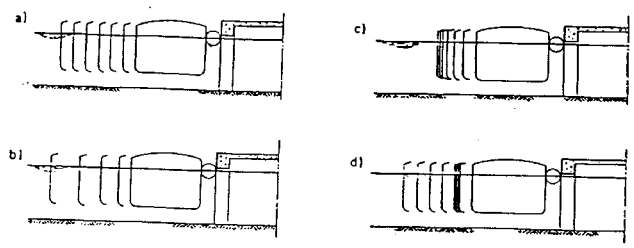
*Analytical Model Will Consider*
- Ship Translation and Rotation
- Ship Geometry
- Pier/Fender Stiffness
- Bottom Effects
- Ship/Fender Reactions with Ship Moored to Pier (Extension of Basic Model)

APPENDIX D - NAVY SHIP CHARACTERISTICS
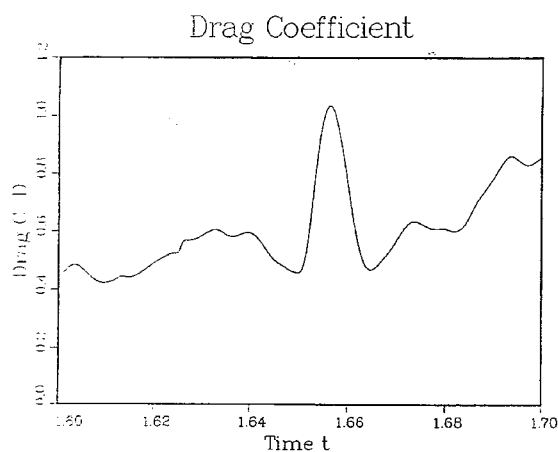
Large Scale Validation Tests (July 1997):
- Use M/V Independence @ Wharf B
- Winch Vessel Into Berth
- Measure Berthing Forces and Water Current
- Compare Measurements With Analytical Predictions
NAVAL FACILITIES ENGINEERING SERVICE CENTER
*CERF*  D-6

APPENDIX D - NAVY SHIP CHARACTERISTICS
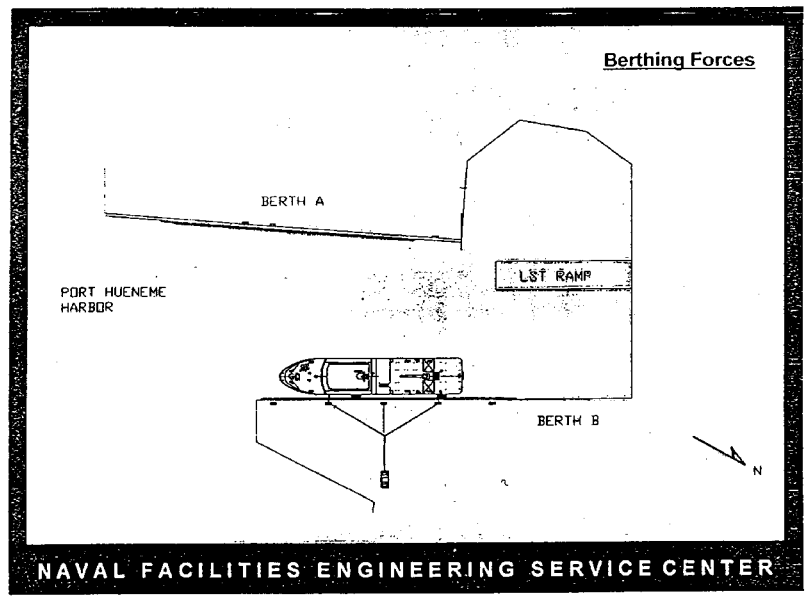

APPENDIX I - SKETCH OF POSSIBLE UNIVERSAL FENDER
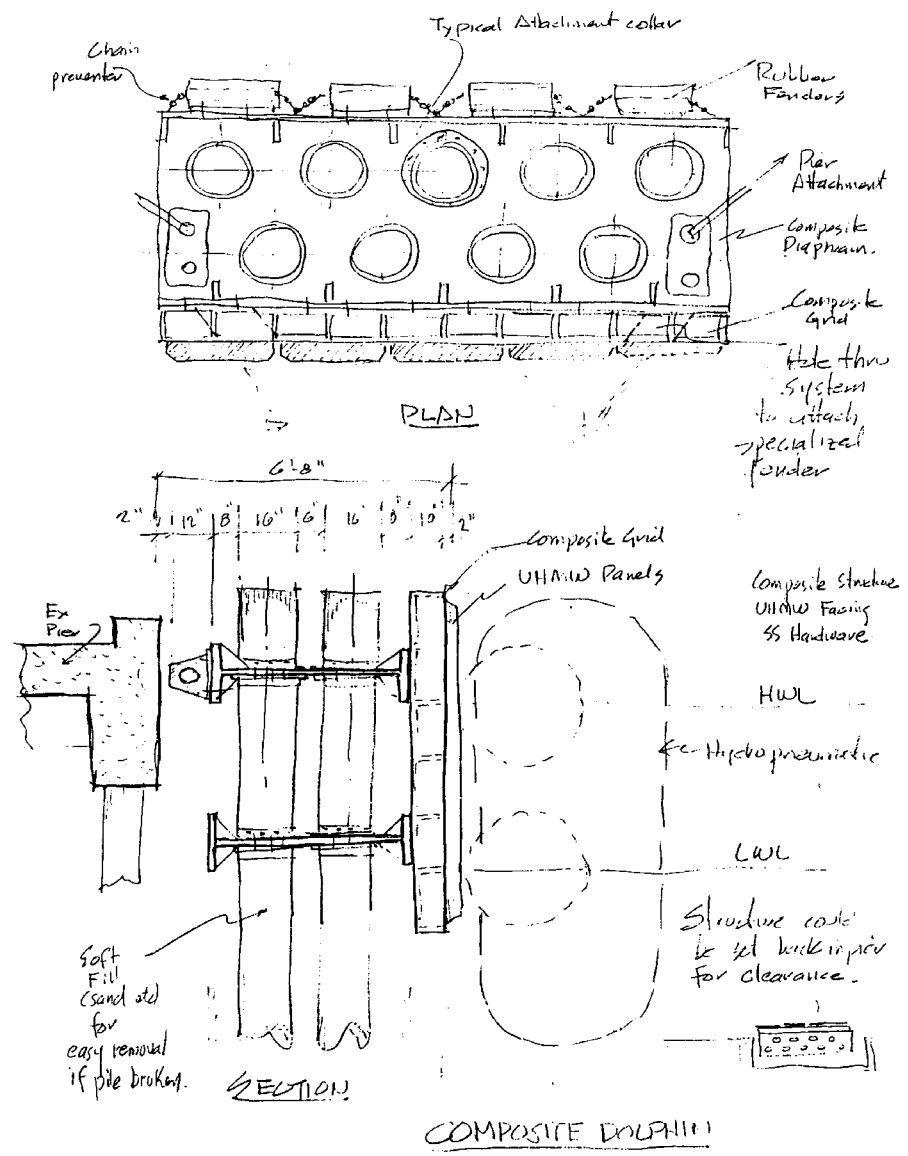

APPENDIX I - SKETCH OF POSSIBLE UNIVERSAL FENDER
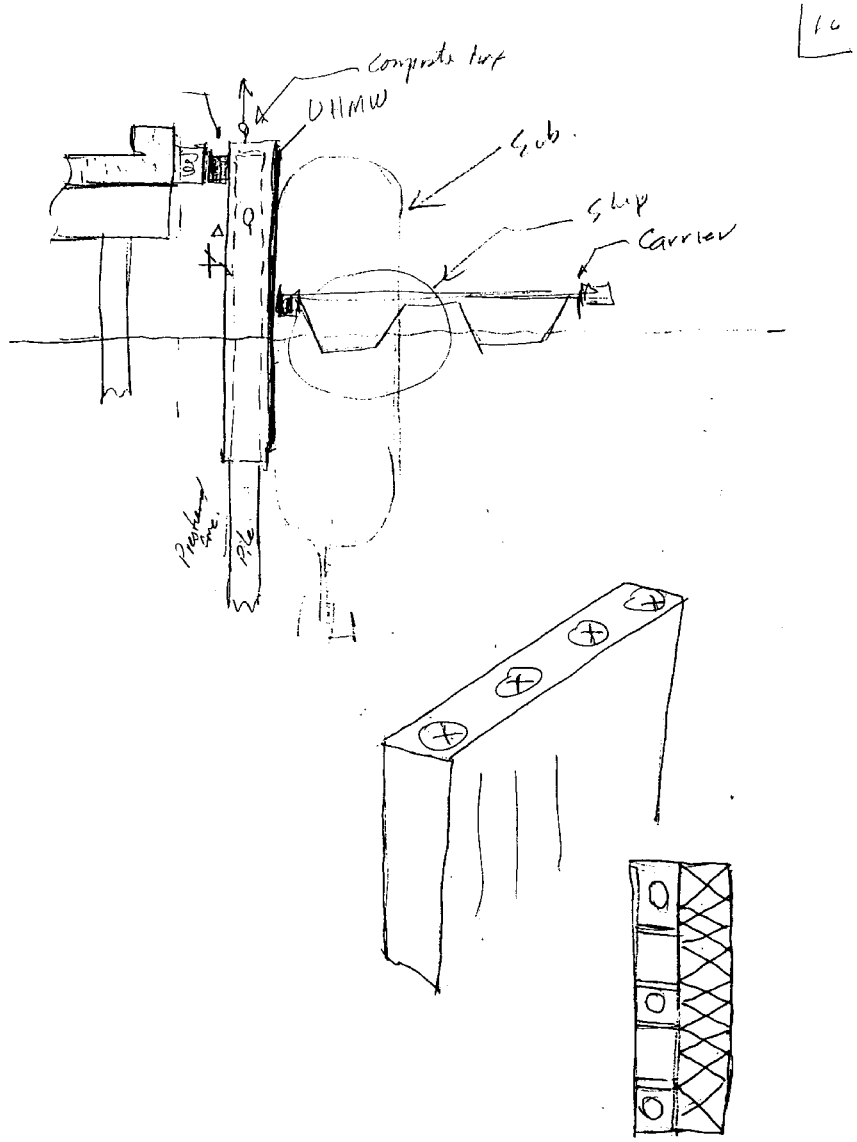

APPENDIX Y

```c
/*
    Program BUMPER.C
    C source code for TERN 16-bit Embedded Microcontroler
    Author:  Kerry T. Slattery
    Date of last revision:  10 August 1998
*/ include <stdlib.h>
include <dos.h>
#include <math.h>
#include "ve.h"
#include "ser1.h"
#include "ad.h"

void interrupt far tb_isr(void);
void initialize(void);

unsigned int timbas_count,timbas_count0,timbas_count1,timbas_count2;
unsigned char i,interval,ledd,flag;
long j;
long ipress,ipressthr,ipressmax,ipress0,idpress;
int vvv;
long sumx1,sumy1,sumx2,sumxy,alpha1000,beta1000,vt1000,vt10002;
long n,itime,itimetostop;
long timetostop1000,bumperstroke1000,valvestroke1000,deltafullrange;
unsigned int ptoidp,dtoidel;
long idexpected,idactual,idfullrange;

void main(void)
{
    initialize();
    ve_init();
    ad_init();
    timbas_count=0;
    interval=3;   /* timebase interrupt every 131.072 ms  */
    time_base_init(interval);
    i=1;
    time_base_interrupt(i,tb_isr);
    enable();
    ipress=0;
    pokeb(0xfff0,0x11,0x40);
    pokeb(0xfff0,0x10,0xf7);

/* Sleep Phase - waiting for indicator of possible berthing */
/* In the simulation, this is receiving a clean signal from the A/D card */
    pokeb(0xfff0,0x00,(unsigned char)(peekb(0xfff0,0)&0xdf));   /*  Set P05=low
*/
    vvv=100;
    ledd=0;
    led(ledd);
while(vvv>50)
{
    vvv=ce_ad12('0');
```

Y-1

```
}
ledd=1;
led(ledd);
/* Phase 0 - waiting for a crossing of the threshold pressure */
while(ipress<ipressthr)
{
    ipress=ce_ad12('0');
}
timbas_count1=timbas_count;
timbas_count0=timbas_count1;
ipress0=ipress;
sumx1=0;
sumx2=0;
sumy1=0;
sumxy=0;
n=0;
ledd=0;
led(ledd);

/* Phase 1 - determining velocity with the valve closed */
while (ipress<ipressmax)
{
    while (timbas_count==timbas_count0)
        { ledd=0; }
    timbas_count0=timbas_count;
    ipress=ce_ad12('0');
    itime=timbas_count-timbas_count1;
    idpress=ipress-ipress0;
    ipress0=ipress;
    sumx1=sumx1+itime;
    sumx2=sumx2+itime*itime;
    sumy1=sumy1+idpress;
    sumxy=sumxy+itime*idpress;
    n++;
    if (sumx2!=sumx1*sumx1/n) beta1000=1000*(sumxy-sumx1*sumy1/n)/(sumx2-sumx1*sumx1/n);
/*  alpha1000=1000*sumy1/n-beta1000/n*sumx1;  */
/* converting slope to actual units > *58.2 for time^2 and / ptoidp for pressure */
/* sqrt of the slope / 3.2 gives the velocity in inches/second */
    if (beta1000>0) vt10002=beta1000*58200L/ptoidp*10/32;
}
ledd=1;
led(ledd);
flag=0;
for (j=0; j<200 && flag==0; j++)
{
    if (j*j*10000>vt10002)
    {
        vt1000=j*100;
        flag=1;
    }
}
```

Y-2

```
if (vt1000>0) timetostop1000=2*bumperstroke1000*1000/vt1000;
itimetostop=timetostop1000*7629/1000/1000;
timbas_count2=timbas_count;

/* Phase 2 - Move Valve */
/* Assume that valve moves at constant velocity */
/* Functions for valve velocity in terms of ship velocity and mass
   are being developed and will be included in later revisions   */ timbas_count0=timbas_count2;

n=0;
idactual=ce_ad12('1');
while (idactual<idfullrange)
{
    while (timbas_count==timbas_count0)
       { ledd=ledd; }
    timbas_count0=timbas_count;
    itime=timbas_count-timbas_count2;
    if (itimetostop>0) idexpected=idfullrange*itime/itimetostop;
    idactual=ce_ad12('1');

if (idexpected<=idactual)
    {
        pokeb(0xfff0,0x00,(unsigned char)(peekb(0xfff0,0)&0xdf));   /* Set
P05=low (close servovalve) */
        ledd=0;
        n++;
    }
    if (idexpected>idactual)
    {
        pokeb(0xfff0,0x00,(unsigned char)(peekb(0xfff0,0)|0x20));   /* Set
P05=high (open servovalve) */
        ledd=1;
    }
    led(ledd);
}
j=0;
while (j<n)
{
    if (timbas_count/16*16==timbas_count)
    {
        ledd=1;
        j++;
    }
    if ((timbas_count+8)/16*16==timbas_count+8) ledd=0;
    led(ledd);
}
return(0);
}
/*
Function:  timbas_isr
Time Base Interrupt handler.  Increment timbas_count
*/
```

```
void interrupt far tb_isr(void)
{
   time_base_interrupt(0,tb_isr);
   fint();
/* bunch of comments in printout */
   timbas_count++;
   time_base_interrupt(1,tb_isr);
}

/*
Function: initialize
Define constants for the bumper
*/
void initialize(void)
{
long ifullrange,vfullrange,vmin,vmax,pfullrange,pressthr,pressmax;

/* 30 psi transducer with 1 volt=0 psi to 5 volt=30 psi */
   ifullrange=4096;
   vfullrange=5;
   vmin=1;
   vmax=5;
   pfullrange=30;
   pressthr=1; /* psi */
   pressmax=10; /* psi */
   ipressthr=ifullrange/vfullrange*(pressthr*(vmax-vmin)/pfullrange+vmin);
   ipressmax=ifullrange/vfullrange*(pressmax*(vmax-vmin)/pfullrange+vmin);
   ptoidp=ifullrange/vfullrange*(vmax-vmin)/pfullrange;

valvestroke1000=4000;
   bumperstroke1000=16000;

vmin=0;
   vmax=5;
   deltafullrange=4;
   dtoidel=ifullrange/vfullrange*deltafullrange/(vmax-vmin);
   idfullrange=ifullrange*(vmax-vmin)/vfullrange*99/100;
}
```

Y-4

APPENDIX Z
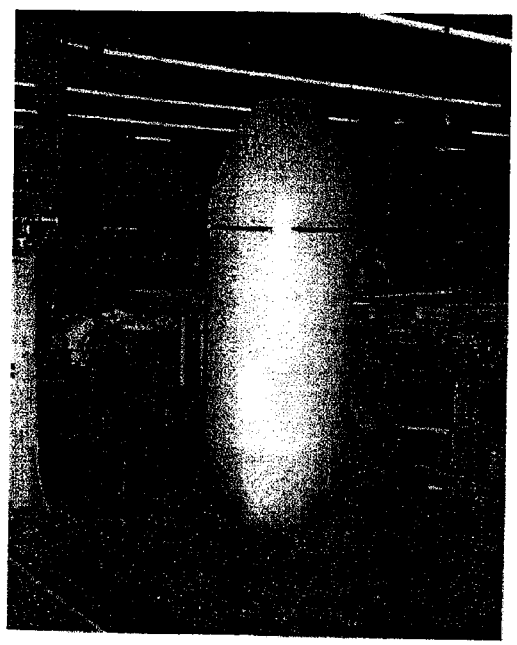
Glass/Polyurethane Fender (Joint Region)
FIG. Z-1

APPENDIX Z
Inflatable Mandrel Extraction
FIG. Z-2

What is claimed is:

1. An energy-absorbing system comprising a structure, fluid contained by said structure, situation means for movement-restrictively situating said structure, valvular means for permitting escape of said fluid, actuator means for effecting adjustment of said valvular means, control means for controlling said actuator means, and pressure-sensing means for informing said control means regarding said pressure, wherein said energy-absorbing system is characterized by the capability of at least substantially regulating the deceleration of a body which engages in a collision with said structure, wherein said collision has associated therewith said pressure and a force, wherein said at least substantially regulated deceleration of said body is characterized by an approximate gradualness of said deceleration, wherein said approximate gradualness is at least substantially determined by said adjustment of said valvular means, wherein said approximate gradualness has associated therewith an interval of approximate constancy of said pressure approximately followed by an interval of approximate constancy of said force, and wherein said adjustment of said valvular means is capable of at least substantially causing said interval of approximate constancy of said pressure approximately followed by said interval of approximate constancy of said force.

2. An energy-absorbing system as in claim 1 wherein, in accordance with said adjustment of said valvular means, prior to said collision said valvular means is closed and during said collision said valvular means operates in four stages, said four stages consisting of:
a first stage wherein said valvular means remains closed;
a second stage wherein, when said pressure is approximately maximal, said valvular means opens and statically remains open so as to sustain an approximately maximal approximately constant said pressure, said second stage corresponding to said interval of approximate constancy of said pressure;
a third stage wherein, when said pressure commences to decrease, said valvular means dynamically remains open so as to adaptively sustain an approximately constant said force, said third stage corresponding to said interval of approximate constancy of said force; and
a fourth stage wherein, when said pressure approaches zero, said valvular means closes.

3. An energy-absorbing system as in claim 2, wherein:
generally during said first stage, said pressure increases;
generally during said second stage, said valvular means is in a statically open mode and said pressure is approximately constant;
generally during said third stage, said pressure decreases and said valvular means is in a dynamically open mode; and
generally during said fourth stage, said valvular means remains closed and said force decreases;
said valvular means includes a valve core and a valve shaft;
said valve core generally describes a first butterfly shape;
said valve shaft generally describes a second butterfly shape which complements said first butterfly shape;
said valve core is moveable within said valve shaft along an imaginary valvular axis; and
the positioning of said valve core along said imaginary valvular axis determines said escape of said fluid; and
said adjustment of said valvular means includes adjustment of said positioning of said valve core.

4. An energy-absorbing system as in claim 1 wherein said fluid is liquid.

5. An energy-absorbing system as in claim 4 wherein said liquid is water.

6. An energy-absorbing system as in claim 1, wherein:
in association with said collision said pressure-sensing means is capable of informing said control means which is capable in turn of controlling said actuator means which is capable in turn of effecting said adjustment of said valvular means;
said control means includes means for estimating the mass and the velocity of said body; and
said approximate gradualness of said deceleration has associated therewith the phases of:
(a) approximate concurrency of (i) an approximate increasing inclination of said pressure and (ii) an approximate increasing inclination of said force; approximately followed by
(b) approximate concurrency of (i) an approximate constancy of said pressure at an approximately maximum level and (ii) an approximate increasing inclination of said force; approximately followed by
(c) approximate concurrency of (i) an approximate decreasing inclination of said pressure and (ii) an approximate constancy of said force; approximately followed by
(d) approximate concurrency of (i) an approximate decreasing inclination of said pressure and (ii) an approximate decreasing inclination of said force;
wherein said phase (b) corresponds to said interval of approximate constancy of said pressure, and wherein said phase (c) corresponds to said interval of approximate constancy of said force.

7. An energy-absorbing system as in claim 6, wherein said structure includes a structural wall which encloses said fluid and which is capable of elastic deformation, and wherein during said collision:
said structure is at least substantially stationary;
said structural wall experiences said deformation so as to exhibit an approximately constant stiffness with increasing said deformation;
said structural wall experiences approximately maximal said deformation at about the time of commencement of said phase (d); and
said body at least substantially comes to a stop at about the time of commencement of said phase (d).

8. An energy-absorbing system as in claim 7, wherein:
said structural wall is at least substantially made of fiber-reinforced high strain-to-failure viscoelastic matrix material;
said energy-absorbing system is usable for a plurality of said collisions; and
in association with each said collision, said energy is dissipated in association with the combination of: said deformation of said structural wall, said deformation including the straining of said fiber-reinforced high strain-to-failure viscoelastic matrix material; and said escape of said fluid.

9. A system for absorbing impact by an object, said system comprising:
a bumper for being subjected to said impact, said bumper having an interior space and including fiber-reinforced high strain-to-failure viscoelastic matrix material;
means for suspending said bumper;
a structure for restraining said bumper when said bumper is subjected to said impact;

fluid which at least substantially fills said interior space;

an outlet valve which regulates the flow of said fluid from said interior space;

at least one pressure sensor which sends an electrical output signal relating to the pressure of said bumper;

a processor-controller which receives said electrical output signal and which sends an electrical control signal in accordance with said electrical output signal, said processor-controller having a memory containing information, said processor-controller using said electrical output signal and said information for estimating the mass and the velocity of said object, said processor-controller thereby determining the degree of actuation of said outlet valve while said impact occurs, said degree of actuation of said outlet valve thereby determining the degree of gradual deceleration of said object while said impact occurs; and a servo mechanism which receives said electrical control signal, said servo mechanism effecting actuation of said outlet valve in accordance with said electrical control signal.

10. A system for absorbing impact as in claim 9, wherein said outlet valve defines a valvular axis and an hourglass shape, said outlet valve comprising a valve shaft and a valve core which is movable along said valvular axis.

11. A system for absorbing impact as in claim 10, wherein said valve core is in a fully closed position prior to said impact.

12. A system for absorbing impact as in claim 11, wherein, upon said impact, said valve core remains in said fully closed position until said pressure reaches an approximate maximum value, whereupon said valve core moves so as to achieve a static open position which maintains approximate constancy of said pressure at said approximate maximum value.

13. A system for absorbing impact as in claim 12, wherein said static open position is the fully open position of said valve core.

14. A system for absorbing impact as in claim 12, wherein said static open position is a partially open position of said valve core.

15. A system for absorbing impact as in claim 12, wherein, after said valve core achieves said static open position, said pressure begins to decrease, whereupon said valve core moves so as to achieve a dynamic open position which maintains approximate constancy of force associated with said impact.

16. A system for absorbing impact as in claim 15, wherein said dynamic open position entails, with respect to said static open position, both an increase and a decrease of openness of said valve.

17. A system for absorbing impact as in claim 15, wherein said dynamic open position entails, with respect to said static open position, a decrease of openness of said valve.

18. A system for absorbing impact as in claim 9, wherein said processor-controller is situated in said interior space.

19. A system for absorbing impact as in claim 9, wherein said servo mechanism is situated in said interior space.

20. A system for absorbing impact as in claim 19, wherein said processor-controller is situated in said interior space.

21. A system for absorbing impact as in claim 9, wherein said fluid is liquid.

22. A system for absorbing impact as in claim 9, wherein said fluid is water.

23. A system for absorbing impact as in claim 9, wherein prior to said impact said outlet valve is closed, and wherein upon said impact said outlet valve remains closed approximately until said pressure reaches an approximate maximum pressure value, whereupon said outlet valve is caused to be statically open so that said pressure is approximately steady and remains approximately steady for a first time period lasting approximately until said pressure commences to fall, whereupon said outlet valve is caused to be dynamically open so that a force associated with said impact is approximately steady and remains approximately steady for a second time period lasting approximately until said force commences to fall, whereupon said outlet valve is cause to be closed.

* * * * *